(12) United States Patent
Takenaka et al.

(10) Patent No.: US 7,734,378 B2
(45) Date of Patent: *Jun. 8, 2010

(54) GAIT GENERATION DEVICE FOR LEGGED MOBILE ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1201 days.

This patent is subject to a terminal disclaimer.

(21) Appl. No.: 10/562,626

(22) PCT Filed: Jun. 28, 2004

(86) PCT No.: PCT/JP2004/009470

§ 371 (c)(1),
(2), (4) Date: Dec. 23, 2005

(87) PCT Pub. No.: WO2005/000533

PCT Pub. Date: Jan. 6, 2005

(65) Prior Publication Data

US 2006/0247800 A1  Nov. 2, 2006

(30) Foreign Application Priority Data

Jun. 27, 2003  (JP)  ............................. 2003-185613

(51) Int. Cl.
*G05B 19/408* (2006.01)
*B25J 13/04* (2006.01)
*G06F 19/00* (2006.01)

(52) U.S. Cl. .................. 700/253; 700/245; 700/260; 318/568.12; 318/568.22; 901/1

(58) Field of Classification Search .................. 700/44, 700/46, 245, 250, 253, 260; 318/568.12, 318/568.2, 568.22; 901/1, 50, 48
See application file for complete search history.

(56) References Cited

U.S. PATENT DOCUMENTS

| 5,404,086 A * | 4/1995 | Takenaka et al. ....... 318/568.12 |
| 6,876,903 B2 * | 4/2005 | Takenaka .................... 700/245 |
| 2006/0173578 A1 * | 8/2006 | Takenaka et al. ............ 700/245 |

FOREIGN PATENT DOCUMENTS

| EP | 0 572 285 | 12/1993 |
| EP | 0 856 457 | 8/1998 |

(Continued)

*Primary Examiner*—Thomas G Black
*Assistant Examiner*—Christine M Behncke
(74) *Attorney, Agent, or Firm*—Rankin, Hill & Clark LLP

(57) ABSTRACT

A vertical component or the like of a floor reaction force moment to be applied to a robot 1 is defined as a restriction object amount, and the permissible range of the restriction object amount is set. A provisional motion of the robot that satisfies a predetermined dynamic balance condition is determined on a predetermined dynamic model, and if a restriction object amount determined by the provisional motion deviates from the permissible range, then the motion of a desired gait is determined by correcting the provisional motion by changing the angular momentum changing rate of the robot from the provisional motion while limiting the restriction object amount to the permissible range on the dynamic model.

11 Claims, 42 Drawing Sheets

FOREIGN PATENT DOCUMENTS

| | | |
|---|---|---|
| EP | 1 018 467 | 7/2000 |
| EP | 1 120 203 | 8/2001 |
| EP | 1 398 121 | 3/2004 |
| JP | 05-305584 | 11/1993 |
| JP | 05-324115 | 12/1993 |
| JP | 10-086080 | 4/1998 |
| JP | 10-086081 | 4/1998 |
| JP | 10-277969 | 10/1998 |
| JP | 11-300661 | 11/1999 |
| JP | 2002-326173 | 11/2002 |
| WO | WO 02/40224 | 5/2002 |
| WO | WO 03/057423 | 7/2003 |
| WO | WO 03/057425 | 7/2003 |

* cited by examiner

FIG.6
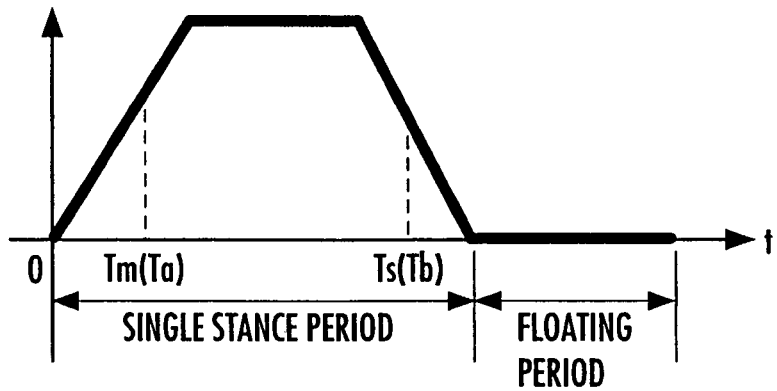
FIG.7
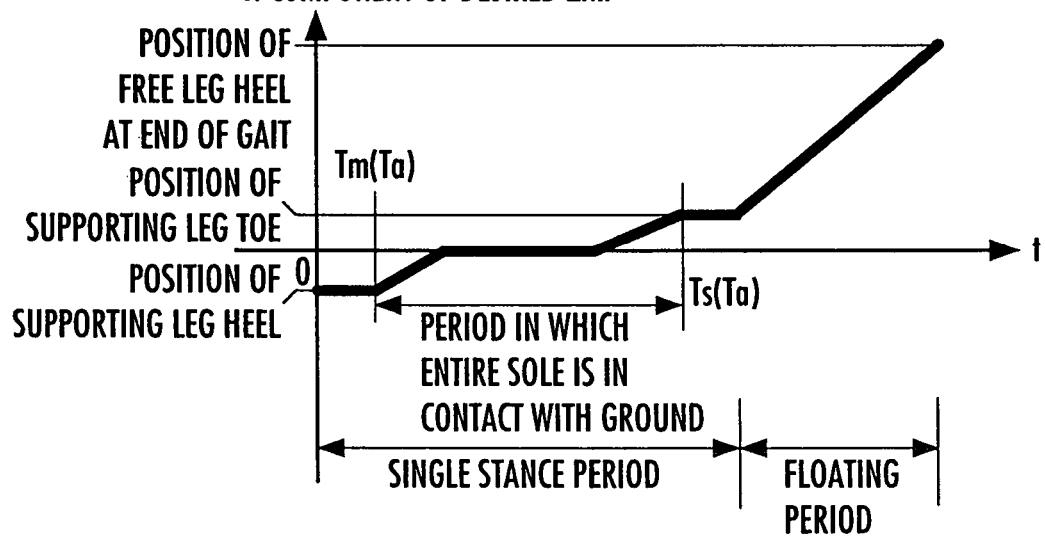
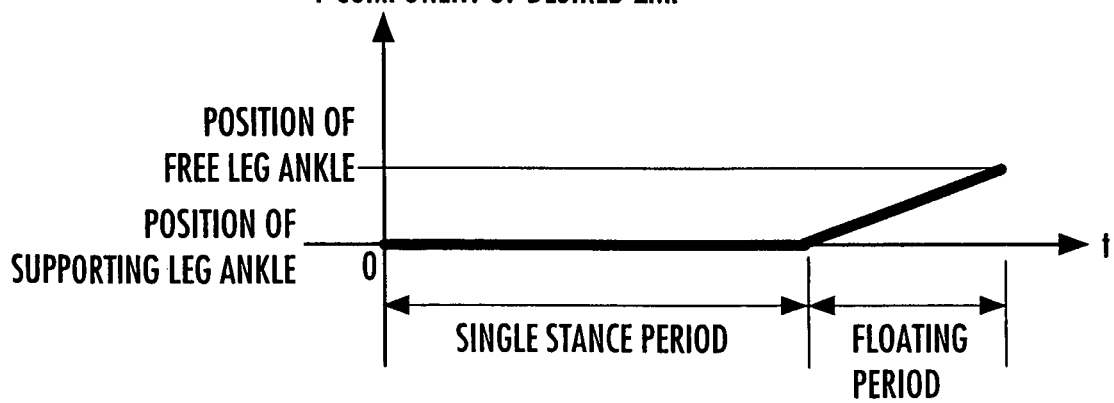

FIG.23

ENTRY

S200 DETERMINE INITIAL STATES (STATES AT START TIME Ts) OF FOOT POSITION/POSTURE, ARM POSTURE AND BODY POSTURE ANGLE ON THE BASIS OF NORMAL TURNING GAIT PARAMETERS.

S202 PROVISIONALLY DETERMINE INITIAL (AT Ts) HORIZONTAL BODY POSITION/VELOCITY CANDIDATES (Xs,Vxs).

S204 ∞ (loop)

- S206 DETERMINE INITIAL VERTICAL BODY POSITION/VELOCITY (Zs, Vzs).
- S208 USING DYNAMIC MODEL, GENERATE ONE STEP OF GAIT ON THE BASIS OF NORMAL TURNING GAIT PARAMETERS, TAKING (Xs,Vxs), (Zs,Vzs) AS INITIAL STATES OF BODY.
- S210 CONVERT TERMINAL BODY POSITION/VELOCITY OF GENERATED GAIT INTO VALUES OBSERVED FROM SUPPORTING LEG COORDINATE SYSTEM OF NEXT ONE STEP, AND DEFINE THE VALUES AS (Xe,Vxe).
- S212 BOUNDARY CONDITION ERROR (errx,errv)=(Xs,Vxs)−(Xe,Vxe)
- S214 ARE errx AND errv WITHIN PERMISSIBLE RANGE? — yes → LEAVE REPETITION LOOP
- S216 DETERMINE A PLURALITY OF INITIAL VALUE CANDIDATES (Xs+ΔXs,Vxs),(Xs,Vxs+ΔVxs) NEAR (Xs,Vxs), AND TAKE EACH OF THE DETERMINED VALUES AS INITIAL STATE OF BODY TO DETERMINE BOUNDARY CONDITION ERROR ASSOCIATED WITH EACH AS SHOWN ABOVE.
- S218 DETERMINE NEXT INITIAL VALUE CANDIDATES (Xs,Vxs) ON THE BASIS OF BOUNDARY CONDITION ERRORS ASSOCIATED WITH (Xs,Vxs) AND INITIAL VALUE CANDIDATES IN THE VICINITY THEREOF.

S220 DETERMINE INITIAL HORIZONTAL BODY POSITION/VELOCITY (X0,V0), INITIAL VERTICAL BODY POSITION/VELOCITY (Z0,Vz0), AND INITIAL BODY POSTURE ANGLE/ANGULAR VELOCITY AT ORIGINAL START TIME 0.

S222 DETERMINE NORMAL TURNING INITIAL DIVERGENT COMPONENT q[0] ACCORDING TO THE FOLLOWING EQUATION:
q[0] = X0 + V0/$\omega$0

S224 DETERMINE q″, WHICH IS THE VALUE OF NORMAL TURNING INITIAL DIVERGENT COMPONENT q[0] OBSERVED FROM CURRENT TIME'S GAIT SUPPORTING LEG COORDINATE SYSTEM, AND (Z0″,Vz0″), WHICH IS THE VALUES OF INITIAL VERTICAL BODY POSITION/VELOCITY OBSERVED FROM CURRENT TIME'S GAIT SUPPORTING LEG COORDINATE SYSTEM.

S226 DETERMINE INITIAL ANTIPHASE ARM SWING ANGLE AND ANGULAR VELOCITY ($\theta$az0, $\omega$az0) AT ORIGINAL START TIME 0, AND DETERMINE ($\theta$az0″, $\omega$az0″), WHICH IS THE VALUES OF THE ABOVE OBSERVED FROM CURRENT TIME'S GAIT SUPPORTING LEG COORDINATE SYSTEM.

RETURN

FLOOR REACTION FORCE HORIZONTAL COMPONENT Fxtmp CREATED WITHOUT TAKING PERMISSIBLE RANGE INTO ACCOUNT FLOOR REACTION FORCE HORIZONTAL COMPONENT Fx TAKING FLOOR REACTION FORCE HORIZONTAL COMPONENT PERMISSIBLE RANGE INTO ACCOUNT BODY INCLINATION ANGULAR ACCELERATION $\beta$ FLOOR REACTION FORCE MOMENT VERTICAL COMPONENT Mztmp
CREATED WITHOUT TAKING PERMISSIBLE RANGE INTO ACCOUNT FLOOR REACTION FORCE MOMENT VERTICAL COMPONENT Mz
TAKING FLOOR REACTION FORCE MOMENT VERTICAL COMPONENT
PERMISSIBLE RANGE INTO ACCOUNT ANTIPHASE ARM SWING MOMENT (Maz)

FLOOR REACTION FORCE HORIZONTAL COMPONENT PERMISSIBLE LOWER LIMIT VALUE Fxmin
AND FLOOR REACTION FORCE HORIZONTAL COMPONENT PERMISSIBLE UPPER LIMIT VALUE Fxmax

GAIT GENERATION DEVICE FOR LEGGED MOBILE ROBOT

TECHNICAL FIELD

The present invention relates to a device for generating gaits suited not only to walking but also running of a legged mobile robot.

BACKGROUND ART

Hitherto, a major object of generating gaits (desired gaits) for making a legged mobile robot, e.g., a bipedal mobile robot, carry out a traveling motion has been focused mainly on generating gaits (walking gaits) to make the robot effect a smooth walking motion. In recent years, however, as the development of legged mobile robots advances, it has come to be desired to generate gaits that enable the robots not only to walk but to run also. Furthermore, it has come to be desired to generate gaits that enable the robots to move without troubles even on a slippery floor (so-called low-$\mu$ path) on which a sufficient frictional force cannot be produced.

Since the Chinese characters for "gait" include a character meaning "walking," the gait tends to be misinterpreted that the definition thereof is limited to walking. However, "gait" originally presents a concept that includes running, as it is used as a term indicating a running mode of a horse, such as "trot."

A description will now be given of the difference between walking and running in terms of characteristics.

A traveling mode that includes an instant at which all legs are simultaneously floating is usually defined as running. This definition, however, does not always make it possible to clearly distinguish between walking and running. For instance, in most humans, there are instants at which all legs float at the same time during fast jogging, whereas many humans have one of their legs always in contact with the ground during slow jogging. It is somehow perceptually unreasonable to define fast jogging as running and slow jogging as walking.

FIG. 50 shows a pattern of vertical body positions and floor reaction force vertical components (a sum of floor reaction force vertical components acting on right and left legs) in typical running, and FIG. 51 shows a pattern of vertical body positions and floor reaction force vertical components in typical walking.

A vertical body position/velocity means a vertical position of a representative point of a body and a velocity thereof. A horizontal body position/velocity means a horizontal position of a representative point of the body and a velocity thereof. A vertical body position/velocity and a horizontal body position/velocity together will be referred to as body position/velocity.

Strictly speaking, the "floor reaction force vertical component" should be described as "translational floor reaction force vertical component" to distinguish it from a moment component about a vertical axis of a floor reaction force; however, the term is too long, so that the term "translational" will be omitted. Hereinafter, the "translational floor reaction force horizontal component" will be described as "floor reaction force horizontal component," omitting "translational."

First, attention will be focused on the movement of the body. In walking, the body reaches a highest level at the instant the body passes over a supporting leg, while it reaches a lowest level at this instant in running. In other words, the phase of a vertical motion pattern of the body reverses between walking and running.

Meanwhile, a floor reaction force remains relatively constant in walking, whereas it considerably varies in running, the floor reaction force reaching its maximum at the moment the body passes over a supporting leg. Needless to say, the floor reaction force is zero at the instant when all legs are simultaneously floating. More detailed observation reveals that a floor reaction force of a magnitude that is substantially proportional to a compression amount of the supporting leg is generated while running. In other words, it may be said that the legs are used like springs to jump for traveling while running.

Slow jogging has the same body vertical motion phase as that of typical running. In addition, slow jogging frequently includes no instants at which all legs are simultaneously floating; however, even in this case, a floor reaction force reaches substantially zero, although not completely zero, at an instant when a supporting leg and an idle leg are switched.

Hence, distinguishing between walking and running on the basis of the aforesaid characteristics of the vertical motions of the body or floor reaction force patterns as described above may be more appropriate and perceptually reasonable, because slow jogging is also regarded as running.

In particular, to distinguish between the two on the basis of a most characteristic aspect, running may be defined as a traveling mode in which the floor reaction force becomes zero or substantially zero at the instant a supporting leg is switched, while walking may be defined as a traveling mode (a floor reaction force vertical component remaining relatively constant) other than that.

The present applicant has previously proposed, in PCT Kokai publication WO/02/40224, an art for generating freely and in real time a gait of a legged mobile robot that includes a floor reaction force while substantially satisfying dynamic balance conditions (This means the conditions of balance among gravity, an inertial force, and a floor reaction force of a desired gait. In a narrow sense, it means that the horizontal component of a moment about a desired ZMP by the resultant force of gravity and an inertial force produced by a motion of a desired gait is zero. Detailed description will be given hereinafter). This art and a series of the control devices of legged mobile robots proposed by the present applicant in Japanese Unexamined Patent Application Publication No. 10-86081, Japanese Unexamined Patent Application Publication No. 10-277969 can be applied to walking and also to running.

These arts, however, have not considered the magnitudes of a vertical component of a floor reaction force moment about the ZMP of a desired gait. Hence, there has been a danger in that the vertical component of a floor reaction force moment becomes excessive, causing a frictional limitation to be exceeded and consequently leading to a spin. The term "spin" refers to a state in which a yaw angle (a rotational angle about a vertical axis) velocity of an actual robot deviates from a desired yaw angular velocity.

When a robot walks on a floor surface having a high friction coefficient (in this case, at least one leg is always in contact with the ground), a floor reaction force vertical component is always substantially equivalent to a robot's own weight, thus providing a higher limit of a frictional force (i.e., the vertical component of a floor reaction force moment). This makes the robot resistant to spin.

In running, however, there are cases where the floor reaction force vertical component becomes zero or close to zero; hence, in such a case, the limit of the moment vertical component of the frictional force of a floor surface becomes zero or close to zero even if a friction coefficient is high. Accordingly, there has been a danger in that a floor reaction force moment vertical component of a desired gait exceeds a limit, causing a spin and a fall.

Further, even in the case of walking, there has been a danger in that a robot spins and falls if a floor has a low friction coefficient.

Meanwhile, the present applicant has previously proposed a technique, in which an arm is swung so as to cancel a moment vertical component generated by anything other than arms in a desired gait in, for example, PCT application PCT/JP02/13596.

In this case, the moment vertical component of a desired gait will be substantially zero; however, if the robot travels, severely swinging its legs, it will also swing its arms severely.

Generally, in a human-like robot, the mass of its arms is smaller than that of its legs. Hence, in order to completely cancel a moment vertical component, it is necessary to swing the arms more severely than the legs.

However, the motion range of the arms is limited and the torque and speed of the actuators of the arms are also limited. Therefore, if the robot travels, severely swinging its legs, there have been some cases where a moment vertical component cannot be fully canceled by the arms.

Furthermore, there has been a danger in that, if arms are swung to cancel out a moment vertical component produced by anything other than arms in a desired gait, then the center of arm swing is gradually offset, causing the swings of the right and left arms to be asymmetrical. Specifically, to make a left turn, if a robot swings its arms to fully offset a moment vertical component generated by anything other than arms, then the left arm is swung more toward the front and swung less toward the rear, while the right arm is swung less toward the front and swung more toward the rear in order to offset the change in an angular momentum caused by the legs and the body having turned to the left. This may cause the left arm to reach a motion limit of the swing toward the front, and the right arm to reach a motion limit of the swing toward the rear.

Furthermore, if a motion is made to restore the center of the arm swing so as to prevent the swings of the right and left arms from becoming asymmetrical, then a floor reaction force moment vertical component is generated. This in turn causes a floor reaction force moment vertical component of a desired gait to exceed a limit, possibly causing the robot to spin.

Accordingly, an object of the present invention is to provide a gait generating device which solves the problems described above and which is capable of generating further ideal gaits regardless of the types of gaits, such as walking and running, and a friction condition of a floor surface.

More specifically, an object of the present invention is to provide a gait generating device capable of generating gaits that make it possible to prevent a robot from spinning and falling caused by the spinning, considering limitation of a moment vertical component of the force of a friction between the robot and a floor surface. Another object is to provide a gait generating device capable of generating a gait motion pattern that satisfies a dynamic balance condition even in a leg-floating period or even if the limit of a moment vertical component of a frictional force is extremely low. Still another object is to prevent lateral asymmetry of a desired gait from increasing so as to secure continuity of a motion.

DISCLOSURE OF INVENTION

To fulfill the aforesaid objectives, in a gait generating device for generating a desired gait of a legged mobile robot that travels by moving a plurality of legs extended from its body, a gait generating device of a legged mobile robot in accordance with the present invention is provided with a permissible range setting means for setting a permissible range of a restriction object amount, the restriction object amount being a vertical component of a floor reaction force moment to be applied to the robot or a component of the floor reaction force moment in floor surface normal line direction, or a vertical component of an angular momentum changing rate of the robot or a component of the angular momentum changing rate in floor surface normal line direction, a provisional motion determining means for determining a provisional motion of the desired gait such that a resultant force of a gravity and an inertial force acting on the robot satisfies a predetermined dynamic balance condition on a predetermined dynamic model, and a provisional motion correcting means for correcting the provisional motion to determine the motion of a desired gait by changing the changing rate of an angular momentum of the robot from the provisional motion, while limiting the restriction object amount to the permissible range on the dynamic model if the restriction object amount defined by the provisional motion of the desired gait deviates from the permissible range (a first invention).

According to the present invention (the first invention), if the restriction object amount defined by the provisional motion of a desired gait deviates from the permissible range, the motion of the desired gait is determined by correcting the provisional motion by changing the changing rate of an angular momentum of a robot from the provisional motion, while limiting the restriction object amount to the permissible range on the dynamic model. Thus, the motion of a desired gait is generated, while limiting the restriction object amount to the permissible range. The restriction object amount is proportional or substantially proportional to the moment vertical component of the friction force between a robot and a floor surface. Therefore, the present invention (the first invention) is capable of generating a gait that makes it possible to prevent a robot from spinning and falling caused by the spinning, taking the restriction of the moment vertical component of a frictional force into account.

In the first invention, the angular momentum changing rate that is changed to limit the restriction object amount to the permissible range is, for example, the vertical component of the angular momentum changing rate or the component thereof in floor surface normal line direction.

In the first invention, the dynamic balance condition is, for example, a condition under which the horizontal component of a moment (a component other than the vertical component of the moment) generated about a predetermined point (e.g., a desired ZMP) on a floor surface by the resultant force of a gravity and an inertial force acting on the robot on a predetermined dynamic model satisfies a predetermined dynamic balance condition matches or substantially matches a predetermined desired floor reaction force moment horizontal component, or a condition under which a translational force vertical component of the resultant force matches or substantially matches a predetermined desired translational floor reaction force vertical component. Of these dynamic balance conditions, the former dynamic balance condition is important for generating a gait that ensures stable motion (free of the danger of falling) of a robot, while the latter dynamic balance condition is important for generating a gait that ensures smooth running of the robot.

The permissible range of a restriction object amount may be set, considering the type of gait, the period of gait, and the frictional force that can be produced by floor, and the permissible range may be set to zero (both an upper limit value and a lower limit value of the permissible range may be zero). For example, in the case of a running gait having a period during which all legs of a robot float, the permissible range in the floating period may be set to zero.

In the first invention, a motion to be corrected by the provisional motion correcting means is preferably the motion of a body of the robot or an arm extended from the body (a second invention).

According to the second invention, the provisional motion can be corrected while minimizing the correction of a motion that influences the dynamic balance condition.

In the first invention, to be more specific, in the motion of the body of the robot or the motion of an arm extended from the body, the motion to be corrected by the provisional motion correcting means is preferably a motion that changes the vertical component of the angular momentum changing rate of the robot or the component of the angular momentum changing rate in floor surface normal line direction while substantially maintaining the position of the center-of-gravity of the robot at the position of the center-of-gravity determined by the provisional motion (a third invention).

According to the third invention, the provisional motion can be corrected while substantially maintaining the translational floor reaction force or the horizontal component of a floor reaction force moment acting on the robot at the one corresponding to the provisional motion. Hence, it is possible to determine the motion of a desired gait so that the restriction object amount remains in a permissible range by correcting the provisional motion of the body or an arm of the robot, while substantially satisfying the dynamic balance condition. Therefore, it is possible to generate a motion pattern of a gait that satisfies a dynamic balance condition even in a floating period or when the limitation of a moment vertical component of a frictional force is extremely low.

In these first to third inventions, if the robot is a robot equipped with two arms extended from the right and left sides of the body, then the motion to be corrected by the provisional motion correcting means is preferably a motion for moving the two arms forward and backward relative to the robot in opposite directions from each other (a fourth invention).

The fourth invention facilitates the correction of the provisional motion.

In the first to the fourth inventions, if the desired gait is a gait in which a landing period during which at least one leg of the robot is landed and a floating period during which all legs are floated in the air are alternately repeated, then the permissible range is set to substantially zero at least during the floating period (a fifth invention).

With this arrangement, the motions of a desired gait for the landing period and also for the floating period can be properly determined.

Preferably, the first to the fifth inventions is equipped with a desired vertical component determining means for determining a desired vertical component of a translational floor reaction force of the robot or a desired vertical component of a total center-of-gravity acceleration or a desired vertical component of a body acceleration, wherein the permissible range setting means sets the permissible range on the basis of a desired vertical component determined by the desired vertical component determining means (a sixth invention).

More specifically, the moment vertical component or the component in floor surface normal line direction of the friction force between a robot and a floor surface is substantially proportional to a translational floor reaction force vertical component. The translational floor reaction force vertical component is proportional to the sum of the total center-of-gravity acceleration vertical component of the robot and a gravitational acceleration. Furthermore, if, for example, the mass of the legs of the robot is sufficiently smaller than the mass of the body, then the translational floor reaction force vertical component is substantially proportional to the sum of a body acceleration vertical component and a gravitational acceleration. Hence, the permissible range of a pattern suited to a translational floor reaction force vertical component that is desired to be generated by the robot can be set by determining a desired vertical component of a translational floor reaction force of the robot or a desired vertical component of a total center-of-gravity acceleration or a desired vertical component of a body acceleration, and then by setting the permissible range on the basis of the determined desired vertical component.

In the sixth invention, the provisional motion determining means will determine the provisional motion such that the desired vertical component determined by the desired vertical component determining means is satisfied, that is, a translational floor reaction force vertical component of the robot (the translational floor reaction force vertical component that matches the vertical component of the resultant force of an inertial force of a provisional motion and gravity) or a total center-of-gravity acceleration vertical component or a body acceleration vertical component agrees or substantially agrees with the desired vertical component determined by the desired vertical component determining means. In other words, this means that a provisional motion is determined such that the vertical component of the resultant force of the inertial force of the provisional motion and the gravity matches or substantially matches a desired translational floor reaction force vertical component corresponding to the desired vertical component determined by the desired vertical component determining means on the dynamic model.

In the aforesaid first to the sixth inventions, the dynamic model is preferably a dynamic model that describes at least the relationship between a motion to be corrected by the provisional motion correcting means and a floor reaction force as a relationship between a rotational motion of a flywheel, which is rotative about a vertical axis or a floor surface normal line axis, and a floor reaction force (a seventh invention).

With this arrangement, a motion to be corrected will correspond to a rotational motion of the flywheel that independently changes only a floor reaction force moment about the vertical axis or the floor surface normal line axis, thus permitting easy computation for correcting a provisional motion with a less amount of computation.

Furthermore, in the first to the seventh inventions described above, the provisional motion correcting means ideally determines a motion of the desired gait such that the motion of the robot to be corrected if the restriction object amount deviates from the permissible range is approximated or matched to a predetermined reference motion trajectory in a predetermined period during which the restriction object amount determined by the provisional motion lies in the permissible range (e.g., a period during which the permissible range is sufficiently large)(an eighth invention).

According to the eighth invention, the motion of a robot to be corrected can be approximated or matched to the ideal reference motion trajectory during the predetermined period in which the restriction object amount does not deviate from the permissible range, that is, the period in which a sufficient frictional force can be produced between contact surfaces of the robot and the floor surface. As a result, it is possible to prevent the motion of the robot to be corrected from changing into a motion with an extreme bias. In other words, it is possible to prevent the lateral asymmetry of the motion of a desired gait from increasing, ensuring the continuity of the motion. If a gait that alternately repeats the floating period and the landing period is generated, as in the fifth invention, then the predetermined period will be in the landing period.

In the first to the eighth inventions, preferably, the desired gait to be generated has a current time gait generated for each predetermined period to be used for an actual motion of the robot, and a normal gait, which is a virtual cyclic gait following each current time gait and which is used for generating the current time gait, and the processing of the provisional motion determining means and the provisional motion correcting means is carried out when generating the current time gait and/or a normal gait following the current time gait (a ninth invention).

In the ninth invention, the processing of the provisional motion determining means and the provisional motion correcting means is carried out in generating a current time gait and/or a normal gait, thus making it possible to generate an appropriate current time gait and/or normal gait in which a restriction object amount does not deviate from a permissible range. A normal gait is a proper gait as the gait following a current time gait, and the current time gait is generated such that it is continued or approximated to a normal gait, satisfying a condition in which the restriction object amount remains within a permissible range or satisfying the dynamic balance condition.

In the ninth invention, the permissible range setting means preferably sets the permissible range of the current time gait and the permissible range of the normal gait following the current time gait on the basis of a required parameter of the current time gait (e.g., the parameter that defines the landing position/posture of the distal portion of each leg or expected landing time) (a tenth invention).

With this arrangement, an ideal normal gait that matches a current time gait can be generated.

To be more specific, in the tenth invention, if the legged mobile robot is a bipedal mobile robot having two legs, then the required parameters ideally include the parameters that define the landing position/posture for two steps of the distal portions of the legs of the bipedal mobile robot and a parameter that defines the gait cycles of a first step and a second step (an eleventh invention).

This arrangement makes it possible to determine a normal gait that follows a current time gait by using the same type of mode (a mode, such as walking or running) as that of the current time gait, and to determine an ideal normal gait (a gait free from divergence) that follows the current gait. Thus, a current time gait capable of reliably securing stability when a robot travels can be generated.

BRIEF DESCRIPTION OF THE DRAWINGS

FIG. 6 is a graph showing an example of a vertical component trajectory of a desired floor reaction force, FIG. 7 shows graphs illustrating examples of an X component and a Y component of a desired ZMP trajectory.

FIG. 23 is a flowchart showing subroutine processing of S024 in FIG. 13,

BEST MODE FOR CARRYING OUT THE INVENTION

Referring now to the accompanying drawings, a gait generating device of a legged mobile robot according to an embodiment of the present invention will be explained. As the legged mobile robot, a bipedal mobile robot will be used as examples.

Figure 1:
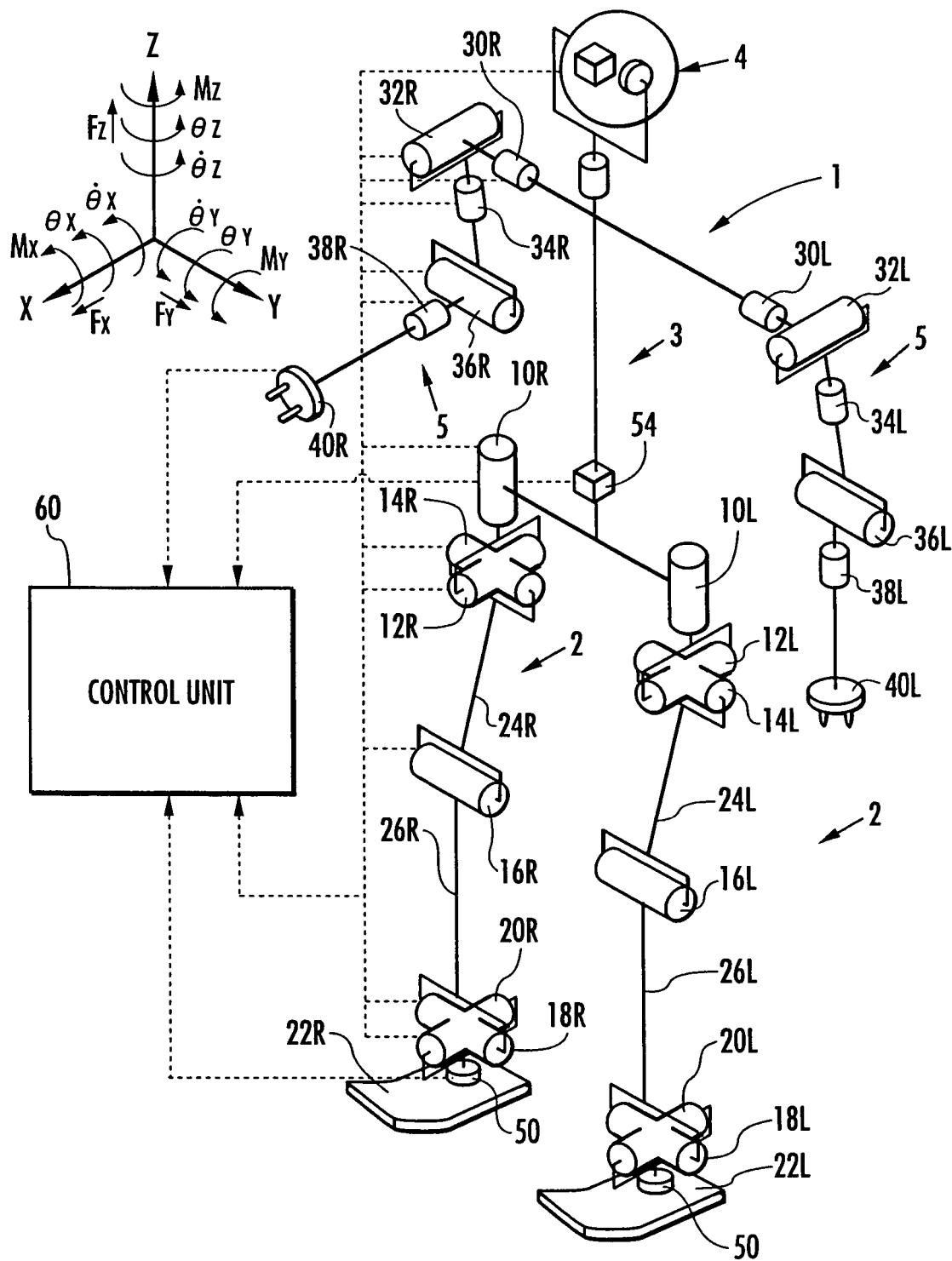
FIG. 1 is a diagram schematically showing a general construction of a bipedal mobile robot as a legged mobile robot in an embodiment of the present invention.

FIG. 1 is a schematic diagram generally showing a bipedal mobile robot representing a legged mobile robot according to the embodiment.

As shown in the figure, a bipedal mobile robot (hereinafter referred to as "the robot") 1 is equipped with a pair of right and left legs (leg links) 2, 2 provided such that they extend downward from a body (a base body of the robot 1) 3. The two legs 2, 2 share the same construction, each having six joints. The six joints of each leg are comprised of, in the following order from the body 3 side, joints 10R, 10L (symbols R and L meaning correspondence to the right leg and the left leg, respectively; the same will be applied hereinafter) for swinging (rotating) a hip (waist)(for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R (L) constituting a distal portion of each leg 2 is attached to the bottoms of the two joints 18R (L) and 20R (L) of the ankle of each leg 2. The body 3 is installed at the uppermost top of the two legs 2, 2 through the intermediary of the three joints 10R (L), 12R (L) and 14R (L) of the hip of each leg 2. A control unit 60 or the like, which will be discussed in detail hereinafter, is housed inside the body 3. For convenience of illustration, the control unit 60 is shown outside the body 3 in FIG. 1.

In each leg 2 having the aforesaid construction, a hip joint (or a waist joint) is formed of the joints 10R (L), 12R (L) and 14R (L), the knee joint is formed of the joint 16R (L), and the ankle joint is formed of the joints 18R (L) and 20R (L). The hip joint and the knee joint are connected by a thigh link 24R (L), and the knee joint and the ankle joint are connected by a crus link 26R (L).

A pair of right and left arms 5, 5 is attached to both sides of an upper portion of the body 3, and a head 4 is disposed at a top end of the body 3. Each arm 5 is provided with a shoulder joint composed of three joints 30R (L), 32R (L), and 34R (L), an elbow joint composed of a joint 36 R(L), a wrist joint composed of a joint 38R (L), and a hand 40R (L) connected to the wrist joint. The head 4 is not directly connected to the topic of the present invention, so that detailed explanation thereof will be omitted.

According to the construction described above, the foot 22R (L) of each leg 2 is given six degrees of freedom relative to the body 3. During a travel, such as walking, of the robot 1, desired motions of the two feet 22R and 22L can be accomplished by driving 6*2=12 joints of the two legs 2, 2 together ("*" in the present description denotes multiplication as scalar calculation, while it denotes an outer product in vector calculation) at appropriate angles. This arrangement enables the robot 1 to arbitrarily move in a three-dimensional space. Furthermore, each arm 5 can perform a motion, such as arm swinging, by rotating its shoulder joint, the elbow joint, and the wrist joint.

As shown in FIG. 1, a publicly known six-axis force sensor 50 is provided between the ankle joints 18R (L), 20R (L) and the foot 22R (L) of each leg 2. The six-axis force sensor 50 detects primarily whether the foot 22R (L) of each leg 2 is in contact with the ground, and a floor reaction force (landing load) acting on each leg 2, and it outputs detection signals of three-direction components Fx, Fy, and Fz of a translational force of the floor reaction force and three-direction components Mx, My, and Mz of a moment to the control unit 60. Furthermore, the body 3 is equipped with a posture sensor 54 for detecting an inclination angle of the body 3 relative to a Z-axis (vertical direction (gravitational direction)) and an angular velocity thereof, and a rotational angle (yaw angle) of the body 3 about the Z-axis and an angular velocity thereof, detection signals thereof being output from the posture sensor 54 to the control unit 60. The posture sensor 54 is provided with a three-axis direction accelerometer and a three-axis direction gyro sensor, which are not shown. These detection signals of these sensors are used to detect posture angles (an inclination angle and a yaw angle) of the body 3 and an angular velocity thereof, and also used to estimate a self position/posture of the robot 1. Although detailed structures are not shown, each joint of the robot 1 is provided with an electric motor 64 (refer to FIG. 3) for driving the joint, and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) is provided at an appropriate position of the robot 1. The joystick 73 is constructed in such a manner that a request regarding a gait of the robot 1, such as a request for turning the robot 1 that is traveling straight, is input to the control unit 60 as necessary by operating the joystick 73.

Figure 2:
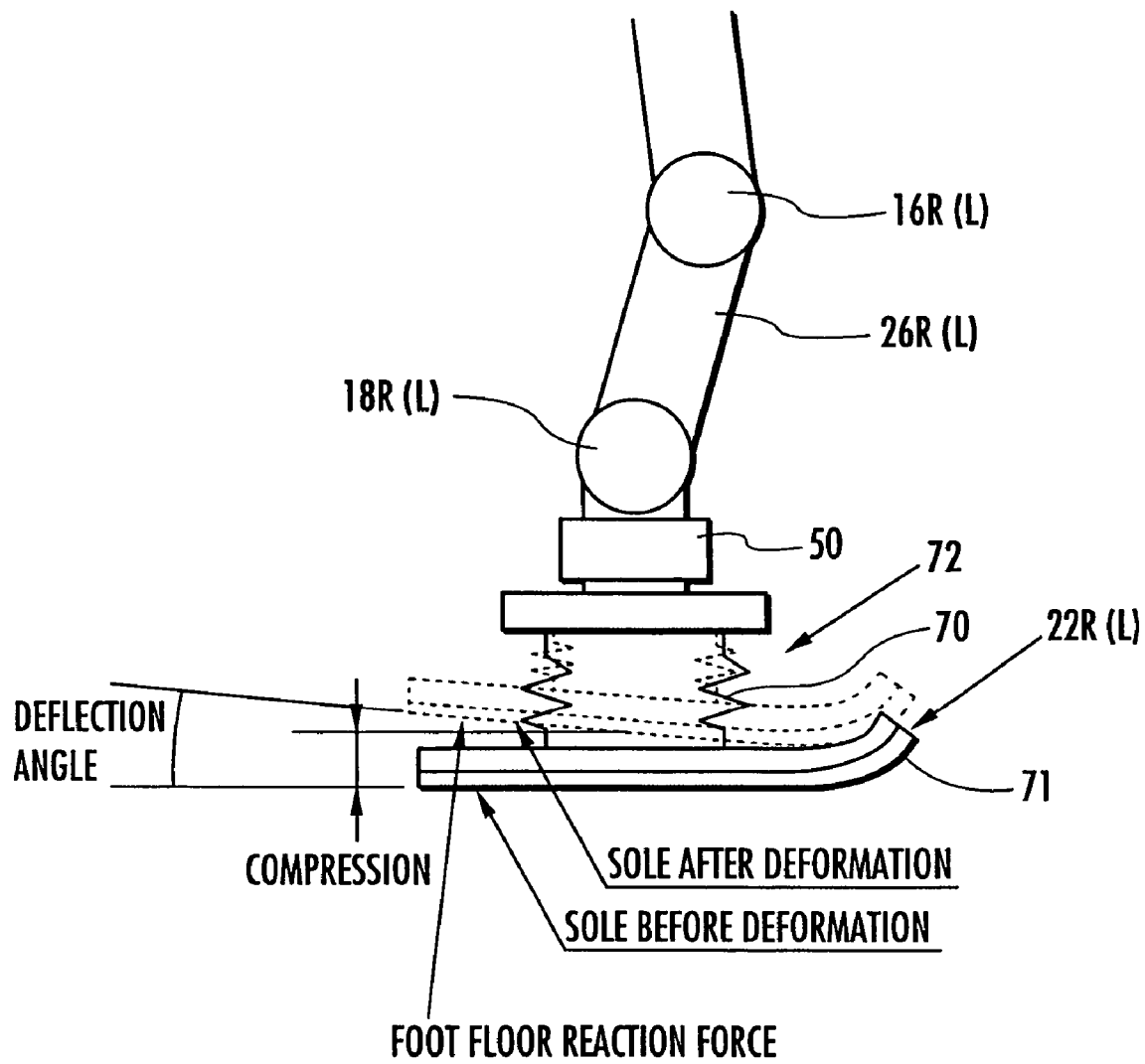
FIG. 2 is a diagram showing a structure of a distal portion of a leg of the robot shown in FIG. 1.

FIG. 2 is a diagram schematically showing a basic construction of a distal portion (including each foot 22R (L)) of each leg 2 in the embodiment. As shown in the diagram, a spring mechanism 70 is installed between each foot 22R (L) and the six-axis force sensor 50, and a foot sole elastic member 71 made of rubber or the like is bonded to a foot sole (the bottom surface of each foot 22R (L)). These spring mechanism 70 and the foot sole elastic member 71 constitute a compliance mechanism 72. The spring mechanism 70, which will be discussed in detail later, is constructed of a square guide member (not shown), which is installed on the upper surface of the foot 22R (L), and a piston-shaped member (not shown) installed adjacently to the ankle joint 18R (L) (the ankle joint 20R (L) being omitted in FIG. 2) and the six-axis force sensor 50, and housed in the guide member through the intermediary of an elastic member (rubber or spring) so that it may be jogged.

The foot 22R (L) indicated by a solid line shown in FIG. 2 is in a state where it is subjected to no floor reaction force. When each leg 2 is subjected to a floor reaction force, the spring mechanism 70 and the foot sole elastic member 71 of the compliance mechanism 72 flex, causing the foot 22R (L) to shift to the position/posture illustrated by a dashed line in the figure. The structure of the compliance mechanism 72 is important not only to ease a landing impact but also to enhance controllability, as explained in detail in, for example, Japanese Unexamined Patent Publication Application No. 5-305584 previously proposed by the present applicant.

Figure 3:
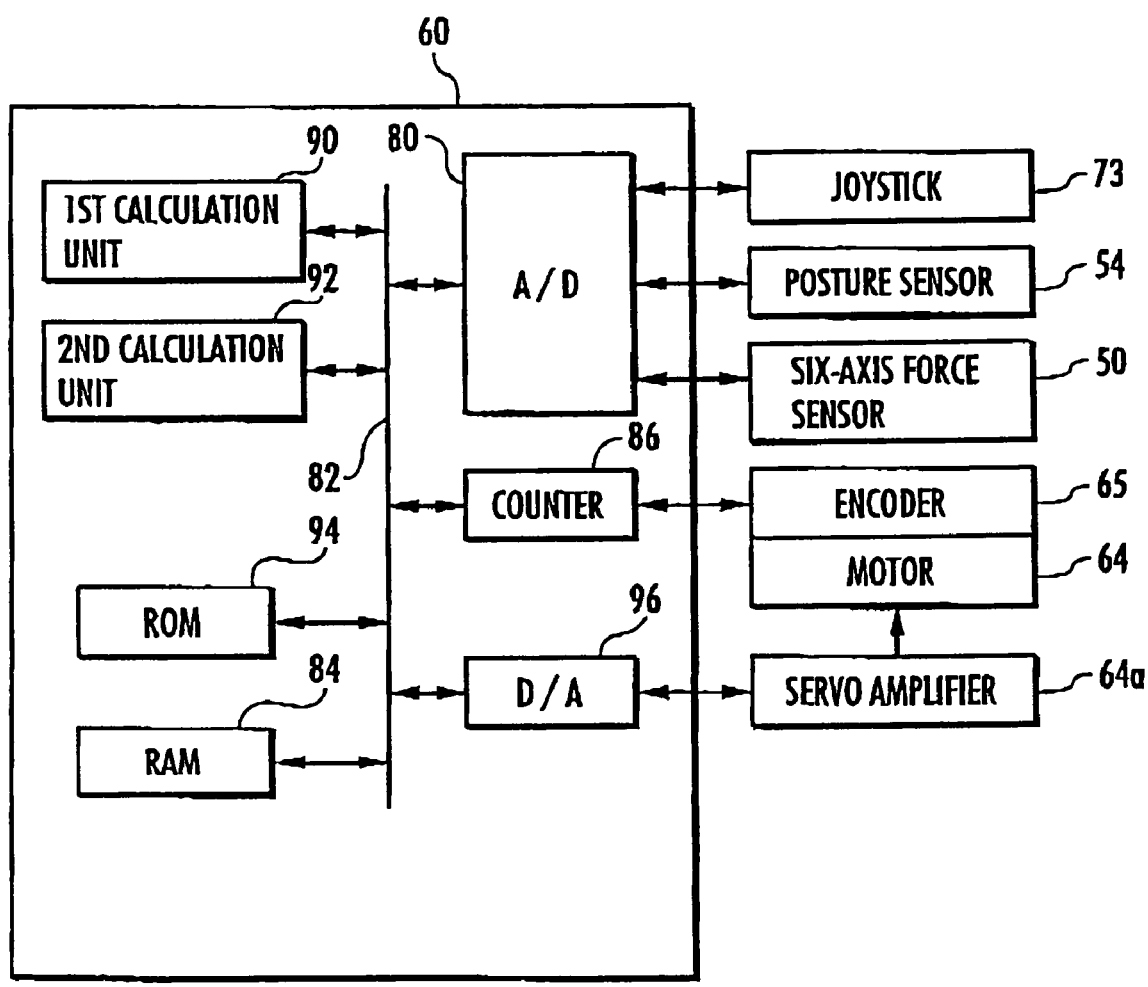
FIG. 3 is a block diagram showing a construction of a control unit provided in the robot shown in FIG. 1.

FIG. 3 is a block diagram showing a construction of the control unit 60. The control unit 60 is comprised of a microcomputer, and includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are supplied to the RAM 84 via the counter 86.

As will be discussed hereinafter, the first calculator 90 generates desired gaits, calculates a joint angle displacement command (a command value of a displacement angle of each joint or a rotational angle of each electric motor 64), and sends the calculation result to the RAM 84. The second calculator 92 reads the joint angle displacement command and an actual measurement value of a joint angle detected on the basis of an output signal of the encoder 65 from the RAM 84 to calculate a manipulated variable required for driving each joint, and outputs the calculated variable to the electric motor 64 for driving each joint through the intermediary of the D/A converter 96 and a servo amplifier 64a.

Figure 4:
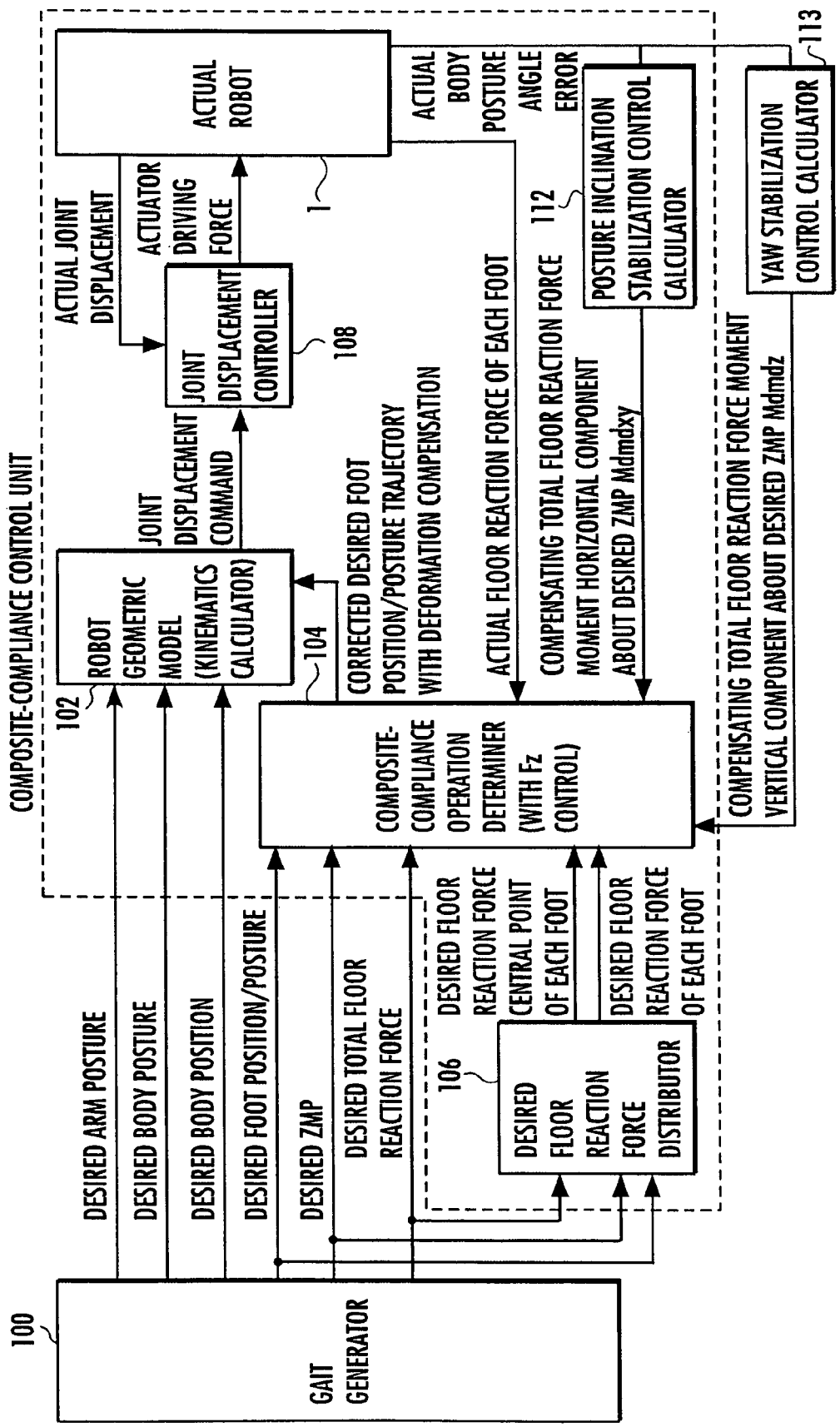
FIG. 4 is a block diagram showing a functional construction of the control unit.

FIG. 4 is a block diagram showing the entire functional construction of a control device of the legged mobile robot in accordance with the embodiment. A portion except for the "actual robot" in FIG. 4 is constituted by processing functions implemented by the control unit 60 (primarily the functions of the first calculator 90 and the second calculator 92). In the following explanation, the symbols R and L will be omitted as long as it is not particularly necessary to discriminate right and left of the legs 2 and the arms 5.

The explanation will now be given. The control unit 60 is equipped with a gait generating device 100 for generating desired gaits of the robot 1 freely in real time and outputting them. The functions of the gait generating device 100 constitute individual means of the present invention. A desired gait output by the gait generating device 100 is constituted of a desired body position/posture trajectory (trajectory of a desired position and a desired posture of the body 3), a desired foot position/posture trajectory (trajectory of a desired position and a desired posture of each foot 22), a desired arm posture trajectory (trajectory of a desired posture of each arm 5), a desired total floor reaction force central point (desired ZMP) trajectory, and a desired total floor reaction force trajectory. If a movable part relative to the body 3 is provided in addition to the legs 2 and the arms 5, then a desired position/posture trajectory of the movable part is added to the desired gait.

Here, the term "trajectory" in the above gait means a temporal change pattern (time series pattern), and may be referred to as "pattern" in place of "trajectory" in the following explanation. Furthermore, a "posture" means a spatial orientation. Specifically, for example, a posture of a body is represented by an inclination angle of the body 3 in the roll direction (about the X-axis) relative to the Z-axis (vertical axis), an inclination angle of the body 3 in the pitch direction (about the Y-axis), and a rotational angle (yaw angle) of the body 3 in the yaw direction (about the Z-axis). A foot posture is represented by means of a spatial azimuth of two axes fixedly set on each foot 22. In the present description, a body posture may be referred to as a body posture angle.

In the following explanation, the term "desired" will be frequently omitted when there is no danger of misunderstanding. Furthermore, among gaits, those gaits related to constituent elements other than those related to a floor reaction force, that is, the gaits related to motions of the robot 1, such as a foot position/posture and a body position/posture, will be collectively referred to as "motion." A floor reaction force (floor reaction force comprised of a translational force and a moment) acting on each foot 22 is referred to as "each-foot floor reaction force", and a resultant force of the "each-foot floor reaction forces" of all (two) feet 22R and 22L of the robot 1 will be referred to as a "total floor reaction force". In the following explanation, however, each-foot floor reaction force will hardly be referred to, so that "floor reaction force" will be handled as having the same meaning as "total floor reaction force" unless otherwise specified.

A desired floor reaction force is generally expressed by a point of action and a translational force and the moment acting on the point. The point of action may be set at any location, so that innumerable expressions are possible for the same desired floor reaction force. If, however, a desired floor reaction force is expressed using especially a desired floor reaction force central point (a desired position of the central point of a total floor reaction force) as the point of action, then the moment component of the desired floor reaction force will be zero except for a vertical component (the moment about the vertical axis (Z-axis)). In other words, the horizontal component of the moment of the desired floor reaction force about the desired floor reaction force central point (the moment about the horizontal axis (the X-axis and the Y-axis)) will be zero.

In the case of a gait that satisfies dynamic balance conditions, a ZMP calculated from a desired motion trajectory of the robot 1 (a point at which the moment of a resultant force of an inertial force and gravity calculated from the desired motion trajectory acts about the point becomes zero except for a vertical component) agrees with a desired floor reaction force central point. Therefore, providing a desired ZMP trajectory may be regarded as equivalent to providing a desired floor reaction force central point trajectory (refer to, for example, PCT Kokai publication WO/02/40224 by the present applicant, for more detail).

From the background described above, in the description of PCT Kokai publication WO/02/40224, a desired gait has been defined as follows.

a) In a broad sense, a desired gait is a combination of a desired motion trajectory and a desired floor reaction force trajectory thereof in a period of one step or a plurality of steps.
b) In a narrow sense, a desired gait is a combination of a desired motion trajectory and a ZMP trajectory thereof in a period of one step.
c) A series of gaits is formed of several gaits that are connected.

In walking, once a vertical position of the body 3 of the robot 1 (a height of the body) is determined by a body height determining technique proposed previously in Japanese Unexamined Patent Application Publication No. 10-86080 by the present applicant, a translational floor reaction force vertical component is subordinately determined. Furthermore, a translational floor reaction force horizontal component is also determined by determining the horizontal body position trajectory of the robot 1 such that the horizontal component of the moment produced about a desired ZMP by a resultant force of the inertial force and the gravity generated by the motion of a desired gait becomes zero. For this reason, a desired ZMP alone has been adequate as a physical amount to be explicitly set for the floor reaction force of a desired gait in the description of PCT Kokai publication WO/02/40224. Thus, the definition in the above b) has been adequate as the definition of a desired gait in the narrow sense. However, in the running gait of the robot 1 explained in the embodiment (the details will be described hereinafter), a floor reaction force vertical component (a translational floor reaction force vertical component) is also important for control. In the present invention, therefore, a desired trajectory of the floor reaction force vertical component is explicitly set, and then a trajectory of a desired vertical body position or the like of the robot 1 is determined. Hence, in the present description, the following b') will be adopted as the definition of a desired gait in a narrow sense. b') A desired gait in a narrow sense is a combination of a desired motion trajectory and a desired ZMP trajectory thereof, and a desired translational floor reaction force vertical component trajectory in a one-step period.

In the present description, a desired gait used hereinafter will mean the desired gait in the narrow sense of the above b') unless otherwise specified for the purpose of easy understanding. In this case, "one step" of a desired gait will mean a period from the moment one leg 2 of the robot 1 touches the ground to the moment the other leg 2 touches the ground. Supplementally, in the embodiment, a desired gait is used to mean a gait for one-step period. This, however, does not have to be necessarily the one-step period; it may alternatively be a period for a plurality of steps or a period that is shorter than one step (e.g., a half step). In the following explanation, "floor reaction force vertical component" will mean "translational floor reaction force vertical component," and the term "moment" will be used for the vertical component (the component about the vertical axis) of a moment of a floor reaction force so as to distinguish it from the "floor reaction force vertical component." Similarly, "floor reaction force horizontal component" will mean "translational floor reaction force horizontal component."

Needless to say, a double stance period in a gait refers to a period during which the robot 1 supports its own weight by the two legs 2, 2. A single stance period refers to a period during which the robot 1 supports its own weight only by one leg 2, and a floating period refers to a period during which both legs 2, 2 are apart from a floor (floating in the air). In the single stance period, the leg 2 not supporting the self-weight of the robot 1 is referred to as a "free leg." The running gait explained in the present embodiment does not have the double stance period, but alternately repeats the single stance period (landing period) and the floating period. In this case, during the floating period, both legs 2, 2 do not support the self-weight of the robot 1; however, the leg 2 that was a free leg and the leg 2 that was a supporting leg during a single stance period immediately before the floating period will be referred to as a "free leg" and a "supporting leg," respectively, even in the floating period.

Taking the running gait shown in FIG. 5 as an example, an outline of a desired gait generated by the gait generating device 100 will be explained. More definitions and details related to gaits have been given also in Japanese Unexamined Patent Application Publication No. 10-86081 previously proposed by the present applicant, so that the following will mainly give a description not covered by the Japanese Unexamined Patent Application Publication No. 10-86081.

First, the running gait shown in FIG. 5 will be explained. This running gait is a gait similar to a typical human running gait. In this running gait, the single stance period in which the foot 22 of only either the right or left leg 2 (supporting leg) of the robot 1 lands (contacts the ground) and a floating period in which both the legs 2, 2 float in the air are alternately repeated. In FIG. 5, the first state illustrates a state wherein a single stance period has begun (initial stage), the second state illustrates a state of a midpoint of the single stance period, the third state illustrates a state wherein a floating period following the single stance period has begun (an end of the single stance period), the fourth state illustrates a state of a midpoint of the floating period, and the fifth state illustrates an end of the floating period (a start of the next single stance period).

Figure 5:
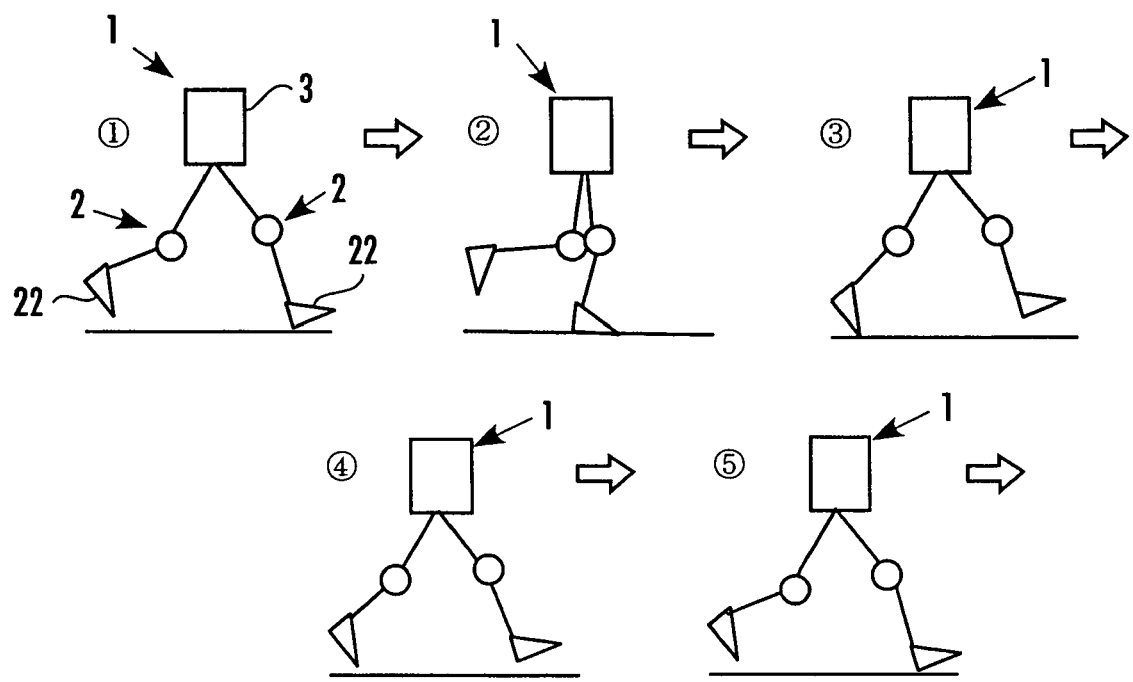
FIG. 5 is a diagram for explaining a running gait generated in the embodiment.

In this running gait, the robot 1 lands at the heel of the foot 22 of the supporting leg (the leg 2 on the front side in the advancing direction of the robot 1) at the beginning of the single stance period, as shown in the first state of FIG. 5. Subsequently, the robot 1 brings substantially the entire surface of the sole of the landed foot 22 (the foot 22 of the supporting leg) into contact with the ground as shown in the second state of FIG. 5, and then kicks the floor with the tiptoe of the foot 22 (the foot 22 of the leg 2 on the rear side with respect to the advancing direction of the robot 1 in the third state of FIG. 5) of the supporting leg to jump into the air, as shown in the third state of FIG. 5. This ends the single stance period and starts the floating period at the same time. The free leg in the single stance period exists behind the supporting leg at the beginning of the single stance period, as shown in the first state of FIG. 5, but swung out to the front of the supporting leg toward the next predetermined landing position, as shown in the second and the third states of FIG. 5. Next, following the floating period shown in the fourth state of FIG. 5, the robot 1 lands at the heel of the foot 22 of the free leg (the leg 2 that was the free leg in the single stance period immediately before the floating period started), and the next single stance period is begun.

Considering the running gait shown in FIG. 5, a basic outline of a desired gait generated by the gait generating device 100 will be explained. Although more details will be discussed later, when the gait generating device 100 generates a desired gait, basic required values (required parameters) for generating the desired gait, such as a landing position/posture (expected landing position/posture) of the foot 22 of a free leg and a landing time (expected landing time), are supplied to the gait generating device 100 according to a required operation or the like of the joystick 73. The gait generating device 100 then generates the desired gait using the required parameters. More detailedly, the gait generating device 100 determines parameters (referred to as gait parameters) that specify some constituent elements of the desired gait, such as a desired foot position/posture trajectory and a desired floor reaction force vertical component trajectory of the desired gait, on the basis of the above required parameters, and then sequentially determines instantaneous values of the desired gait by using the gait parameters so as to generate a time series pattern of the desired gait.

In this case, a desired foot position/posture trajectory (to be more specific, a desired trajectory of each spatial component (X-axis component or the like) of the position and the posture of a foot) is generated for each foot 22 by using a finite-duration setting filter proposed in U.S. Pat. No. 3,233,450 by the present applicant. This finite-duration setting filter includes a plurality of stages (3 stages or more in the present embodiment) of first-order lag filters of variable time constants, that is, filters represented in terms of a transfer function of $1/(1+\tau s)$ ($\tau$ is a variable time constant. Hereinafter, the filter will be referred to as a unit filter), the plurality of stages of the filters being connected in series. This arrangement makes it possible to generate and output a trajectory that reaches a specified value at desired specified time. In this case, time constant $\tau$ of the unit filter of each stage is always variably set in sequence according to remaining time until the above specified time after starting the generation of an output of the finite-duration setting filter. More specifically, the setting is made such that, the value of $\tau$ is decreased from a predetermined initial value ($>0$) as the remaining time reduces, and the value of $\tau$ finally reaches zero at the specified time at which the remaining time reaches zero. A step input of a height based on the specified value (more specifically, a change amount from an initial value to the specified value of an output of the finite-duration setting filter) is supplied to the finite-duration setting filter. The finite-duration setting filter not only generates an output that reaches a specified value at specified time but also makes it possible to set a changing rate of an output of the finite-duration setting filter at specified time to zero or substantially zero. Especially when three stages or more (3 stages will do) of the unit filter are connected, the changing acceleration (a differential value of a changing rate) of an output of the finite-duration setting filter can be reduced to zero or substantially zero.

The desired foot position/posture trajectory generated by the finite-duration setting filter as described above is the desired position/posture trajectory of each foot 22 on a supporting leg coordinate system, which is fixed on a floor surface and which is to be discussed later.

The desired foot position/posture trajectory generated as described above is generated such that the position of each foot 22 begins moving, while gradually accelerating from the initial in-contact-with-the-ground state (the state at the initial time of a desired gait) toward an expected landing position. Further, the desired foot position/posture trajectory is generated such that the changing rate of the position is gradually decelerated to zero or substantially zero until the expected landing time is finally reached, and the expected landing position is reached at the expected landing time at which the trajectory comes to its end. Hence, the ground speed at the moment each foot 22 lands becomes zero or substantially zero (the changing rate of the position of each foot 22 on the supporting leg coordinate system secured to a floor). Accordingly, a landing impact will be low even when the robot 1 lands from the state wherein all legs 2, 2 are simultaneously present in the air (the state in the floating period) in a running gait.

In the aforesaid running gait, the vertical velocity of the body 3 switches downward from the latter half of the floating period due to the gravity acting on the robot 1, and remains downward even at the time of landing. Therefore, if the desired foot position/posture trajectory is generated such that the ground speed at the moment each foot 22 lands reaches zero or substantially zero, as described above, and if the desired position/posture trajectory of the body 3 is generated to satisfy a dynamic balance condition, as will be discussed later, then the relative velocity of the foot 22 of a free leg with respect to the body 3 switches upward immediately before landing. This means that, at a landing moment of a running gait, the desired gait of the robot 1 is such that the robot 1 lands while withdrawing the leg 22 that is a free leg toward the body 3. In other words, according to the desired gait in the present embodiment, the robot 1 lands while pulling the foot 22 up, as observed from the body 3, so that the ground speed of the foot 22 of the free leg reaches zero or substantially zero. This restrains a landing impact to prevent the landing impact from becoming excessive.

Furthermore, in the present embodiment, the finite-duration setting filter is composed of three stages of more (e.g., three stages) of the unit filters connected in series, so that the velocity of each foot 22 (the changing rate of a foot position) reaches zero or substantially zero by expected landing time and the acceleration of each foot 22 also reaches zero or substantially zero at the expected landing time when the foot 22 stops. This means that the ground acceleration also becomes zero or substantially zero at the landing instant. Hence, the landing impact will be further restrained. Especially, even if actual landing time of the robot 1 deviates from desired landing time, the impact no longer increases much. Supplementally, the number of stages of the unit filters of the finite-duration setting filter may be two to make setting so that the ground speed of each foot 22 reaches zero or substantially zero at expected landing time. In this case, however, the acceleration of each foot 22 at expected landing time does not usually become zero.

Regarding a foot posture, after each foot 22 lands at its heel at expected landing time, the foot continues to move until substantially the entire sole of the foot 22 comes in contact with a floor. For this reason, the foot posture trajectory is generated by the finite-duration setting filter, setting the time at which substantially the entire sole of the foot 22 comes in contact with the floor to the above specified time.

In the present embodiment, the foot position trajectory has been generated using the finite-duration setting filter. Alternatively, however, a desired foot position trajectory may be generated using a function, such as a polynomial, that is set such that the changing rate of a foot position at expected landing time (a time differential value of a foot position) reaches zero or substantially zero and further the changing acceleration of the foot position at the expected landing time (a time differential value of the changing rate) reaches zero or substantially zero. This applies also to the generation of a desired foot posture trajectory. However, regarding the generation of the desired foot posture trajectory, a function, such as a polynomial, is set such that the changing rate of the posture of each foot 22 and the changing acceleration thereof reaches zero or substantially zero at the time when substantially the entire sole of each foot 22 comes in contact with a floor, as described above.

A desired floor reaction force vertical component trajectory is set as shown in, for example, FIG. 6. In the present embodiment, the shape of a desired floor reaction force vertical component trajectory in a running gait (strictly speaking, the shape in a single stance period) is specified to be trapezoidal (a shape projecting to an increasing side of a floor reaction force vertical component). The height of the trapezoid and the time of a bending point are regarded as gait parameters defining a desired floor reaction force vertical component trajectory in determining the gait parameters (floor reaction force vertical component trajectory parameters). In a floating period of a running gait, the desired floor reaction force vertical component is steadily set to zero. As in the case of the present example, a desired floor reaction force vertical component trajectory is preferably set so that it is virtually continuous (so that values are not discontinuous). This is for ensuring smooth operations of joints of the robot 1 when controlling a floor reaction force. The term "virtually continuous" means that a skipped value that inevitably takes place when a trajectory that is continuous in an analog fashion (a continuous trajectory in a true meaning) is digitally expressed by a discrete-time system does not cause the continuity of the trajectory to be lost.

A desired ZMP trajectory is set as follows. In the running gait shown in FIG. 5, as described above, the robot 1 lands at the heel of the foot 22 of a supporting leg, and then kicks at the tiptoe of the foot 22 of the supporting leg to jump into the air. Lastly, the robot 1 lands at the heel of the foot 22 of a free leg, as described above. Therefore, as shown in the upper diagram of FIG. 7, the desired ZMP trajectory in the single stance period is set such that it takes the heel of the foot 22 of the supporting leg as its initial position, and then extends to the center in the longitudinal direction of the foot 22 in the period in which substantially the entire sole of the foot 22 of the supporting leg comes in contact with the ground, and thereafter, reaches the tiptoe of the foot 22 of the supporting leg by floor leaving time. Here, the upper diagram of FIG. 7 shows a desired ZMP trajectory in an X-axis direction (longitudinal direction), while a lower diagram of FIG. 7 shows a desired ZMP trajectory in a Y-axis direction (lateral direction). The desired ZMP trajectory in the Y-axis direction in a single stance period is set at the same position as the central position of an ankle joint of a supporting leg 2 in the Y-axis direction, as shown in the lower diagram of FIG. 7.

In a running gait, after a single stance period ends, both legs 2, 2 leave a floor, and the floor reaction force vertical component becomes zero. When the floor reaction force vertical component is zero, that is, during a floating period, the total center of gravity of the robot 1 is subject to free fall motion, and an angular momentum change about the total center of gravity is zero. At this time, the moment of a resultant force of gravity and an inertial force that acts on the robot 1 is zero at an arbitrary point of a floor, so that a desired ZMP is indefinite. This means that any point of the floor satisfies a condition of ZMP represented by "a point of action at which the horizontal component of the moment, in which a resultant force of gravity and an inertial force acts, is zero." In other words, setting the desired ZMP at an arbitrary point satisfies a dynamic balance condition in that the horizontal component of the moment in which the above resultant force acts about the desired ZMP is zero. Hence, the desired ZMP may be set discontinuously. For example, the desired ZMP may be set so that it does not move from a desired ZMP position when leaving a floor (when a single stance period ends) in a floating period, and it moves discontinuously (in steps) to a desired ZMP position for landing at the end of the floating period. In the present embodiment, however, the position of the desired ZMP trajectory in the X-axis direction in a floating period has been set so as to continuously move to the landing position of the heel of the foot 22 of a free leg from the tiptoe of the foot 22 of a supporting leg by the time the next free leg 2 lands, as shown in the upper diagram of FIG. 7. Further, as shown in the lower diagram of FIG. 7, the position of the desired ZMP trajectory in the Y-axis direction in a floating period has been set so as to continuously move to the Y-axis directional position of the center of the ankle joint of a free leg 2 from the Y-axis directional position of the center of the ankle joint of a supporting leg 2 by the time the next free leg 2 lands. In other words, the desired ZMP trajectory has been set so that it is continuous (virtually continuous) in all periods of a gait. As it will be discussed hereinafter, a desired gait has been generated so that a moment of the resultant force of gravity and an inertial force (excluding a vertical component) about the desired ZMP becomes zero (to be more specific, a desired body position/posture trajectory has been adjusted). Taking an approximation error into account, the desired ZMP trajectory is desirably set to be continuous (virtually continuous) also in a floating period in order to ensure a smooth generated gait. However, a dynamic model, which is used in the present embodiment and which will be discussed later, makes it possible to uniquely generate a desired gait that sets the horizontal component of a moment about a desired ZMP to zero independently of the position of a desired ZMP. Therefore, the desired ZMP does not have to be always continuous.

In the present embodiment, the positions and time of the bending points of the desired ZMP trajectory as shown in FIG. 7 are set as ZMP trajectory parameters (parameters defining the desired ZMP trajectory). The meaning of "virtually continuous" of the aforementioned ZMP trajectory is the same as that in the case of the above floor reaction force vertical component trajectory.

The ZMP trajectory parameters are determined such that a high stability margin is secured and no sudden change takes place. Here, a state in which a desired ZMP exists near the center of a least convex polygon (so-called supporting polygon) that includes a ground contact surface of the robot 1 indicates a high stability margin (refer to Japanese Unexamined Patent Application Publication No. 10-86081 for more detail). The desired ZMP trajectory shown in FIG. 7 has been set to meet such a condition.

A desired body position/posture, a desired foot position/posture, and a reference body posture, which will be discussed hereinafter, are described in terms of a global coordinate system. The global coordinate system is a coordinate system fixed to a floor. More specifically, a supporting leg coordinate system to be discussed hereinafter is used as the global coordinate system.

In the present embodiment, the gait generating device 100 generates a reference body posture in addition to a desired body posture. The reference body posture is a body posture generated directly on the basis of requests regarding a gait (requests from a unit, such as an action scheduler, or from an external source (the joystick 73 or the like) sent to the gait generating device 100).

A desired body posture (representing hereinafter a desired body posture unless "reference" is added) is generated such that it follows or agrees with a reference body posture in a long term.

In walking, generally, a desired body posture may be always set to agree with a reference body posture as in the case of an embodiment disclosed in the description of PCT Kokai publication WO/02/40224. Although the PCT Kokai publication WO/02/40224 does not refer to the concept of a reference body posture, it explicitly and preferentially gives desired body posture patterns, which is equivalent to steady agreement of desired body postures with reference body postures.

However, in a gait including a floating period, as in running, or walking on a low-friction floor surface, simply adjusting a horizontal body acceleration or the like is not enough to satisfy a dynamic balance condition while maintaining a floor reaction force horizontal component and a floor reaction force vertical component of a desired gait within a permissible range (or within a friction limit) at the same time.

In the present embodiment, therefore, a desired body posture is deliberately deviated from a reference body posture, as necessary. To be more specific, motion modes explained below are generated in a combined manner so as to satisfy the dynamic balance condition while having a floor reaction force horizontal component and a floor reaction force moment vertical component of a desired gait fall within a permissible range (or within a friction limit).

Figure 8:
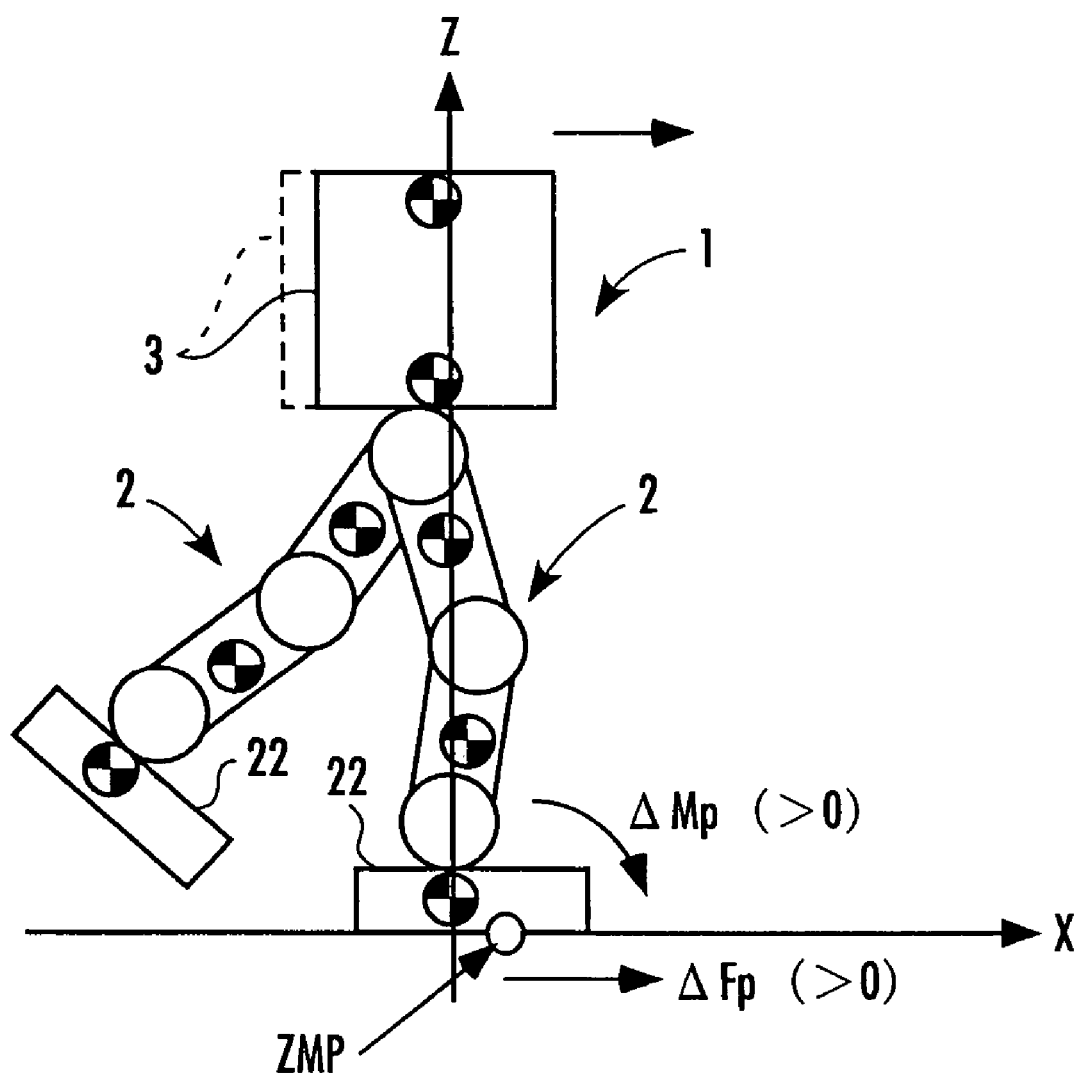
FIG. 8 is a diagram for explaining a body translational mode of a robot.

As shown in FIG. 8, when the robot 1 is in a certain motion state, if only a horizontal body acceleration is perturbated (slightly changed), then a total center-of-gravity horizontal acceleration and an angular momentum about the total center-of-gravity of the robot 1 are perturbated. More specifically, perturbating the horizontal body acceleration perturbates the floor reaction force moment horizontal component about a desired ZMP (a component about the horizontal axis) and the floor reaction force horizontal component without perturbating the floor reaction force vertical component that dynamically balances with a resultant force of an inertial force and gravity of the robot 1 produced by the perturbation of the horizontal body acceleration (without perturbating a total center-of-gravity vertical acceleration of the robot 1). The motion mode that perturbs the horizontal body acceleration of the robot 1 as described above is referred to as a body translational mode.

In other words, a motion in which the floor reaction force moment horizontal component about the desired ZMP and the floor reaction force horizontal component are changed without changing the floor reaction force vertical component is referred to as the body translational mode. In the body translational mode, the floor reaction force moment vertical component (the component about the vertical axis) is also perturbated; however, no attention will be paid to this aspect in this case.

A change in the floor reaction force moment horizontal component per unit acceleration at this time is denoted by $\Delta Mp$ and a change in the floor reaction force horizontal component per unit acceleration is denoted by $\Delta Fp$. If the body 3 is horizontally accelerated forward in the situation illustrated in FIG. 8, then $\Delta Mp$ and $\Delta Fp$ act in the directions of the arrows shown in FIG. 8.

To facilitate perceptual understanding, the floor reaction force that balances with the resultant force of an inertial force and gravity generated by a motion has been used for expression. However, it is theoretically more accurate to express using the resultant force of an inertial force and gravity. The above resultant force and the floor reaction force have the same magnitude but opposite directions.

Figure 9:
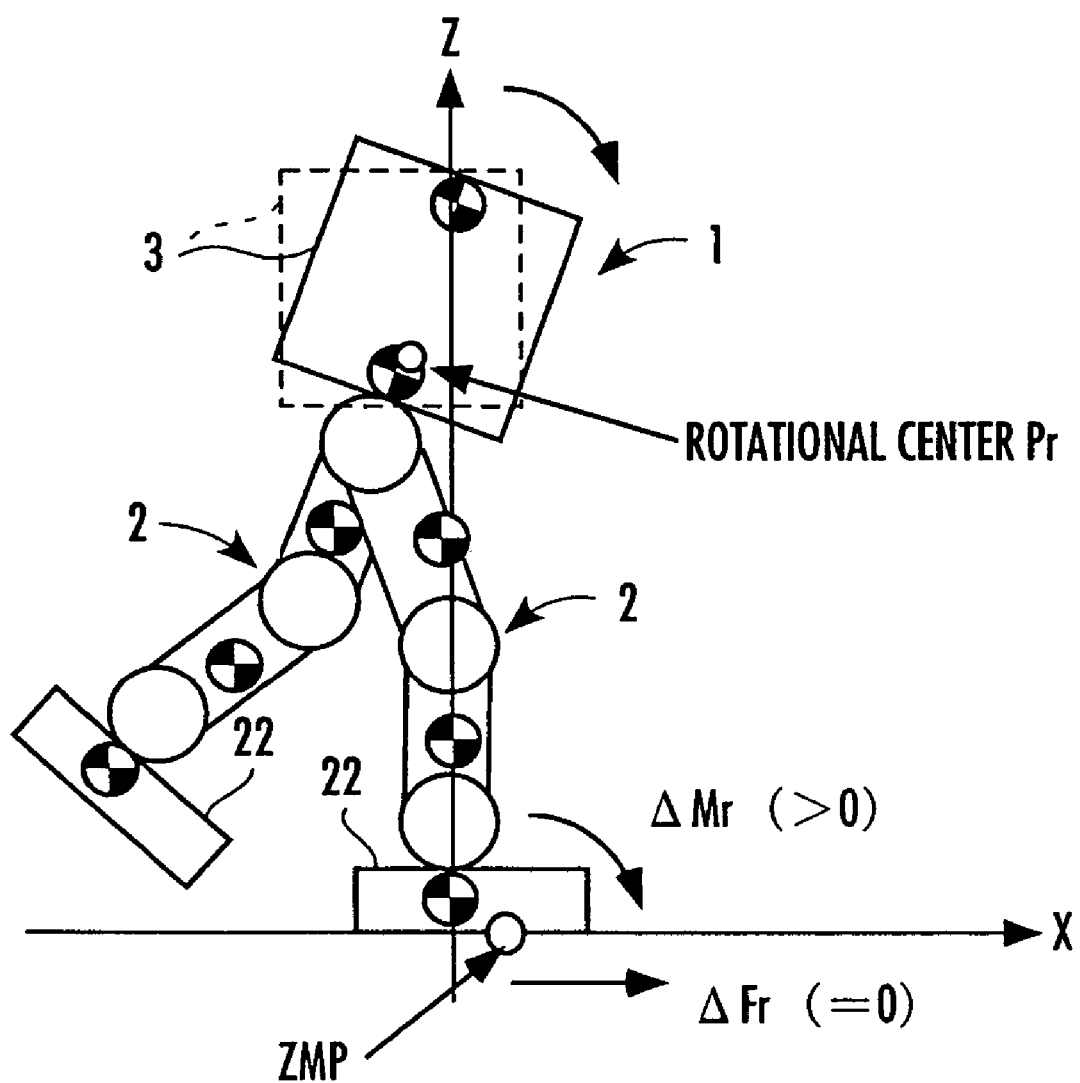
FIG. 9 is a diagram for explaining a body inclination mode of the robot.

In comparison with the above, if the body inclination angular acceleration (the angular acceleration of the inclination angle of the body 3) is perturbated about a certain point Pr from a certain motion state of the robot 1, as shown in FIG. 9, then the angular momentum (excluding the component about the vertical axis) about the total center-of-gravity is perturbated, while the total center-of-gravity of the robot 1 remains unperturbated. This means that perturbating the body inclination angle acceleration about the point Pr perturbates the floor reaction force moment horizontal component about a desired ZMP without perturbating the floor reaction force vertical component and the floor reaction force horizontal component. The motion mode in which the body inclination angle acceleration of the robot 1 is perturbated as described above is referred to as the body inclination mode.

In other words, the motion in which the floor reaction force moment horizontal component about a desired ZMP is changed without changing a floor reaction force vertical component and a floor reaction force horizontal component is referred to as the body inclination mode.

A change in the floor reaction force moment horizontal component per unit angular acceleration at this time is denoted by $\Delta Mr$ and a change in the floor reaction force horizontal component per unit angular acceleration is denoted by $\Delta Fr$. $\Delta Fr$ is zero. If an angular acceleration of a body inclination angle is generated to cause the body 3 to lean forward in the situation shown in FIG. 9, then $\Delta Mr$ acts in the direction of the arrow shown in FIG. 9.

Figure 10:
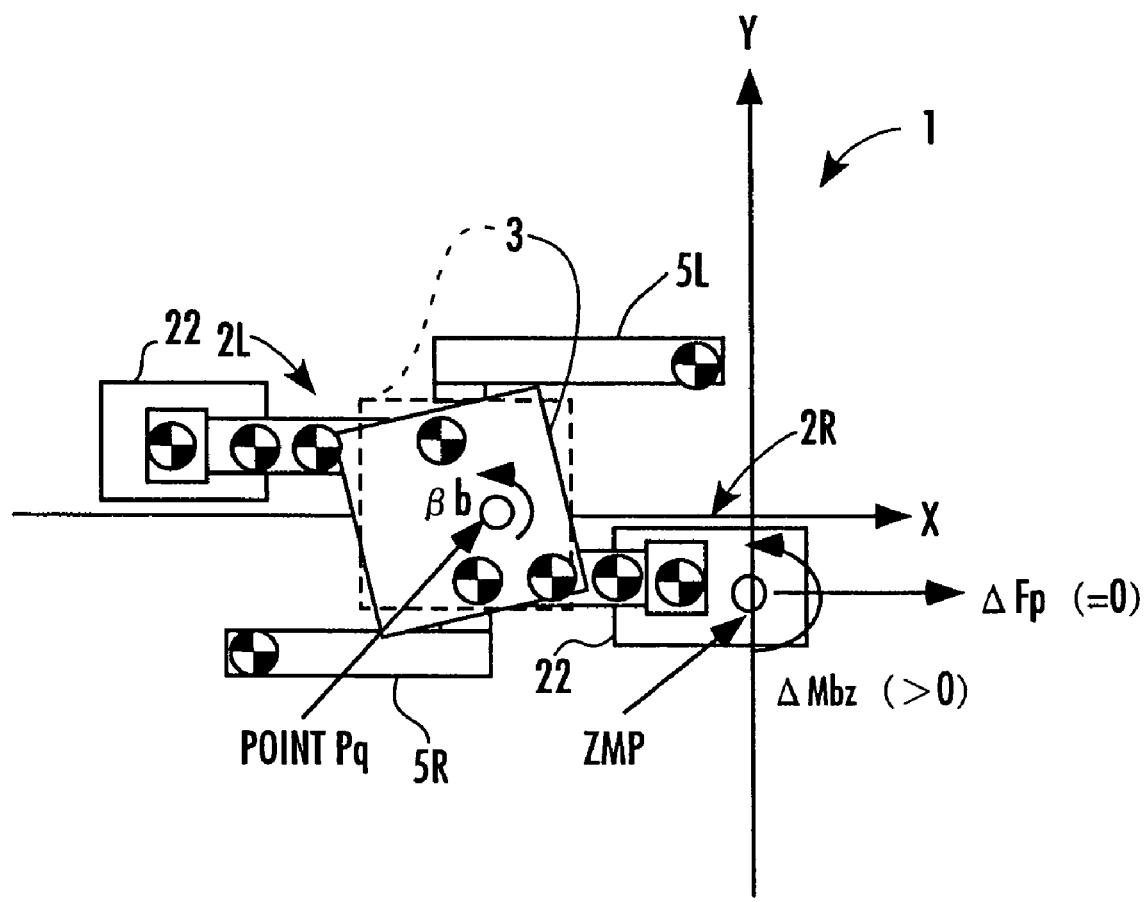
FIG. 10 is a diagram for explaining a body yaw rotation mode of the robot.

Further, if a body yaw angular acceleration (the rotational angular acceleration about the vertical axis of the body 3) is perturbated about a certain point Pq from a certain motion state of the robot 1, as shown in FIG. 10, then the angular momentum vertical component about the total center of gravity is perturbated, while the total center of gravity of the robot 1 remains unperturbated. Incidentally, if the total center of gravity of the robot 1 is not perturbated, then the perturbation of the angular momentum vertical component does not depend on a point of action. Hence, perturbating the body yaw angular acceleration about the point Pq perturbates the floor reaction force moment vertical component about a desired ZMP without perturbating the floor reaction force vertical component, the floor reaction force horizontal component, and the floor reaction force moment horizontal component. The motion mode in which the body yaw angular acceleration of the robot 1 is perturbated as described above is referred to as the body yaw rotation mode.

In other words, the body motion in which the floor reaction force moment vertical component about a desired ZMP is changed without changing a floor reaction force vertical component, a floor reaction force horizontal component, and a floor reaction force moment horizontal component is called the body yaw rotation mode.

A change in the floor reaction force moment vertical component per unit angular acceleration at this time is denoted by $\Delta Mbz$, and a change in the floor reaction force horizontal component per unit angular acceleration is denoted by $\Delta Fb$. $\Delta Fb$ is zero. If the body 3 is rotated in the direction of the arrow at the unit angular acceleration (rotated at an angular acceleration $\beta b=1$) in the situation shown in FIG. 10, then $\Delta Mbz$ acts in the direction of the arrow shown in FIG. 10.

In the motion shown in FIG. 10, the body 3 has been rotated so that the positions of the distal ends of both arms 5, 5 remain unchanged as observed from the supporting leg coordinate system (the coordinate system fixed to a floor). However, a motion in which an arm 5 is rotated together with the body 3 without changing the relative position/posture of the arm 5 in relation to the body 3 may be defined as the body yaw rotation mode. In this case, however, a motion equation to be discussed hereinafter has to be slightly changed.

Figure 11A:
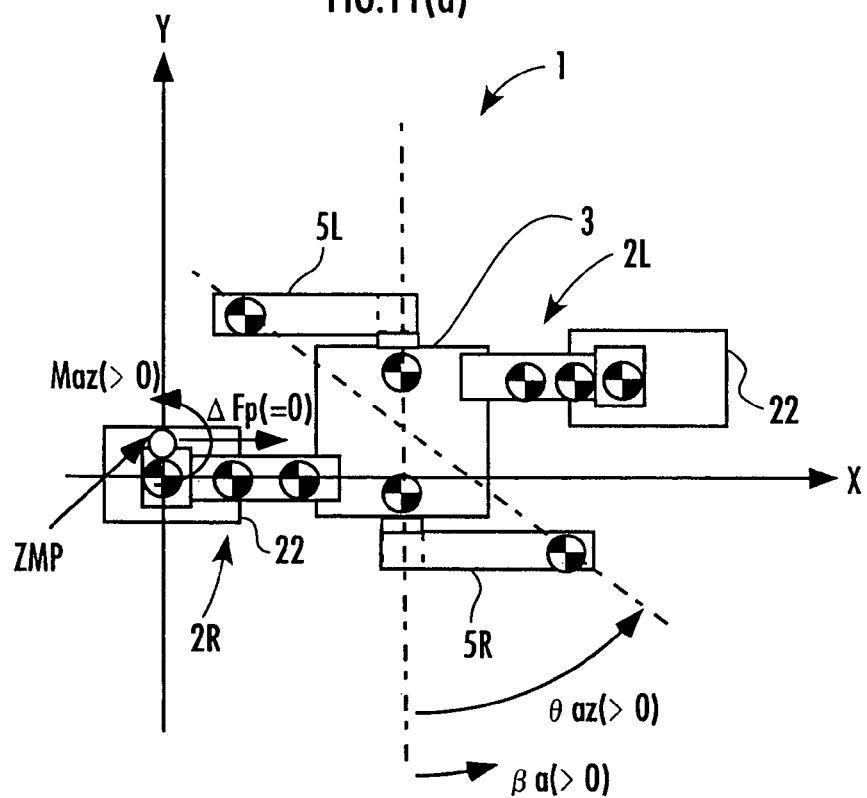
FIG. 11(a) is a diagram for explaining an antiphase arm swing mode of the robot in a plan view and FIG. 11(b) is a diagram for explaining an antiphase arm swing mode of the robot in a side view.
Figure 11B:
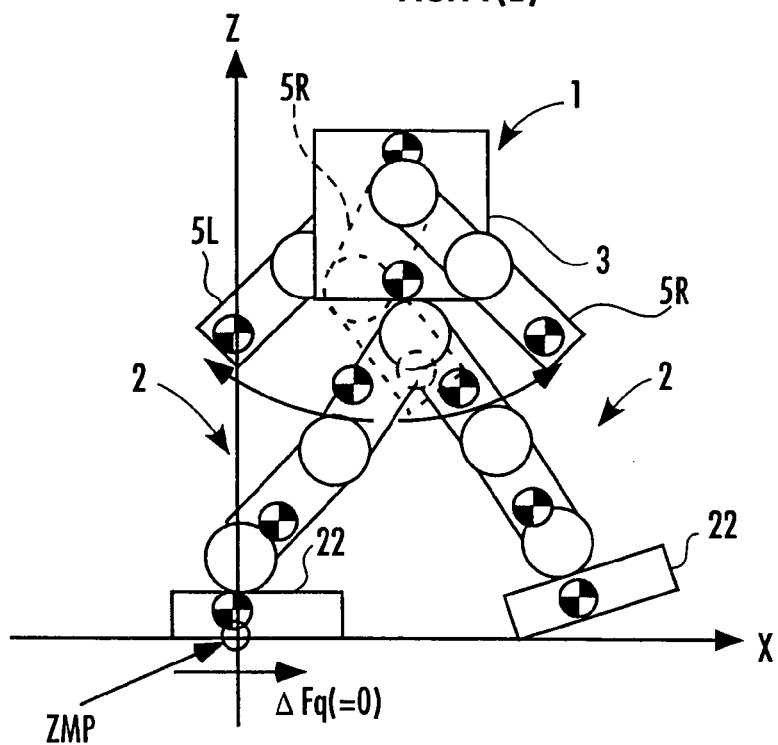

Further, if the distal ends of both arms 5, 5 are perturbated longitudinally in opposite directions from each other from a motion state of the robot 1, as illustrated in FIGS. 11 (a) and (b), then the angular momentum vertical component about the total center of gravity is perturbated, while the total center of gravity of the robot 1 remains unperturbated. Hereinafter, this motion mode will be referred to as an antiphase arm swing mode. In other words, the arm swing motion mode in which the floor reaction force moment vertical component about a desired ZMP is perturbated without perturbating a floor reaction force vertical component, a floor reaction force horizontal component, and a floor reaction force moment horizontal component is referred to as the antiphase arm swing mode.

A motion in which a right arm 5R is moved forward by a unit amount and a left arm 5L is moved backward by a unit amount is referred to as an antiphase arm swing of a unit angle. FIGS. 11 (a) and (b) illustrate a state wherein an antiphase arm swing angle is θaz.

A change in the floor reaction force moment vertical component per unit angular acceleration in the antiphase arm swing mode is denoted by ΔMaz, and a change in the floor reaction force horizontal component per unit angular acceleration is denoted by ΔFa. ΔFa is zero. In the situation shown in FIGS. 11 (a) and (b), if the right arm 5R is accelerated forward, while the left arm 5L is accelerated backward (swinging at an angular acceleration βa>0), then a floor reaction force moment vertical component Maz acts in the direction of the arrow (a positive direction of the vertical axis) shown in FIG. 11 (a).

A description will now be given of a dynamic model of the robot 1 used in the present embodiment. In the present embodiment, a simplified (approximated) dynamic model shown below is used. However, regarding the dynamic model shown below, a kinematics model (a model representing the structures and dimensions of joints and links, i.e., a model representing a relationship between joint displacements and the positions/postures of links) will be also necessary.

Figure 12:
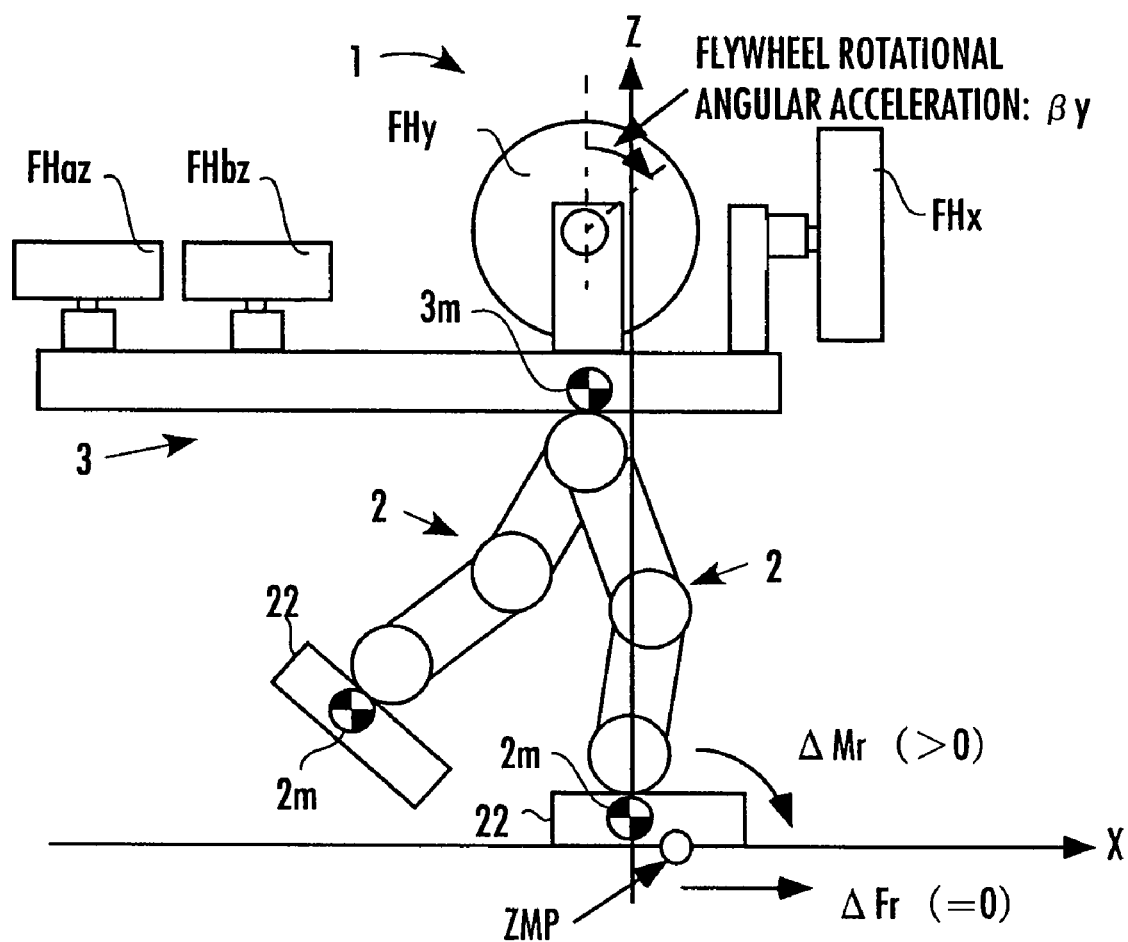
FIG. 12 is a diagram for explaining a dynamic model used in the embodiment.

FIG. 12 shows a dynamic model of the robot 1 used in the present embodiment. As illustrated, the dynamic model is a model composed of a total of three mass points, namely, two mass points 2m, 2m corresponding to the legs 2 of the robot 1 and a mass point 3m corresponding to the body 3, and four flywheels FHx, FHy, FHbz, and FHaz having inertias but no mass. The flywheels FHx, FHy, FHbz, and FHaz can be rotated about an X-axis (longitudinal axis), a Y-axis (lateral axis), a Z-axis (vertical axis), and a Z-axis (vertical axis), respectively. This dynamic model is decoupled, that is, the dynamic model is constructed such that the dynamics (the dynamics of the mass points 2m, 2m) of the legs 2, 2, the dynamics of the body 3 (the dynamics of the mass point 3m and the flywheels FHx, FHy and FHbz), and the dynamics of the arms 5, 5 (the dynamics of the flywheel FHaz) do not interfere with each other, and the dynamics of the entire robot 1 is represented by their linear connection. In addition, a relationship between a motion of the body 3 and a floor reaction force is separated into a relationship between a translational motion of the body 3 (body translation mode) and a floor reaction force, a relationship between an inclination motion of the body 3 (body inclination mode) and a floor reaction force, a relationship between a yaw rotational motion of the body 3 (body yaw rotation mode) and a floor reaction force, and a relationship between an antiphase arm swing motion of both arms 5, 5 (antiphase arm swing mode) and a floor reaction force. To be more specific, a floor reaction force generated by a horizontal motion of the body mass point 3m corresponds to a floor reaction force generated by a horizontal translational motion of the body 3 (body translation mode), and a floor reaction force generated by a rotational motion of the flywheels FHx and FHy corresponds to a floor reaction force generated by a rotational motion of an inclination angle of the body 3 (body inclination mode). The rotational motion of the flywheel FHx corresponds to the rotational motion of an inclination angle of the body 3 in the roll direction (about the X-axis), and the rotational motion of the flywheel FHy corresponds to the rotational motion of an inclination angle of the body 3 in the pitch direction (about the y-axis). A floor reaction force generated by the rotational motion of the flywheel FHbz corresponds to a floor reaction force generated by a yaw rotational motion of the body 3 (the body yaw rotation mode). A floor reaction force generated by the rotational motion of the flywheel FHaz corresponds to a floor reaction force generated by an antiphase arm swing motion (the antiphase arm swing mode).

The mass of the arms of the robot 1 is assumed to be included in the body 3, and the body mass point 3m has a mass that includes the mass of the arms 5, 5.

For the convenience of explanation, variables and parameters related to the dynamic model will be defined as follows. Each of the mass points 2m, 2m and 3m corresponds to a representative point of a part with which it is associated or a point uniquely decided geometrically from the position/posture of the part. For instance, the position of the mass point 2m of a supporting leg 2 is defined as the point above the aforesaid representative point of the sole of the foot 22 of the leg 2 by a predetermined distance.

Zsup: Supporting leg mass point vertical position
Zswg: Free leg mass point vertical position
Zb: Body mass point vertical position (usually different from a vertical body position)
ZGtotal: Overall center-of-gravity vertical position
Xsup: Supporting leg mass point X position
Ysup: Supporting leg mass point Y position
Xswg: Free leg mass point X position
Yswg: Free leg mass point Y position
Xb: Body mass point X position (The body mass point position is the position offset by a predetermined distance in the longitudinal direction of the body from the aforesaid point Pr. The offset is determined such that the center-of-gravity position of an exact model and the center-of-gravity position of the present dynamic model agree with each other as much as possible in an upright stance or the like. This is usually different from a horizontal body position.)
Yb: Body mass point Y position
XGtotal: Overall center-of-gravity horizontal X position
YGtotal: Overall center-of-gravity horizontal Y position
θbx: Body inclination angle about X-axis relative to vertical direction
θby: Body inclination angle about Y-axis relative to vertical direction
θbz: Body yaw rotational angle
θaz: Antiphase arm swing angle
mb: Body mass point mass
msup: Supporting leg mass point mass
mswg: Free leg mass point mass
mtotal: Total mass of robot (=mb+msup+mswg)
J: Body inertial moment (Equivalent inertial moment in the body inclination mode. In other words, this is an inertial moment of FHx and FHy. Usually, it does not agree with the inertial moment of the body 3 part of the actual robot 1.)
Jbz: Body inertial moment about a vertical axis (Equivalent inertial moment in the body yaw rotation mode. Usually, this does not agree with the inertial moment of the body 3 part of the actual robot 1.)
Jaz: Arm swing inertial moment about a vertical axis (Equivalent inertial moment in antiphase arm swing to cancel a spin. In other words, it is an inertial moment of FHaz.)
Fx: Floor reaction force X component (More specifically, a longitudinal (X-axis) component of a translational floor reaction force)

Fy: Floor reaction force Y component (More specifically, a lateral (Y-axis) component of a translational floor reaction force)

Fz: Floor reaction force vertical component (More specifically, a vertical (Z-axis) component of a translational floor reaction force. This is equivalent to a desired translational floor reaction force vertical component in the present embodiment.)

Mx: X component of a floor reaction force moment about a desired ZMP (More specifically, a component about a longitudinal axis (X-axis) of a floor reaction force moment)

My: Y component of a floor reaction force moment about a desired ZMP (More specifically, a component about a lateral axis (Y-axis) of a floor reaction force moment)

Mz: Z component of a floor reaction force moment about a desired ZMP (More specifically, a component about a vertical axis (Z-axis) of a floor reaction force moment)

An X position and a Y position of each of the mass points $2m$ and $3m$ mean a position in the longitudinal direction (X-axis direction) and a position in the lateral direction (Y-axis direction), respectively. In the present embodiment, a positional relationship between a position of the mass point $2m$ of each leg 2 and a position of the foot 22 of the leg 2 (a position of a predetermined representative point of the foot 22) is determined in advance, so that if one of the positions is decided, then the other position is uniquely decided. Further, a positional relationship between the body mass point $3m$ and the position of the body 3 (a position of a predetermined representative point of the body 3) is determined in advance on the basis of a posture angle of the body 3 (hereinafter, regarding the body, a posture angle will mean an inclination angle and a yaw angle), and if a position and a posture angle of one of them are determined, then the position of the other is uniquely determined.

For an arbitrary variable X, dX/dt denotes first order differentiation of X, and d2X/dt2 denotes second order differentiation. Therefore, if the variable X denotes displacement, then dX/dt means velocity and d2X/dt2 means acceleration. g denotes a gravity acceleration constant. Here, g takes a positive value.

A motional equation of the above dynamic model (an equation expressing a dynamic balance condition) is represented by equation 01, equation 02x, equation 02y, equation 03x, equation 03y, and equation 03z.

$$Fz = mb*(g+d2Zb/dt2) + msup*(g+d2Zsup/dt2) + mswg*(g+d2Zswg/dt2) \quad \text{Equation 01}$$

$$Fx = mb*d2Xb/dt2 + msup*d2Xsup/dt2 + mswg*d2Xswg/dt2 \quad \text{Equation 02x}$$

$$Fy = mb*d2Yb/dt2 + msup*d2Ysup/dt2 + mswg*d2Yswg/dt2 \quad \text{Equation 02y}$$

$$\begin{aligned}Mx = &\, mb*(Yb-Yzmp)*(g+d2Zb/dt2) - \\ &\, mb*(Zb-Zzmp)*(d2Yb/dt2) + \\ &\, msup*(Ysup-Yzmp)*(g+d2Zsup/dt2) - \\ &\, msup*(Zsup-Zzmp)*(d2Ysup/dt2) + \\ &\, mswg*(Yswg-Yzmp)*(g+d2Zswg/dt2) - \\ &\, mswg*(Zswg-Zzmp)*(d2Yswg/dt2) + J*d2\theta bx/dt2\end{aligned} \quad \text{Equation 03x}$$

$$\begin{aligned}My = &\, -mb*(Xb-Xzmp)*(g+d2Zb/dt2) + \\ &\, mb*(Zb-Zzmp)*(d2Xb/dt2) - \\ &\, msup*(Xsup-Xzmp)*(g+d2Zsup/dt2) + \\ &\, msup*(Zsup-Zzmp)*(d2Xsup/dt2) - \\ &\, mswg*(Xswg-Xzmp)*(g+d2Zswg/dt2) + \\ &\, mswg*(Zswg-Zzmp)*(d2Xswg/dt2) + J*d2\theta by/dt2\end{aligned} \quad \text{Equation 03y}$$

$$\begin{aligned}Mz = &\, mb*(Xb-Xzmp)*(d2Yb/dt2) - \\ &\, mb*(Yb-Yzmp)*(d2Xb/dt2) + \\ &\, msup*(Xsup-Xzmp)*(d2Ysup/dt2) - \\ &\, msup*(Ysup-Yzmp)*(d2Xsup/dt2) + \\ &\, mswg*(Xswg-Xzmp)*(d2Yswg/dt2) - \\ &\, mswg*(Yswg-Yzmp)*(d2Xswg/dt2) + \\ &\, Jbz*d2\theta bz/dt2 + Jaz*d2\theta az/dt2\end{aligned} \quad \text{Equation 03z}$$

Furthermore, for a total center-of-gravity position of the robot, the following relational expressions hold:

$$ZGtotal = (mb*Zb + msup*Zsup + mswg*Zswg)/mtotal \quad \text{Equation 04}$$

$$XGtotal = (mb*Xb + msup*Xsup + mswg*Xswg)/mtotal \quad \text{Equation 05x}$$

$$YGtotal = (mb*Yb + msup*Ysup + mswg*Yswg)/mtotal \quad \text{Equation 05y}$$

The following will show a relationship between the above dynamic model and the above ΔFp, ΔMp, ΔFr, and ΔMr.

The above ΔFp is a perturbation amount of Fx or Fy when d2Xb/dt2 or d2Yb/dt2 is perturbated by a unit amount in equation 02x or equation 02y, so that it is determined according to the following equation:

$$\Delta Fp = mb \quad \text{Equation 06}$$

More specifically, the change ΔFp of a floor reaction force horizontal component per unit acceleration in the direction of each horizontal axis (X-axis, Y-axis) in the body translation mode corresponds to the mass of the body mass point $3m$ of the dynamic model.

The above ΔMp is a perturbation amount of My or Mx when d2Xb/dt2 or d2Yb/dt2 is perturbated by a unit amount in equation 03y or equation 03x, so that it is determined according to the following equation:

$$\Delta Mp = mb*(Zb-Zzmp) \quad \text{Equation 07}$$

More specifically, the change ΔMp of a floor reaction force moment horizontal component per unit acceleration in the direction of each horizontal axis (X-axis, Y-axis) in the body translation mode is obtained by multiplying a body mass point mass of the dynamic model by a height (vertical position) of the body mass point $3m$ from a desired ZMP. The relationship between the positions of the body mass point $3m$ and the desired ZMP and the motion of the body mass point $3m$ corresponds to the behavior of an inverted pendulum obtained when the body mass point $3m$ is associated with an inverted pendulum mass point and when the desired ZMP is associated with an inverted pendulum supporting point. To be more accurate, ΔMp in the Y-axis direction is obtained by reversing the sign of the right side of equation 07.

The above ΔFr is a perturbation amount of Fx or Fy when d2θby/dt2 is perturbated by a unit amount in equation 02x or equation 02y, so that it is determined according to the following equation:

$$\Delta Fr = 0 \quad \text{Equation 08}$$

This means that the change ΔFr of a floor reaction force horizontal component per unit acceleration in the direction of each horizontal axis (X-axis, Y-axis) in the body inclination mode is zero.

The above ΔMr is a perturbation amount of Mx or My when d2θbx/dt2 or d2θby/dt2 is perturbated by a unit amount in equation 03x or equation 03y, so that it is determined according to the following equation:

$$\Delta Mr = J \quad \text{Equation 09}$$

More specifically, the change ΔMr of a floor reaction force moment horizontal component per unit acceleration in the direction of each horizontal axis (X-axis, Y-axis) in the body inclination mode corresponds to the inertial moments of horizontal axis flywheels (FHx and FHy).

More specifically, the change ΔMr of a floor reaction force moment horizontal component per unit acceleration in the direction of each horizontal axis (X-axis, Y-axis) in The above ΔMbz is a perturbation amount of Mz when d2θbz/dt2 is perturbated by a unit amount in equation 03z, so that it is determined according to the following equation:

$$\Delta Mbz = Jbz \quad \text{Equation 09b}$$

More specifically, the change ΔMbz of a floor reaction force moment component per unit acceleration in the body yaw rotation mode corresponds to the inertial moment of a flywheel FHbz corresponding to body yaw rotation.

The above ΔMaz is a perturbation amount of Mz when d2θaz/dt2 is perturbated by a unit amount in equation 03z, so that it is determined according to the following equation:

$$\Delta Maz = Jaz \quad \text{Equation 09a}$$

More specifically, the change ΔMaz of a floor reaction force moment component per unit angular acceleration of an antiphase arm swing corresponds to the inertial moment of a flywheel FHaz corresponding to an arm swing.

The gait generating device 100 in the present embodiment generates a desired gait for one step in order, the one step for the desired gait (the desired gait in the narrow sense described above) being from the moment one leg 2 of the robot 1 lands to the moment the other leg 2 lands. Hence, for the running gait shown in FIG. 5 to be generated in the present embodiment, a desired gait from the beginning of a single stance period to the end of the following floating period (the beginning of the next single stance period) is generated in sequence. Here, a desired gait that is being newly generated will be referred to as a "current time gait," the next desired gait will be referred to as a "next gait," and a desired gait after next will be referred to as a "next but one time gait." Furthermore, a desired gait generated one step before the "current time gait" will be referred to as a "last time gait."

When the gait generating device 100 newly generates a current time gait, expected positions/postures of landing of the foot 22 of a free leg and required values (requests) of expected landing time for the next two steps of the robot 1 are input as required parameters to the gait generating device 100 (or the gait generating device 100 reads the required parameters from a memory). Then, the gait generating device 100 uses these required parameters to generate a desired body position/posture trajectory, a desired foot position/posture trajectory, a desired ZMP trajectory, a desired floor reaction force vertical component trajectory, a desired arm posture trajectory, etc. At this time, some of the gait parameters specifying these trajectories are corrected, as necessary, to secure continuity of walking.

Figure 13:
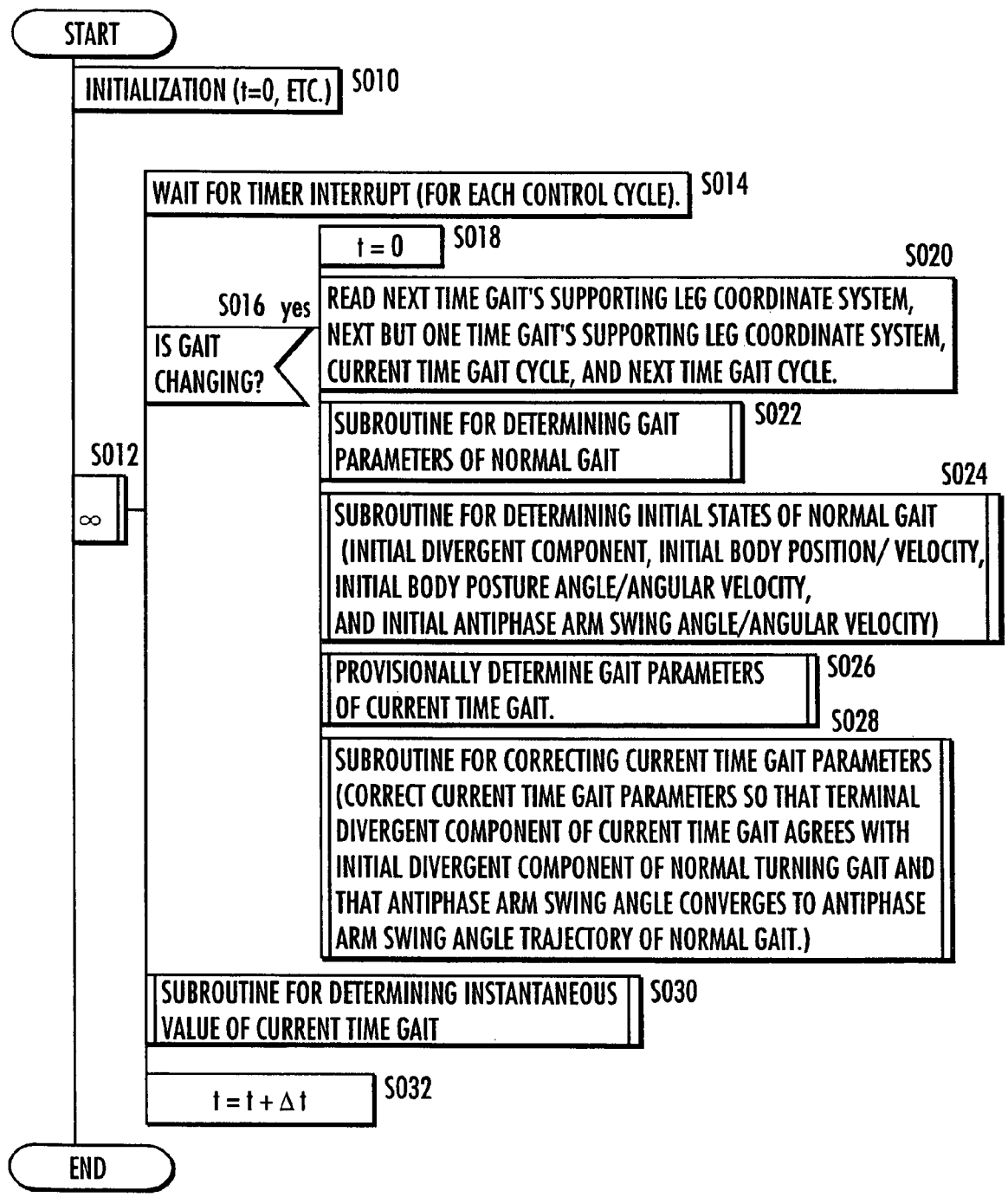
FIG. 13 is a flowchart showing a main routine processing of a gait generating device in the embodiment.

Taking the generation of the running gait shown in FIG. 5 as an example, gait generation processing of the gait generating device 100 will be explained in detail with reference to FIG. 13 to FIG. 46. FIG. 13 is a flowchart (structured flowchart) illustrating a main routine of the gait generation processing carried out by the gait generating device 100.

First, various initializing operations, including initialization of time t to zero, are performed in S010. This processing is implemented primarily when starting up the gait generating device 100. Next, the processing proceeds to S014 via S012 and waits for a timer interrupt for each control cycle (the calculation processing cycle of the flowchart shown in FIG. 13). The control cycle is denoted by Δt.

Then, the processing proceeds to S016 and determines whether a shift in a gait is taking place. If a shift in the gait is taking place, then the processing proceeds to S018, or if a shift in a gait is not taking place, then it proceeds to S030. Here, "the shift in a gait" means a timing at which the generation of the last time gait has been completed and the generation of the current time gait is about to start. For instance, a control cycle following the control cycle in which the generation of a last time gait has been completed refers to the shift in a gait.

When proceeding to S018, time t is initialized to zero. The gait generating device 100 then proceeds to S020 and reads a next time's gait supporting leg coordinate system, a next but one time's gait supporting leg coordinate system, a current time gait cycle, and a next time gait cycle. These supporting leg coordinate systems and the gait cycles are determined by the above required parameters. More specifically, in the present embodiment, the required parameters supplied to the gait generating device 100 from the joystick 73 or the like include required values of expected landing positions/postures (foot positions/postures in a state wherein the foot 22 has been rotated without slippage such that its sole is substantially in full contact with a floor surface after landing) and expected landing time of the foot 22 of a free leg for up to two steps ahead. The required value for the first step and the required value for the second step are supplied to the gait generating device 100 as the values associated with a current time gait and a next time gait, respectively, before the generation of the current time gait is begun (the shift in a gait in S016 mentioned above). These required values can be changed in the middle of generating the current time gait.

Then, the next time's gait supporting leg coordinate system is determined on the basis of the required value of the expected landing position/posture of the free leg foot 22 of the first step (the free leg foot 22 in the current time gait) in the above required parameters.

Figure 16:
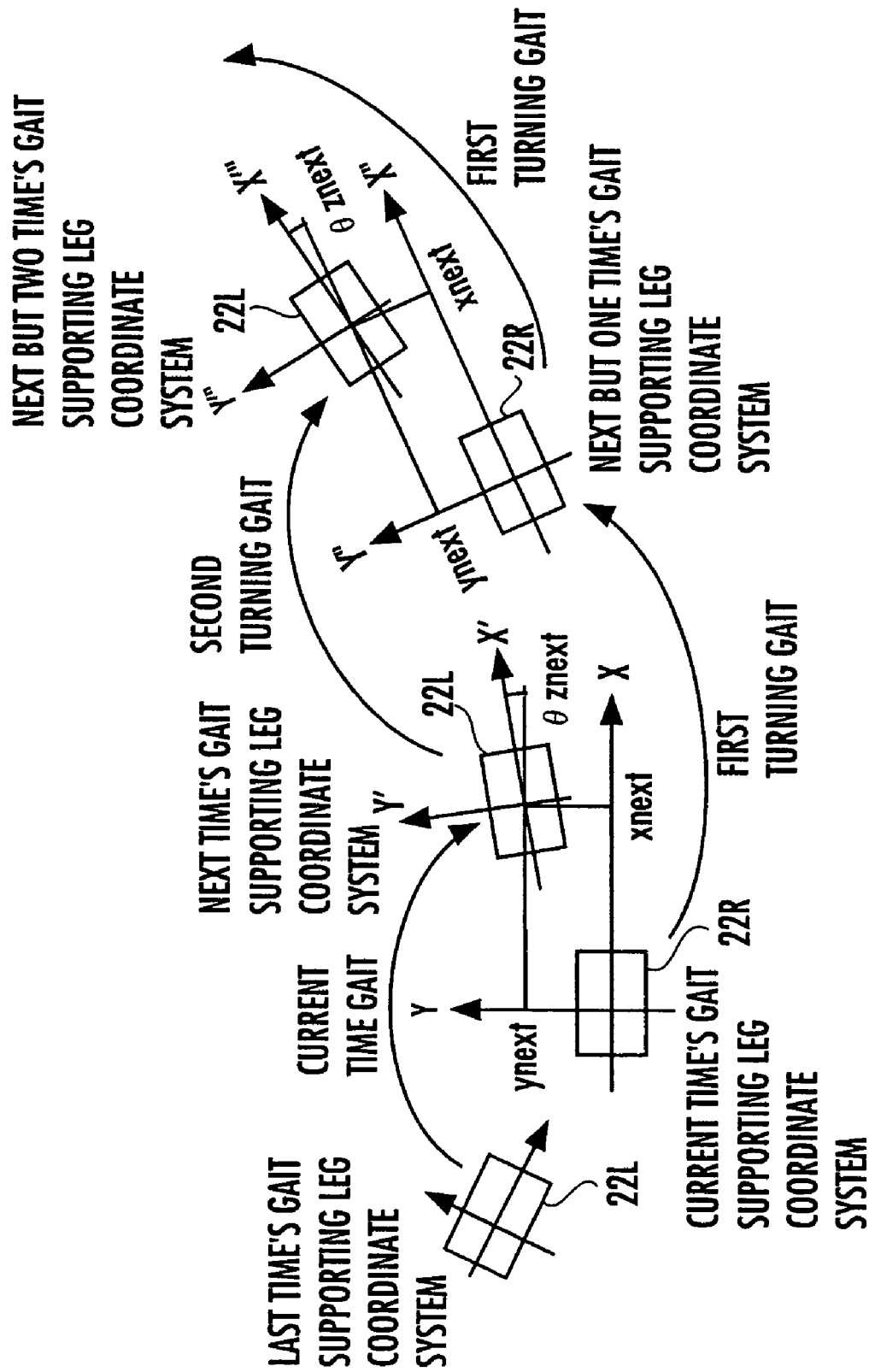
FIG. 16 is a diagram for explaining a normal gait and a supporting leg coordinate system.

Referring to, for example, FIG. 16, it is assumed that the required value for an expected landing position/posture of the free leg foot 22 (22L in the figure) related to the current time gait (first step) specifies a position/posture obtained by moving by xnext and ynext in the X-axis direction (in the longitudinal direction of a supporting leg foot 22R of the current time gait) and in the Y-axis direction (in the lateral direction of the supporting leg foot 22R of the current time gait), respectively, of a current time's gait supporting leg coordinate system, and by rotating about the Z-axis (about the vertical axis) by θznext with respect to a landing position/posture of the supporting leg foot 22 (22R in the figure) of the current time gait. Here, the supporting leg coordinate system is a global coordinate system (a coordinate system fixed to a floor) in which a point, at which a perpendicular line extended onto a floor surface from the center of the ankle of a supporting leg foot 2 intersects with the floor surface (this point agreeing with a representative point of the foot 22 in a state, wherein substantially the entire surface of the sole of the supporting leg foot 22 is in contact with the floor surface in the present embodiment), in a state wherein the supporting leg foot 22 is set in a horizontal posture (more generally, a posture parallel to the floor surface) and substantially the entire surface of the sole of the supporting leg foot 22 is in contact (in close contact) with the floor surface, is defined as an origin thereof, and a horizontal plane passing the origin is defined as an XY plane. In this case, the X-axis direction and the Y-axis direction correspond to the longitudinal direction and the lateral direction, respectively, of the supporting leg foot 22. The origin of the supporting leg coordinate system does not have to agree with the representative point of the foot 22 (a point representing the position of the foot 22) in the state wherein substantially the entire surface of the sole of the supporting leg foot 22 is in contact with the floor surface. Alternatively, the origin may be set at a point on the floor surface that is different from the representative point.

At this time, the next time's gait supporting leg coordinate system is a coordinate system that takes, as its origin, the representative point (more specifically, a point on a floor that agrees with the representative point) of the foot 22L in a case where the foot 22 is landed according to a required value of the expected landing position/posture of the free leg foot 22L of the current time gait as illustrated (in a case where the representative point of the foot 22 is made to agree with the required value of an expected landing position and the posture (orientation) of the foot 22 is made to agree with the required value of an expected landing posture). The longitudinal direction and the lateral direction of the foot 22L in the horizontal plane passing the origin correspond to an X'-axis direction and Y'-axis direction, respectively.

In the same manner described above, a next but one time's gait supporting leg coordinate system (refer to the X" Y" coordinates shown in FIG. 16) is determined on the basis of the required values for the expected landing position/posture of the free leg foot 22 of the second step. A current time gait cycle is determined as the duration from the expected landing time (required value) of the supporting leg foot 22 of the current time gait to the expected landing time (required value) of the free leg foot 22 of the first step (current time gait). The next time gait cycle is determined as the duration from the expected landing time (required value) of the free leg foot 22 of the first step to the expected landing time (required value) of the free leg foot 22 of the second step.

The required parameters are input to the gait generating device 100 by necessary operation of the joystick 73 in the present embodiment. Alternatively, however, the required parameters or the positions/postures and gait cycles of the aforesaid supporting leg coordinate systems associated with the required parameters may be stored in advance as a travel schedule of the robot 1. Alternatively, the aforesaid next time and the next but one time's gait supporting leg coordinate systems and the current time and the next time gait cycles may be determined on the basis of commands (requests) from a manipulation device, such as the joystick 73, and a travel history of the robot 1 up to that moment.

Subsequently, the processing proceeds to S022 wherein the gait generating device 100 determines gait parameters of a normal turning gait as a virtual cyclic gait that follows the current time gait. The gait parameters include a foot trajectory parameter defining a desired foot position/posture trajectory, a reference body posture trajectory parameter defining a body posture trajectory to be based on, a reference arm posture trajectory parameter defining an arm posture trajectory to be based on, a ZMP trajectory parameter defining a desired ZMP trajectory, and a floor reaction force vertical component trajectory parameter defining a desired floor reaction force vertical component trajectory in the normal turning gait. Furthermore, parameters that define a floor reaction force horizontal component permissible range and a floor reaction force moment vertical component permissible range are also included in gait parameters.

In the present description, "the normal turning gait" is used to mean a cyclic gait that does not cause discontinuity in motional states (states of foot position/posture, body position/posture, etc.) of the robot 1 in a boundary of gait when the gait is repeated (the boundary of a gait for each step in the present embodiment). Hereinafter, "the normal turning gait" may be abbreviated as "the normal gait."

According to the present embodiment, the normal turning gait, which is a cyclic gait, may be defined as follows. A gait for two steps of the robot 1, i.e., a gait composed of a first turning gait following a current time gait and a second turning gait following the first turning gait, is defined as the gait for one cycle of the normal turning gait, and the normal turning gait consists of a repetition of the gait for one cycle. The term "turning" is used here, because it would mean straight advancement when the turning rate is set to zero, and straight advancement can be also included in turning in a broad sense. If a desired gait to be generated is the running gait shown in FIG. 5, then a current time gait of the desired gait is a running gait that has a single stance period and a floating period. Hence, the first turning gait and the second turning gait of the normal turning gait are both gaits that also have a single stance period and a floating period, as in the current time gait. In other words, a basic gait form of the first turning gait and the second turning gait is the same as that of the current time gait.

Supplemental explanation of the normal turning gait will be added. In a bipedal mobile robot, the normal turning gait for one cycle requires gaits in the aforesaid narrow sense for at least two steps. It is further possible to set a complicated normal turning gait composed of gaits of three steps or more as the gaits for one cycle. The normal-turning gait, however, is used only to determine a divergent component (to be discussed in detail hereinafter) at the end (finish time) of the current time gait. Therefore, using the normal turning gait composed of the gaits of three or more steps for one cycle will provide less effect, while the complicated processing for generating the gait is involved. For this reason, the gaits for one cycle in the normal turning gait in the present embodiment include gaits for two steps (the first and the second turning gaits). For a legged mobile robot having three or more feet, the number of gaits for defining the normal turning gait will increase accordingly. In the following description, for the convenience of explanation, the normal turning gait composed of a plurality of gaits in the narrow sense (the gaits for two steps in the present embodiment) will be regarded as the gait of one step.

A normal turning gait is prepared for provisional use by the gait generating device 100 to determine motional states of the robot 1, including a divergent component or a vertical body position/velocity, and a body posture angle and an angular velocity thereof at the end of a current time gait; it is not directly output from the gait generating device 100.

Figure 14:
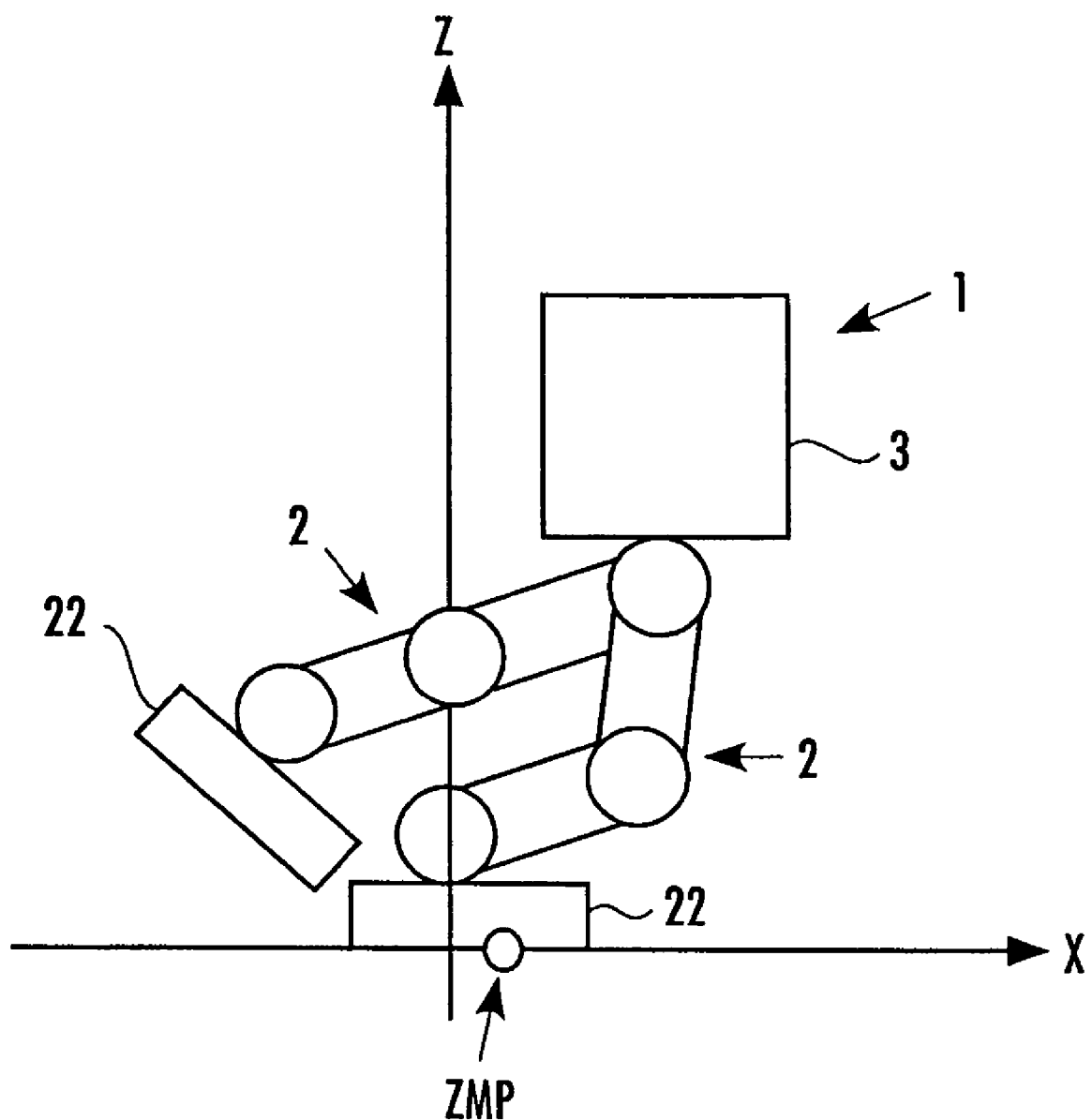
FIG. 14 is a diagram for explaining a divergence state of the robot.

The term "divergence" means that the position of the body 3 of the bipedal mobile robot 1 is undesirably shifted to a position away from the positions of both feet 22 and 22, as shown in FIG. 14. The value of a divergent component is a numeral value indicating how far the position of the body 3 of the bipedal mobile robot 1 is away from the positions of both feet 22 and 22 (to be more specific, the origin of a global coordinate system (a supporting leg coordinate system) set on the surface with which a supporting leg foot 22 is in contact).

In the present embodiment, gaits are generated using a divergent component as an indicator so that a desired gait can be continuously generated without causing the divergence. However, even if it is an initial divergent component (divergent component at initial time of the normal turning gait) of a normal gait, which is a typical example of a continuous gait (a cyclic gait that permits repetition of a gait of the same pattern without causing discontinuity of a gait trajectory, and that does not theoretically diverge after an infinite number of repetitions), the initial divergent component is not simply zero. The initial divergent component changes if a parameter of a normal gait changes. In other words, a proper divergent component changes according to a gait form, such as the manner of walking or the manner of running, or the like. In the present embodiment, therefore, a normal gait following a current time gait to be generated is set on the basis of required parameters involved in the current time gait, and the initial divergent component of the normal gait is determined, and then a current time gait is generated such that the divergent component at the end of the current time gait agrees with the initial divergent component of the normal gait (more generally, the current time gait is made to continue or approximate to the normal gait). The basic guideline for generating such gaits is the same as that disclosed in PCT Kokai publication WO/02/40224 previously proposed by the present applicant.

The embodiment of the present invention does not use a linear dynamic model with three mass points used in the first embodiment of PCT Kokai publication WO/02/40224. Nevertheless, the concept of the divergent component and the convergent component defined by the equation given below can be applied with adequate approximate accuracy to a perturbation of a behavior of a nonlinear dynamic model such as the one shown in FIG. 12.

Divergent component=Body mass point horizontal position+Body mass point horizontal velocity/ω0    Equation 10

Convergent component=Body mass point horizontal position−Body mass point horizontal velocity/ω0'    Equation 11 where the body mass point horizontal position in this case indicates a body mass point horizontal position Xb in the dynamic model shown in FIG. 12.

ω0 and ω0' take predetermined values. The values of these ω0 and ω0' are substantially the same, although they do not exactly coincide. Further, the values for generating walking gaits in PCT Kokai publication WO/02/40224 must be slightly changed for running.

More details of the divergent component and the convergent component have been given in PCT Kokai publication WO/02/40224, so that no more description will be given here.

In the present embodiment, in addition to the method disclosed in PCT Kokai publication WO/02/40224, a gait parameter defining a desired floor reaction force vertical component trajectory is set, and a total center-of-gravity vertical position of the robot 1 is determined so as to dynamically satisfy the desired floor reaction force vertical component, as will be discussed hereinafter. In this case, a second order integrated value of the floor reaction force vertical component will define the total center-of-gravity vertical position of the robot 1. Hence, if the desired floor reaction force vertical component is improperly set, then the total center-of-gravity vertical position or the vertical body position of the robot 1 will be too high or too low. Therefore, the method for setting a desired floor reaction force vertical component is also an important issue. However, the relationship between a floor reaction force vertical component and a vertical body position is similar to the relationship between ZMP and a horizontal body position, so that a technique for determining a desired ZMP for setting a proper horizontal body position/velocity can be applied to the technique for determining a desired floor reaction force vertical component for setting a proper vertical body position/velocity simply by slightly changing a part thereof, as shown in the following present embodiment.

Returning to the main subject, in S022, the processing below is carried out according to the flowchart shown in FIG. 15.

First, in S100, a foot trajectory parameter among the gait parameters of a normal gait is determined to provide a foot position/posture trajectory composed of a current time gait, a first turning gait, and a second turning gait in succession in this order. The following will explain a specific setting method with reference to FIG. 16. In the following explanation, the foot 22 of a supporting leg 2 will be referred to as the supporting leg foot and the foot 22 of a free leg 2 will be referred to as the free leg foot. Further, "start" and "end" will mean start time and end time of a gait or instantaneous gaits at the start time and the end time.

The foot trajectory parameter is constructed primarily of the positions/postures of a supporting leg foot and a free leg foot, respectively, at the start and the end, respectively, of a first turning gait and a second turning gait, and a gait cycle of each turning gait. In the foot trajectory parameter, the free leg foot position/posture at the start of the first turning gait is defined as the supporting leg foot position/posture at the end of a current time gait observed from a next time's gait supporting leg coordinate system. In this case, in a running gait, the supporting leg foot 22 at the end of the current time gait is moving in the air. And the supporting leg foot position/posture at the end of the current time gait is determined by generating a required value of an expected landing position/posture of the free leg foot 22 of a second step in the required parameter (a required value of an expected landing position/posture in a next time gait of the supporting leg foot 22 of the current time gait) or a foot position/posture trajectory for reaching a free leg position/posture at the end of the next time gait determined on the basis of a next but one time's gait supporting leg coordinate system that corresponds to the above required value (more specifically, the trajectory observed from a next time's gait supporting leg coordinate system) from the supporting leg foot position/posture at the start of the current time gait (=the free leg foot position/posture at the end of the last time gait) by using the finite-duration setting filter until the end of the current time gait.

The free leg foot position/posture at the end of the next time gait is determined such that the position/posture of the foot, which is obtained when the foot 22 is turned from that position/posture by a predetermined angle in the pitch direction until it reaches a horizontal posture by lowering its tiptoe while holding the foot 22 in contact with the ground, agrees with the position/posture in the next but one time's gait supporting leg coordinate system. In other words, the free leg foot position/posture at the end of the next time gait is the position/posture of the foot 22 in a state wherein the foot 22 has been turned, from a required value of the landing position/posture of the free leg foot 22 of the second step in the required parameter, by a predetermined angle in the pitch direction by lifting its tiptoe while holding the foot 22 in contact with the ground so that it does not slip (a state wherein the heel has been landed with the tiptoe raised).

Further, the supporting leg foot position/posture at the start of the first turning gait is defined as the free leg foot position/posture at the end of the current time gait observed from the next time's gait supporting leg coordinate system. In this case, the free leg foot position/posture at the end of the current time gait is determined on the basis of the above next time's gait supporting leg coordinate system or a required value of an expected landing position/posture of the free leg of the first step (the current time gait) of the required parameter corresponding thereto, as in the case of the free leg foot position/posture at the end of the next time gait. In other words, the free leg foot position/posture at the end of the current time gait is determined such that a representative point of the foot, which is obtained when substantially entire surface of the sole of the foot 22 is brought into contact with a floor surface by turning the foot 22 from the position/posture so as to lower its tiptoe while holding the foot 22 in contact with the ground, agrees with the origin of the next time's gait supporting leg coordinate system.

The free leg foot position/posture at the end of the first turning gait is determined on the basis of a position/posture on the next but one time's gait supporting leg coordinate system observed from the next time's gait supporting leg coordinate system, as with the technique for determining the free leg foot position/posture at the end of the current time gait or the free leg foot position/posture at the end of the next time gait. To be more specific, the free leg foot position/posture at the end of the first turning gait is set such that the position/posture of the foot, which is obtained when the foot 22 is turned from that position/posture by a predetermined angle until it reaches a horizontal posture while avoiding a slippage and while holding the foot 22 in contact with the ground, agrees with the position/posture in the next but one time's gait supporting leg coordinate system as observed from the next time's gait supporting leg coordinate system.

At the end of the first turning gait, the supporting leg foot 22 is in the air, being off the floor. To determine the trajectory after the supporting leg foot 22 leaves the floor, an expected landing position/posture of the supporting leg foot of the first turning gait is set. The expected landing position/posture of the supporting leg foot of the first turning gait is set on the basis of a position/posture on a next but two time gait supporting leg coordinate system observed from the next time's gait supporting leg coordinate system. To be more specific, the expected landing position/posture of the supporting leg foot of the first turning gait is the position/posture on the next but two time gait supporting leg coordinate system observed from the next time's gait supporting leg coordinate system. The next but two time gait supporting leg coordinate system is set such that the relative position/posture relationship between the next but one time's gait supporting leg coordinate system and the next but two time gait supporting leg coordinate system agrees with the relative position/posture relationship between the current time's gait supporting leg coordinate system and the next time's gait supporting leg coordinate system.

The supporting leg foot position/posture at the end of the first turning gait is determined by generating a foot position/posture trajectory for reaching the expected landing position/posture of the supporting leg foot of the first turning gait from the supporting leg foot position/posture at the start of the first turning gait (more specifically, the trajectory observed from a next time's gait supporting leg coordinate system) by using the finite-duration setting filter until the end of the first turning gait, as in the case where the supporting leg foot position/posture at the start of the first turning gait is determined.

The free leg foot position/posture at the start of the second turning gait is regarded as the supporting leg foot position/posture at the end of the first turning gait observed from the next but one time's gait supporting leg coordinate system. The supporting leg foot position/posture at the start of the second turning gait is regarded as the free leg foot position/posture at the end of the first turning gait observed from the next but one time's gait supporting leg coordinate system.

The free leg foot position/posture at the end of the second turning gait is regarded as the free leg foot position/posture at the end of the current time gait observed from the current time's gait supporting leg coordinate system. The supporting leg foot position/posture at the end of the second turning gait is regarded as the supporting leg foot position/posture at the end of the current time gait observed from the current time's gait supporting leg coordinate system.

The gait cycles of the first turning gait and the second turning gait are set to be identical to a next time gait cycle. These gait cycles of the first turning gait and the second turning gait do not have to be the same with each other; however, both cycles are preferably determined on the basis of at least a next time gait cycle. Motion parameters (including a time parameter, such as double stance period duration) other than the current time gait, the first turning gait, and the second turning gait are determined, as necessary, so as to satisfy gait conditions (such as an actuator velocity falling within a permissible range, a movable angle being not exceeded, and no interference with a floor or the like) on the basis of the parameters determined above.

Next, the processing proceeds to S102 and determines a reference body posture trajectory parameter that defines the reference body posture trajectory to be followed by a desired body posture. The reference body posture does not have to be constant as long as it is set to ensure connection at the start (the start of the first turning gait) and the end (the end of the second turning gait) of a normal gait (to ensure that the posture angle of the reference body posture and the angular velocity thereof at the start of a normal gait agrees with those at the end of the normal gait). In the present embodiment, however, for the purpose of easy understanding, a posture related to an inclination angle (an inclination angle relative to the vertical direction) in the reference body posture is set to an upright posture (vertical posture). This means that, in the present embodiment, the reference body posture related to an inclination angle of the body 3 is set to the upright posture in all periods of the normal gait. Accordingly, in the present embodiment, the angular velocity and angular acceleration of an inclination angle of the reference body posture is zero. A yaw angle trajectory (hereinafter referred to also as a reference yaw angle trajectory) θbz of the reference body posture may be, for example, a motion at a constant angular velocity (an average turning velocity of a normal gait), or may take a sinusoidal wave shape, as in the example (FIG. 18) of a reference antiphase arm swing trajectory, which will be discussed hereinafter. However, the yaw angle trajectory is to be set such that a reference yaw angle and its angular velocity are in succession when the normal gait is repeated.

In the present embodiment, the yaw angle trajectory (hereinafter referred to also as a desired yaw angle trajectory) of a desired body posture is set to agree with a reference yaw angle trajectory.

Figure 17:
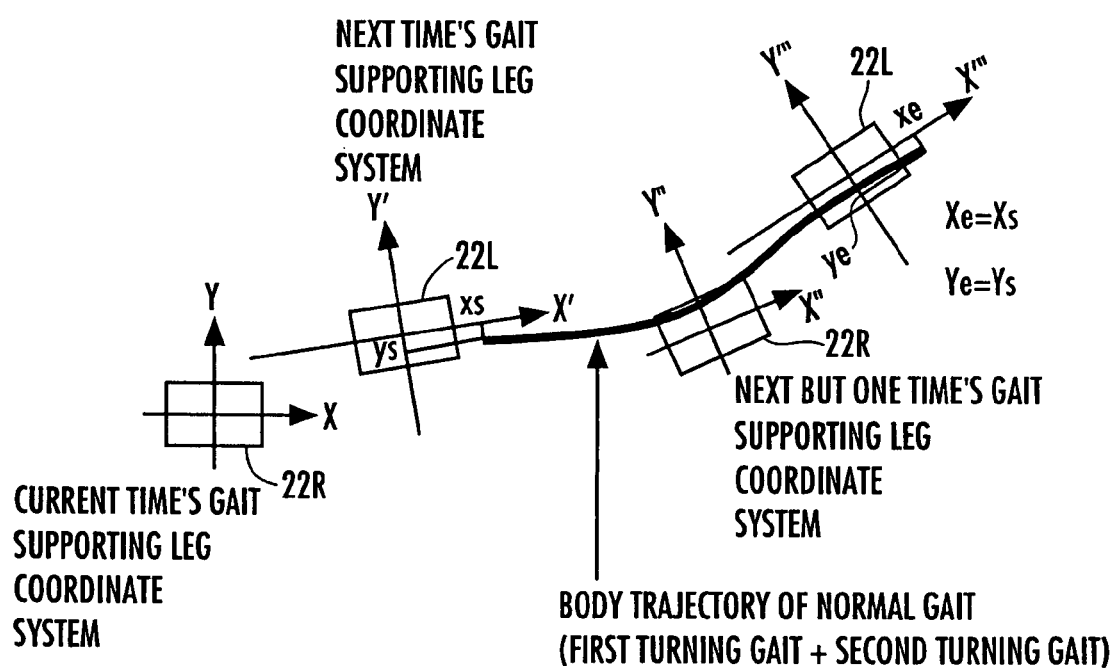
FIG. 17 is a diagram illustrating a body trajectory of the normal gait and the supporting leg coordinate system.
Figure 18:
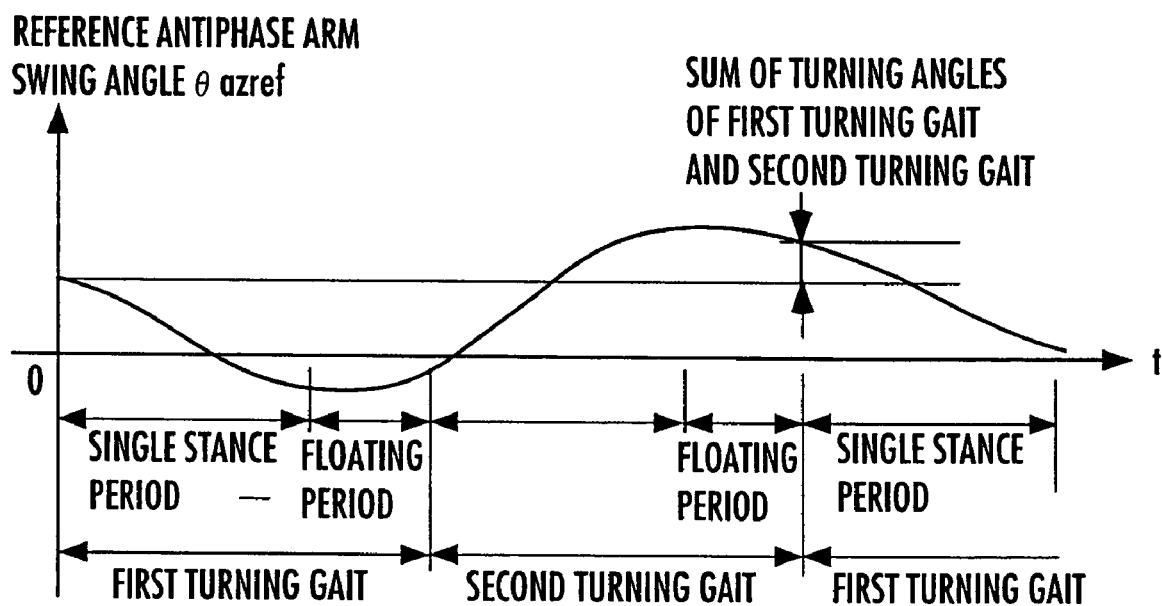
FIG. 18 is a graph showing an example of a reference antiphase arm swing angle.

Subsequently, the processing proceeds to S104 to determine reference arm posture trajectory parameters. To be more specific, parameters related to a total center-of-gravity position of both arms 5, 5 (a relative center-of-gravity position with respect to the body 3), a lateral interval between right and left hands (the distal ends of both arms 5, 5), and an antiphase arm swing angle are determined. For turning, for example, to the left as shown in FIG. 17, the reference antiphase arm swing angle may be set as shown in FIG. 18. As illustrated in FIG. 18, a reference antiphase arm swing angle θazref is set such that, when a normal gait is repeated, an antiphase arm swing angle and an angular velocity will be both continuous at a boundary of gaits (the boundary between the end of a second turning gait and the next first turning gait) and the relative relationship between the supporting leg and an antiphase arm swing angle at the start of the first turning gait agrees with the relative relationship between the supporting leg and an antiphase arm swing angle at the start of the next first turning gait. In other words, the antiphase arm swing angular velocity at the start of the first turning gait and the antiphase arm swing angular velocity at the end of the second turning gait agree with each other, and the antiphase arm swing angle at the end of the second turning gait is set to a value obtained by adding the antiphase arm swing angle at the start of the first turning gait to the turning angle of the normal gait (the sum of the turning angles of the first turning gait and the second turning gait). In FIG. 18, the reference antiphase arm swing angle θazref has the sinusoidal waveform; however, it may alternatively be set to a constant angular velocity, or it may take an average value of a supporting leg yaw angle and a free leg yaw angle.

In the present embodiment, the total center-of-gravity positions of both arms 5, 5 of the desired arm posture (the relative position with respective to the body 3) are set to be maintained constant with respect to the body 3.

Next, the processing proceeds to S106 and sets a floor reaction force vertical component trajectory parameter. In this case, the floor reaction force vertical component trajectory parameter is set such that the floor reaction force vertical component trajectory defined by the parameter is virtually continuous (values do not jump in steps), as shown in FIG. 6, in both the first turning gait and the second turning gait. In other words, a desired floor reaction force vertical component trajectory of the normal turning gait is set to have the pattern shown in FIG. 19. According to the pattern, for both the first turning gait and the second turning gait, the floor reaction force vertical component exhibits a trapezoidal change in a single stance period, and the floor reaction force vertical component is maintained at zero in a floating period. The time of break points of the pattern and the height of a trapezoid (peak value) are set as the floor reaction force vertical component trajectory parameters.

When setting the floor reaction force vertical component trajectory parameters, an average value throughout a gait period of the floor reaction force vertical component (the period equivalent to the sum of the periods of the first turning gait and the second turning gait, that is, the period equivalent to one cycle of a normal gait) is made to agree with the self weight of the robot 1. This means that the average value of the floor reaction force vertical component is set so that it provides the same magnitude as that of the gravity acting on the robot 1 but in an opposite direction.

Setting the floor reaction force vertical component trajectory as described above is necessary to satisfy a normal gait condition. The normal gait conditions is such that a beginning state (a beginning state of a first turning gait) of any state variables (a position, a posture, a velocity, etc. of each part of the robot 1) of a gait observed from a supporting leg coordinate system (a coordinate system set on a plane with which the supporting leg foot 22 is in contact) and a terminal state (a terminal state of a second turning gait) of a gait observed from the next supporting leg coordinate system (the supporting leg coordinate system of the next first turning gait) agree with each other (hereinafter, this condition may be referred to as a boundary condition of a normal gait). Therefore, the difference between a total center-of-gravity vertical velocity of the robot 1 at the end of the normal gait and a total center-of-gravity vertical velocity at the start of the normal gait (more specifically, the difference between the total center-of-gravity vertical velocity at the end of a second turning gait and the total center-of-gravity vertical velocity at the start of the first turning gait) must be also zero. The difference is an integrated value of the difference between the floor reaction force vertical component and gravity (first-order integrated value); therefore, the floor reaction force vertical component trajectory must be set as described above in order to set the difference to zero.

In the present embodiment, the average value of the floor reaction force vertical component in the period of each of the first turning gait and the second turning gait has been made to agree with the self weight of the robot 1. More specifically, the time of the break points of the trapezoidal portions of the floor reaction force vertical component trajectory in each turning gait has been set based on, for example, the gait cycle of the first turning gait and the second turning gait, and then the heights of the trapezoidal portions have been determined such that the average value of the floor reaction force vertical component in the period of each of the first turning gait and the second turning gait agrees with the self weight of the robot 1 (the heights of the trapezoids are determined by solving an equation representing the condition under which the average value and the self weight coincide, taking the heights of the trapezoids as unknown numbers).

Thus, the difference between the total center-of-gravity vertical velocity at the end of the first turning gait and the total center-of-gravity vertical velocity at the start of the first turning gait will be zero, and the difference between the total center-of-gravity vertical velocity at the end of the second turning gait and the total center-of-gravity vertical velocity at the start of the second turning gait will be also zero. This, however, is not a must. If, for instance, a vertical body position becomes excessively high or low at about a boundary of the first turning gait and the second turning gait, leading to a likelihood of an unreasonable posture, then the heights or the like of trapezoids of the floor reaction force vertical component trajectory of each turning gait may be corrected in the state in which the average value and the self weight agree in each turning gait.

Figure 19:
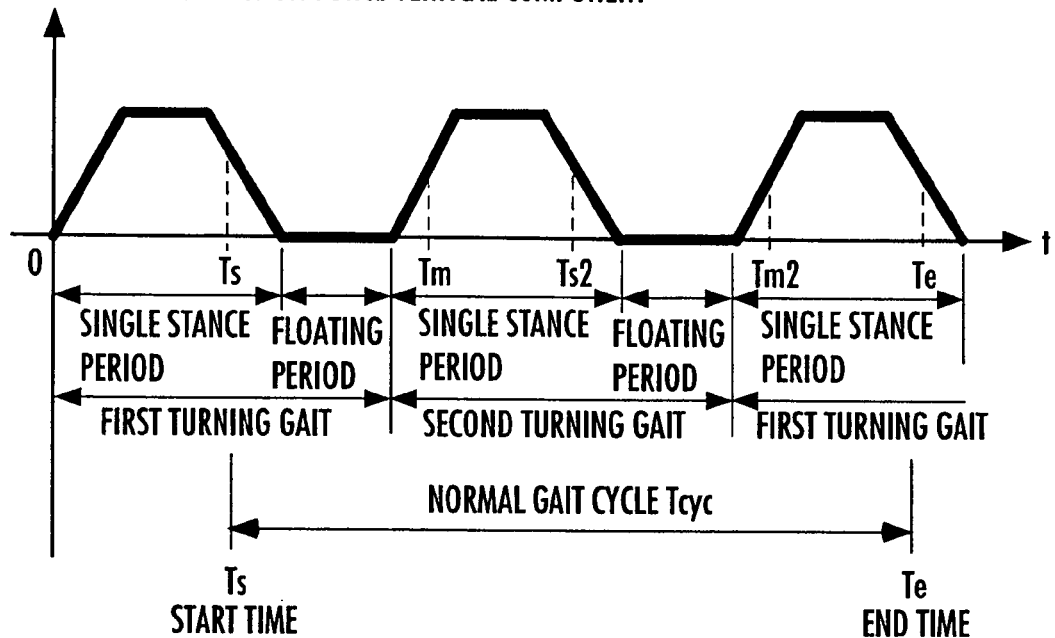
FIG. 19 is a graph showing a setting example of a desired floor reaction force vertical component trajectory in a normal gait.
Figure 20:
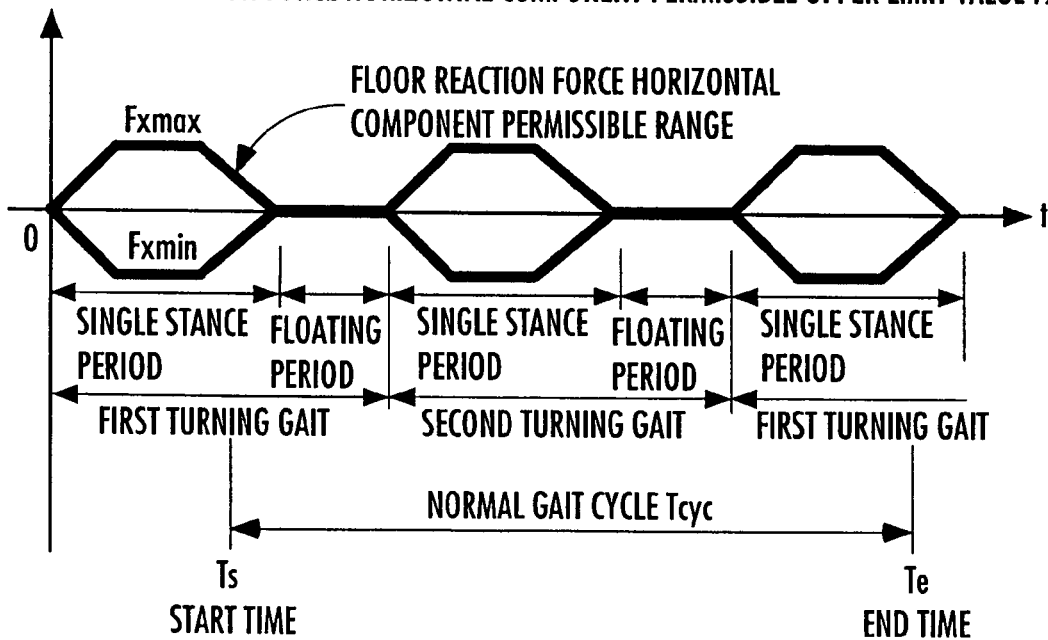
FIG. 20 is a graph showing a setting example of a floor reaction force horizontal component permissible range in a normal gait.

Next, the processing proceeds to S108 to set a permissible range of a floor reaction force horizontal component [Fxmin, Fxmax] (more specifically, a parameter defining it), as shown in FIG. 20, on the basis of the floor reaction force vertical component trajectory set as shown in FIG. 19, as described above. The polygonal line on the negative side in FIG. 20 indicates the permissible lower limit value Fxmin of the floor reaction force horizontal component, while the polygonal line on the positive side indicates the permissible upper limit value Fxmax of the floor reaction force horizontal component. A supplemental description will be given of a method for setting them. The following will explain a case where a floor surface is horizontal.

The floor reaction force horizontal component is generated from friction between a floor and a foot 22. The friction cannot be generated limitlessly; it has a limit. Hence, the floor reaction force horizontal component of a desired gait has to be always within a friction limit in order to prevent the robot 1 from slipping when the actual robot 1 moves according to a generated desired gait. To meet this condition, a permissible range of the floor reaction force horizontal component will be set, and a desired gait will be generated such that the floor reaction force horizontal component of the desired gait falls within the permissible range, as it will be discussed hereinafter.

When the coefficient of friction between the floor and the foot 22 is denoted by A, Fxmin must be always set to be not less than −μ*floor reaction force vertical component, and Fxmax must be set to be not more than μ*floor reaction force vertical component. A simplest setting method is to set them according to the following expression, in which ka is a positive constant that is smaller than 1.

$Fx\text{min} = -ka*\mu*\text{Floor reaction force vertical component}$ $Fx\text{max} = ka*\mu*\text{Floor reaction force vertical component}$   Equation 12

The permissible range of the floor reaction force horizontal component shown in FIG. 20 is an example set according to Equation 12. The values and time at the break points of the trapezoidal waveforms or the like in FIG. 20 may be set as the parameters for defining the permissible range of the floor reaction force horizontal component. Alternatively, however, if the permissible range of the floor reaction force horizontal component is determined according to Equation 12, then the value of (ka*μ) in Equation 12 may be simply set as a parameter.

As long as the above condition (the condition in that the floor reaction force horizontal component of a desired gait always falls within a frictional limit) is satisfied, a different setting method may be used to set the permissible range of the floor reaction force horizontal component.

Figure 21:
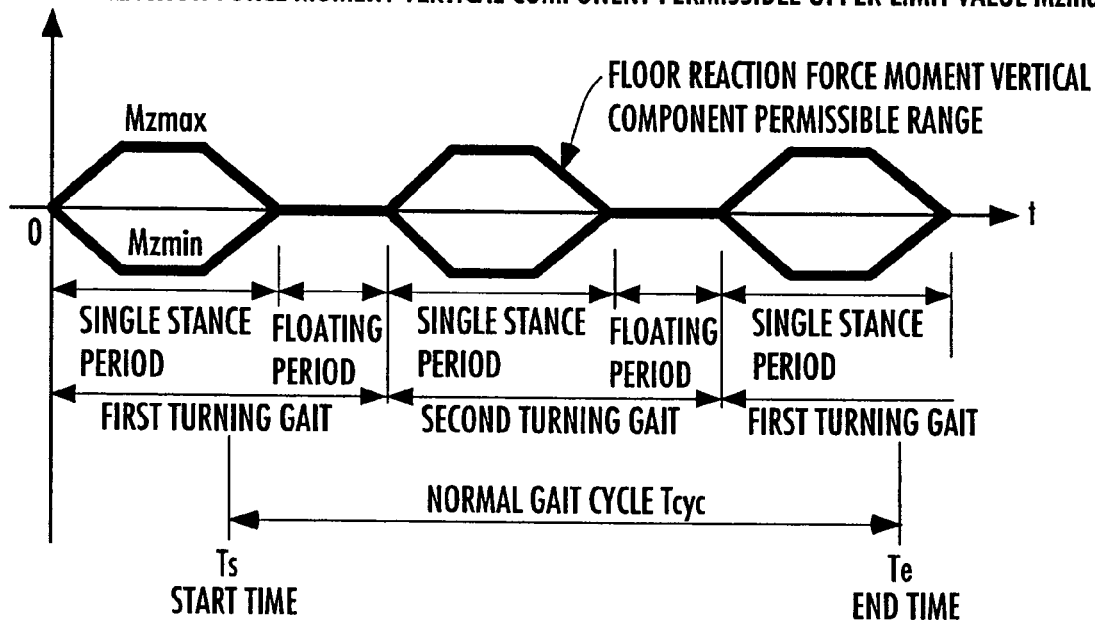
FIG. 21 is a graph showing a setting example of a floor reaction force moment vertical component permissible range in the normal gait.

The sequence then proceeds to S109 and sets the permissible range [Mzmin, Mzmax] (more specifically, a parameter defining it) of a floor reaction force moment vertical component, as shown in FIG. 21, on the basis of the floor reaction force vertical component trajectory or the like set as shown in FIG. 19, as described above. The polygonal line on the negative side in FIG. 21 indicates the permissible lower limit value Mzmin of the floor reaction force moment vertical component, while the polygonal line on the positive side indicates the permissible upper limit value Mzmax of the floor reaction force moment vertical component. A supplemental description will be given of a method for setting them. The following will explain a case where a floor surface is horizontal.

The floor reaction force moment vertical component is generated from friction between a floor and a foot 22. The friction cannot be generated limitlessly; it has a limit. Hence, the floor reaction force moment vertical component of a desired gait has to be always within a friction limit in order to prevent the robot 1 from spinning when the actual robot 1 moves according to a generated desired gait. To meet this condition, a permissible range of the floor reaction force moment vertical component will be set, and a desired gait will be generated such that the floor reaction force moment vertical component of the desired gait falls within the permissible range, as it will be discussed hereinafter.

If the coefficient of friction between the floor and the foot 22 is denoted by μ, and an effective radius of the surface of contact between the floor and the foot 22 to generate a moment vertical component (or a square root of a sectional secondary moment about a desired ZMP of the surface of contact between the floor and the foot 22) is denote by r, then Mzmin must be always set to be not less than $-\mu* r *$ floor reaction force vertical component, and Mzmax must be set to be not more than $\mu* r *$ floor reaction force vertical component. A simplest setting method is to set them according to the following expression, in which ka is a positive constant that is smaller than 1.

$Mz\text{min} = -ka * \mu * r * \text{Floor reaction force vertical component}$ $Mz\text{max} = ka * \mu * r * \text{Floor reaction force vertical component}$   Equation 1012

The permissible range of the floor reaction force moment vertical component shown in FIG. 21 is an example set according to Equation 1012. The values and time at the break points of the trapezoidal waveforms or the like in FIG. 21 may be set as the parameters for defining the permissible range of the floor reaction force moment vertical component. Alternatively, however, if the permissible range of the floor reaction force moment vertical component is determined according to Equation 1012, then the value of (ka*μ) in Equation 1012 may be simply set as a parameter. r is desirably calculated from a desired ZMP and a contact surface at each instant; alternately, however, r may be a constant.

As long as the above condition (the condition in that the floor reaction force moment vertical component of a desired gait always falls within a frictional limit) is satisfied, a different setting method may be used to set the permissible range of the floor reaction force moment vertical component.

Further alternatively, a permissible range may be set by combining a floor reaction force horizontal component and a floor reaction force vertical component moment rather than independently setting the permissible range of a floor reaction force horizontal component and the permissible range of a floor reaction force moment vertical component. This is because the permissible range of a floor reaction force moment vertical component becomes narrower as a floor reaction force horizontal component increases, while the permissible range of the floor reaction force horizontal component becomes narrower as the floor reaction force moment vertical component increases.

Next, the processing proceeds to S110 and sets ZMP trajectory parameters defining the ZMP trajectory of the normal gait that combines the first turning gait and the second turning gait. In this case, a desired ZMP trajectory is set so as to exhibit a high stability margin and no sudden changes, as described above.

Figure 22:
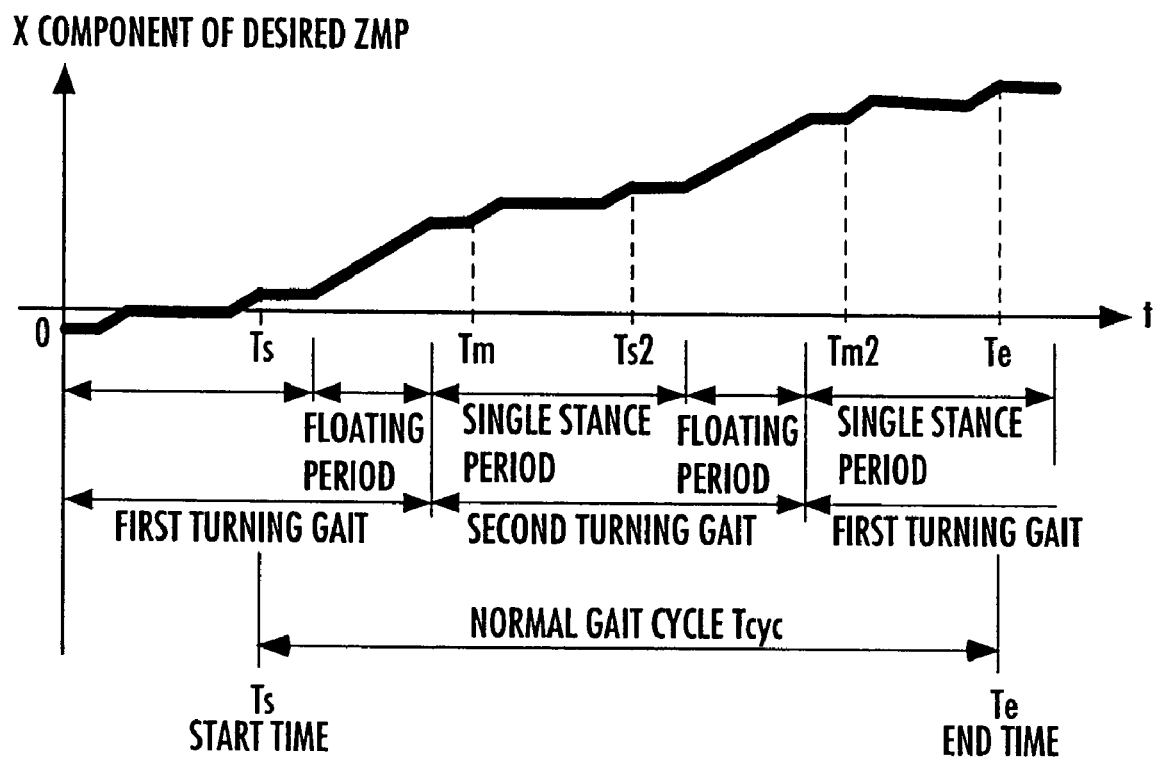
FIG. 22 is a graph showing a setting example of the desired ZMP trajectory in the normal gait.

To be more specific, according to the running gait shown in FIG. 5, a few moments after the heel of the supporting leg foot 22 lands, substantially the entire surface of the sole of the supporting leg foot 22 comes in contact with the ground, and then, following a few moments, only the tiptoe of the supporting leg foot 22 comes in contact with the ground. Thereafter, the robot 1 kicks the ground with the tiptoe of the supporting leg foot 22 to jump into the air. Lastly, the robot 1 lands at the heel of the free leg foot 22. The desired ZMP has to exist within a ground contact plane. In the present embodiment, therefore, the position of the desired ZMP in the X-axis direction for the first turning gait and the second turning gait of the normal gait is set so that it takes the heel of the supporting leg foot 22 as its initial position and stays at this position until substantially the entire sole of the foot 22 comes in contact with the ground, as illustrated in the upper diagram of FIG. 7 described above. Subsequently, the desired ZMP is set so that it moves to the center of the supporting leg foot 22, and then moves to the tiptoe by the time the tiptoe of the foot 22 comes in contact with the ground and remains thereafter at the tiptoe of the supporting leg foot 22 until the foot 22 leaves the floor. After that, the desired ZMP is set such that the desired ZMP continuously moves from the tiptoe of the supporting leg foot 22 to the landing position of the heel of the free leg foot 22 by the time the next free leg foot 22 lands, as previously described. Thus, the desired ZMP trajectory (the trajectory in the X-axis direction) of the normal gait composed of the first turning gait and the second turning gait will be as illustrated in FIG. 22. The time and positions of the break points of the desired ZMP trajectory are set as the ZMP trajectory parameters. In this case, the time of the break points is set on the basis of gait cycles of the first turning gait and the second turning gait determined based on the required parameters. The positions of the break points are set on the basis of the positions/postures on the next time's gait supporting leg coordinate system and the next but one time's gait supporting leg coordinate system or on the basis of the required values of the expected free leg foot landing positions/postures of the first step and the second step of the required parameters that define these coordinate systems. The position of the ZMP trajectory in the Y-axis direction is set in the same manner as that illustrated in the lower diagram of FIG. 7. More specifically, the trajectory of the positions of the desired ZMP in the Y-axis direction in the first turning gait is set according to the same pattern as that shown in the lower diagram of FIG. 7. The trajectory of the positions of the desired ZMP in the Y-axis direction in the second turning gait is set to have the same shape as that for the first turning gait and connects to the end of the trajectory.

Subsequently, the processing proceeds to S112 and redefines the start time, the end time, and duration of one step (one cycle) of the normal gait as follows.

A normal gait must be a gait in which state variables continuously connect at the start and the end thereof. To easily determine such a gait, in the present embodiment, the start, the end, and the duration of one step of a normal gait are determined as illustrated in FIG. 19 for convenience sake, which is different from the definition of a gait in the narrow sense described above. Specifically, in the latter half of a single stance period of the first turning gait, the time at which the floor reaction force vertical component has reduced to a certain degree is set as start time Ts of the normal gait. The start time Ts is preferably set to the time of the moment at which the state wherein substantially the entire surface of the sole of the supporting leg foot 22 is in contact with the ground is switched to tiptoe contact with the ground or at the time immediately preceding it, as shown in FIG. 7 (the time when the period of the entire sole surface in contact with the ground ends or the time immediately preceding it, as shown in FIG. 7). A description will now be given of the relationship between the desired ZMP and time Ts shown in FIG. 22 (or FIG. 7) set in S110. After substantially the entire surface of the sole of the supporting leg foot 22 comes in contact with the ground in the first turning gait, the desired ZMP moves to the center of the supporting leg foot 22. The instant the movement to the tiptoe is completed by the tiptoe contact with the ground is established is preferably time Ts. The start time Ts is set on the basis of, for example, the desired ZMP trajectory parameters previously set. The reason for setting the start time Ts as described above will be discussed hereinafter.

As shown in FIG. 19, a cycle Tcyc of the normal gait is a sum of the gait cycles of the first turning gait and the second turning gait. The end time of the normal gait is denoted by Te. Te is set to the time obtained by adding Tcyc to Ts.

The definition of the start, the end, or the like of a gait will be returned to the definition of the gait in the aforesaid narrow sense again from the moment the normal gait is determined (the moment the sequence leaves the loop of S204 shown in FIG. 23). In the following explanation, the start time (the time at which the supporting leg foot 22 lands first) according to the definition of a gait based on the aforesaid narrow sense will be set to 0, and the above start time Ts used until the normal gait is determined will be distinguished from the original start time 0 by using the reference mark Ts (abbreviated to "Ts" in some cases).

Lastly, the processing proceeds to S114 and sets a body posture angle and antiphase arm swing angle restoring period [Tm, Ts2] and [Tm2, Te] of the normal gait. Supplementally, when the normal gait is repeated, the body posture angle and the antiphase arm swing angle should be continuous in a boundary of gaits. For this purpose, the beginning body posture angular velocity and the ending body posture angular velocity of the normal gait must agree with each other, and the beginning antiphase arm swing angular velocity and the ending antiphase arm swing angular velocity must agree with each other. The aforesaid period is the period for adjusting a body posture angle trajectory and an antiphase arm swing angle trajectory to implement the agreement.

To be more specific, the gait goes through the floating period of the first turning gait from the start time Ts and reaches the second turning gait. The time at which the floor reaction force vertical component has increased to a predetermined magnitude is set as time Tm. Further, in the latter half of a single stance period of the second turning gait, the time at which the floor reaction force vertical component has reduced to a certain degree is set as time Ts2. Further, the gait goes through the floating period of the second turning gait and reaches the first turning gait. The time at which the floor reaction force vertical component has increased to a predetermined magnitude is set as time Tm2.

FIG. 19 shows these times. The time Tm is preferably set to be the moment substantially the entire surface of the sole of the supporting leg foot 22 comes in contact with the ground or immediately after that. The same applies to time Tm2. Time Ts2 is preferably set to the time of the moment at which the state wherein substantially the entire surface of the sole of the supporting leg foot 22 is in contact with the ground is switched to tiptoe contact with the ground or at the time immediately preceding it, as in the case of the start time Ts.

A description will now be given of the relationship between the desired ZMP of FIG. 22 and these times Tm, Ts2 and Tm2 set in the afore-mentioned S110 of FIG. 15. In the second turning gait, the desired ZMP takes the heel of the supporting leg foot 22 as the beginning position and remains at this position until substantially the entire surface of the sole of the supporting leg foot 22 comes in contact with the ground, and then the desired ZMP begins to move to the center of the supporting leg foot 22. It is desired to set this moment the desired ZMP beings to move to the center of the supporting leg foot 22 as time Tm. Thereafter, the instant the movement of the desired ZMP to the tiptoe is completed by the time only the tiptoe of the supporting leg foot 22 comes in contact with the ground is preferably set as time Ts2. Furthermore, in the next first turning gait, the desired ZMP takes the heel of the supporting leg foot 22 as the beginning position and remains at this position until substantially the entire surface of the sole of the supporting leg foot 22 comes in contact with the ground, and then the desired ZMP begins to move to the center of the supporting leg foot 22. It is desired to set this moment the desired ZMP begins to move to the center of the supporting leg foot 22 as time Tm2.

The reason for setting as described above will be discussed hereinafter. The period for restoring (adjusting) the body posture angle and the period for restoring (adjusting) the antiphase arm swing angle may be separately set.

After the processing from S010 to S022 shown in FIG. 13 is carried out, the processing proceeds to S024 and calculates an initial state of the normal gait. The initial state calculated here includes an initial horizontal body position/velocity (an initial body position and initial body velocity in the horizontal direction), an initial vertical body position/velocity (an initial body position and an initial body velocity in the vertical direction), an initial divergent component, an initial body posture angle and angular velocity, and an initial antiphase arm swing angle and angular velocity of the normal gait. The initial state is exploratorily calculated according to the flowchart of FIG. 23.

In the flowchart of FIG. 23, first, in S200, an initial state (a state at the start time Ts) of a desired foot position/posture, a desired arm posture, and a desired body posture angle (an inclination angle and a yaw angle) are determined on the basis of the gait parameters of the normal gait (the parameters set in S022 of FIG. 13 described above). The state here represents positions and posture angles and their changing rates (time differentiation).

Figure 15:
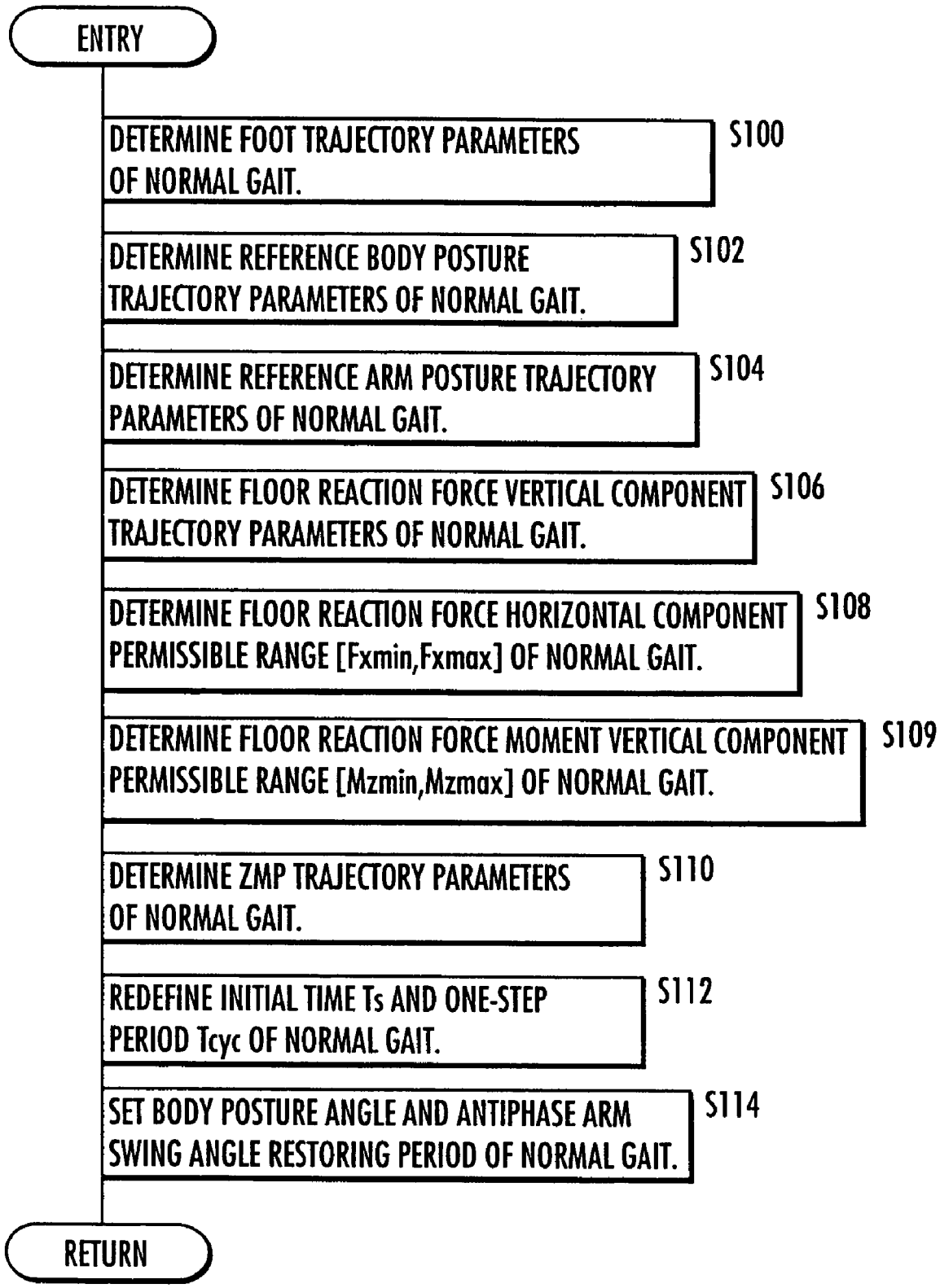
FIG. 15 is a flowchart showing a subroutine processing of S022 of FIG. 13.

In this case, the initial state of a desired foot position/posture of a supporting leg is determined by generating, using a finite-duration setting filter, a foot position/posture trajectory (a trajectory observed from a next time's gait supporting leg coordinate system) from the supporting leg foot position/posture at the start of the first turning gait of the foot trajectory parameter determined in S100 of FIG. 15 to the free leg foot position/posture at the end of the second turning gait until time Ts is reached. The initial state of a desired foot position/posture of the free leg is determined by generating, using a finite-duration setting filter, a foot position/posture trajectory from the supporting leg foot position/posture at the start of the current time gait observed from a next time's gait supporting leg coordinate system to the free leg foot position/posture at the end of the first turning gait until time Ts is reached. The initial state of a desired arm posture is determined to be a reference arm posture at time Ts that is determined on the basis of the reference arm posture trajectory parameters determined in S104 of FIG. 15. To be more specific, a total center-of-gravity position of both arms 5, 5 (a relative position with respect to the body 3) of a desired arm posture, a lateral interval between right and left hands (the distal ends of both arms 5, 5), and an antiphase arm swing angle and an angular velocity are determined. However, the antiphase arm swing angle and the angular velocity are corrected so that they are continuous in a boundary of gaits when a normal gait is repeated, as it will be discussed hereinafter; therefore, they have been just temporarily determined.

For an initial state of a desired body posture angle, a reference body posture (an inclination angle and a yaw angle) and an angular velocity thereof at time Ts determined by the reference body posture trajectory parameter determined in S102 of FIG. 15 are determined as an initial state of the desired body posture angle. In the present embodiment, the reference body posture related to the inclination angle of the body 3 is a vertical posture, so that the initial state (the inclination angle and the angular velocity thereof) of the inclination angle in the desired body posture is zero.

Further, in the present embodiment, a desired foot position/posture trajectory, a floor reaction force vertical component trajectory, and a desired ZMP trajectory of a normal gait are determined independently from each other on the basis of a foot trajectory parameter, a floor reaction force vertical component trajectory parameter, and a ZMP trajectory parameter, respectively, which have been determined in the flowchart of FIG. 15. For example, a desired foot position/posture at each instant of a normal gait is determined on the basis of a foot trajectory parameter without depending on an instantaneous value of a floor reaction force vertical component.

Subsequently, in S202, (Xs, Vxs) (Xs: horizontal position; Vxs: horizontal velocity), which is a candidate of an initial horizontal body position/velocity (that is, a candidate of the horizontal body position/velocity at the start time Ts), is provisionally determined. The candidate (Xs, Vxs) to be provisionally determined may be arbitrary. For example, the horizontal body position/velocity in the initial state of the normal gait determined when the last time gait was generated may be used as a provisionally determined candidate (Xs, Vxs).

To simplify the explanation, a case where the initial state of a normal gait in the X-direction (longitudinal direction) on a sagittal plane is searched for will be taken as an example. However, for the initial state of a normal gait (the initial state that meets the aforesaid boundary condition of a normal gait), it is actually required to search for the position and the velocity in the X direction (longitudinal direction) and the Y direction (lateral direction) separately or simultaneously.

Supplementally, there is no concept related to a yaw rotation or a moment vertical component or the like about a vertical axis on the sagittal plane. For this reason, at least the yaw rotation and a moment vertical component are calculated in a three-dimensional space.

As an exploratory determining technique, a method in which a pseudo-Jacobian (sensitivity matrix) is determined and then a next candidate is determined by the steepest descent method or the like, or the simplex method or the like may be used. In the present embodiment, the steepest descent method will be used.

Next, the processing proceeds to S206 via S204 and determines the initial (time Ts) vertical body position/velocity (Zs, Vzs) (Zs: vertical position; Vzs: vertical velocity) so that the vertical body position/velocity is continuous and angles of joints, such as knees, will not be excessively large or small when the normal gait is repeated. More details regarding this have been described in, for example, PCT/JP02/13592 previously applied by the present applicant, and will be therefore omitted here.

After the processing of S206, the processing proceeds to S208 to provisionally generate a normal turning gait (the normal turning gait provisionally generated may be hereinafter referred to as the provisional gait). To be more specific, based on the gait parameters of the normal gait determined in S022 of FIG. 13 described above, a desired ZMP, a desired floor reaction force vertical component, a desired foot position/posture, a reference body posture, a desired arm posture, a floor reaction force horizontal component permissible range, and a floor reaction force moment vertical component permissible range at each instant from the start time Ts to the end time Te are sequentially determined. Then, gaits from time Ts to the end time Te are generated by sequentially determining the body position/posture, taking the horizontal body position/velocity (Xs, Vxs) and the vertical body position/velocity (Zs, Vzs) mentioned above as the initial (time Ts) state of the body 3, and by using the aforesaid dynamic model (the model in FIG. 12) so as to satisfy the dynamic balance condition related to the determined desired ZMP and the desired floor reaction force vertical component and the condition of the floor reaction force horizontal component permissible range. At this time, the gaits are generated so that the body posture agrees with the reference body posture as much as possible.

Moreover, an antiphase arm swing motion is determined such that the condition related to the floor reaction force moment vertical component, i.e., the floor reaction force moment vertical component permissible range, is satisfied.

Incidentally, the gait generation of the normal gait is performed merely inside the gait generating device 100, and the generated gaits are not output to a composite-compliance operation determiner 104, which will be discussed later, as desired values for driving the actual robot 1.

The following will explain in detail the processing for generating a normal gait by sequential calculation, which is the processing in S208.

Figure 24:
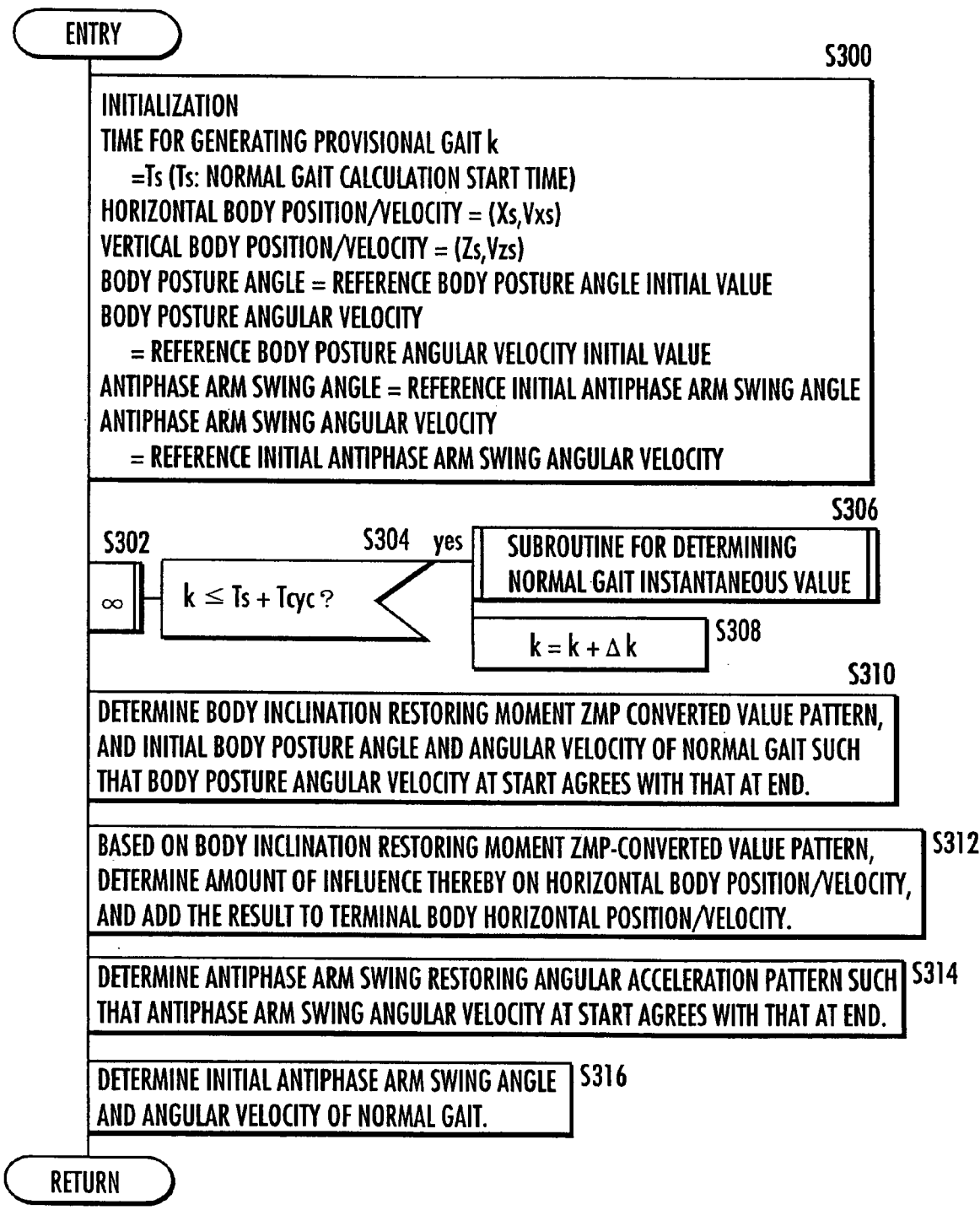
FIG. 24 is a flowchart showing subroutine processing of S208 in FIG. 23.

FIG. 24 is a subroutine flowchart illustrating the processing.

The explanation will now be given. In S300, various elements are initialized. Specifically, the start time Ts is substituted into time k for generating a provisional gait. Furthermore, a currently provisionally determined (Xs, Vxs) (determined in S202, or S216 or S218 of FIG. 23 to be discussed hereinafter) is substituted into the horizontal body position/velocity, and the latest (Zs, Vzs) determined in the aforesaid S206 is substituted into the vertical body position/velocity. In addition, an initial value of a reference body posture angle (angle at the start time Ts) is substituted into the body posture angle, and an initial value of a reference body posture angular velocity (an angular velocity at the start time Ts) is substituted into the body posture angular velocity.

A reference initial antiphase arm swing angle (angle at the start time Ts) is substituted into the antiphase arm swing angle, and a reference initial antiphase arm swing angular velocity (angular velocity at the start time Ts) is substituted into the antiphase arm swing angular velocity.

Subsequently, the processing proceeds to S304 via S302 and determines whether time k for generating a provisional gait is before gait end time (whether k≦Ts+Tcyc). If the determination result is YES, then the processing proceeds to a gait instantaneous value determining subroutine of S306 to determine a gait instantaneous value. Subsequently, the processing of the gait generating device 100 proceeds to S308 to increment time k for generating a provisional gait by Δk, and then returns to S304.

Here, Δk is an interval of the generation of provisional gaits and normally set to agree with a control cycle Δt. If the dynamic accuracy of provisional gaits is not demanding, then Δk may be set to be longer than Δt in order to reduce the volume of calculation.

If the determination result of S304 is NO, then the processing proceeds to S310. The processing described above generates a normal gait (provisional gait) from its start to end before proceeding to S310.

A gait instantaneous value determining subroutine of S306 will now be explained in detail with reference to FIG. 25.

Figure 25:
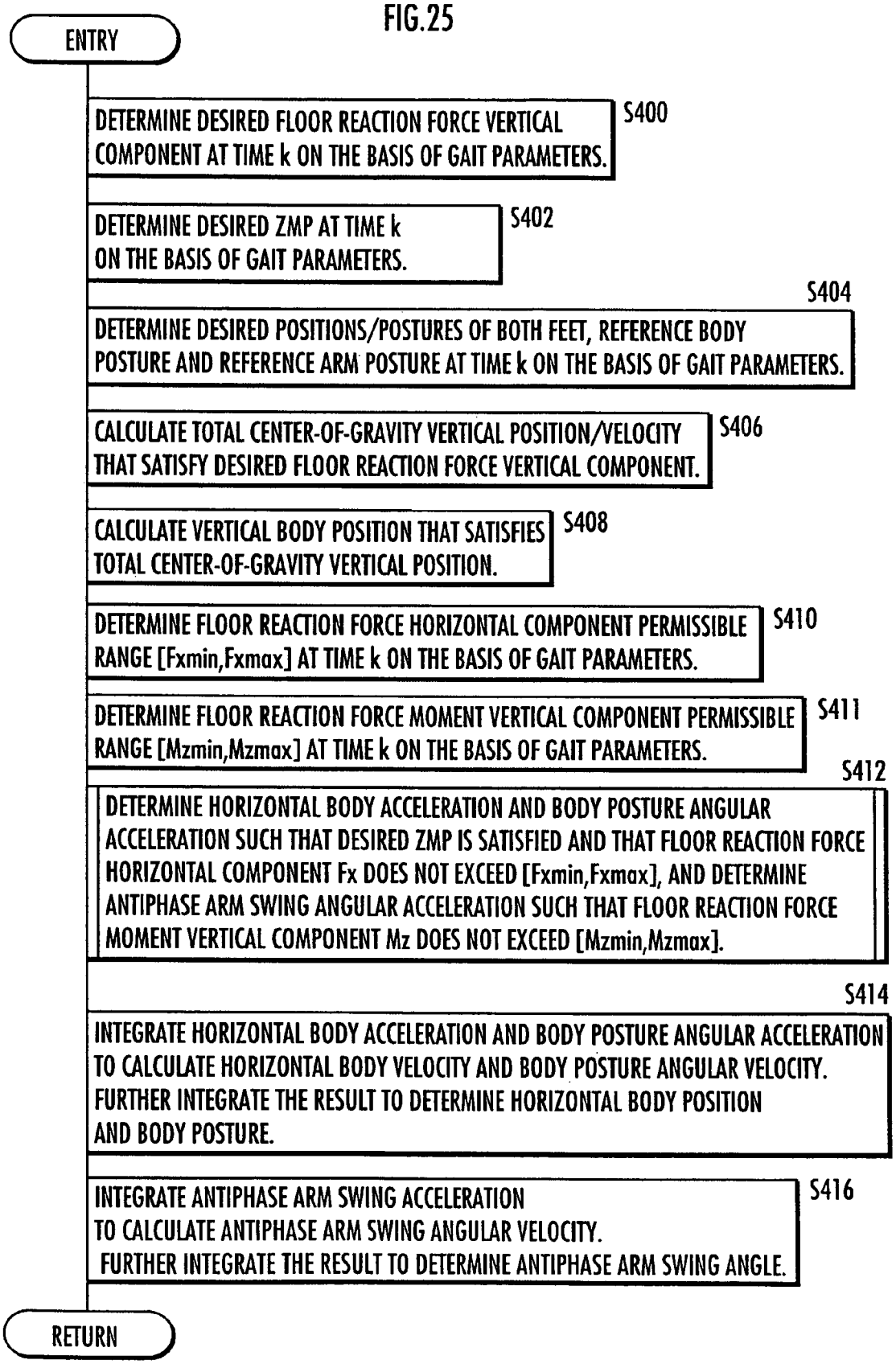
FIG. 25 is a flowchart showing subroutine processing of S306 in FIG. 24.
Figure 26:
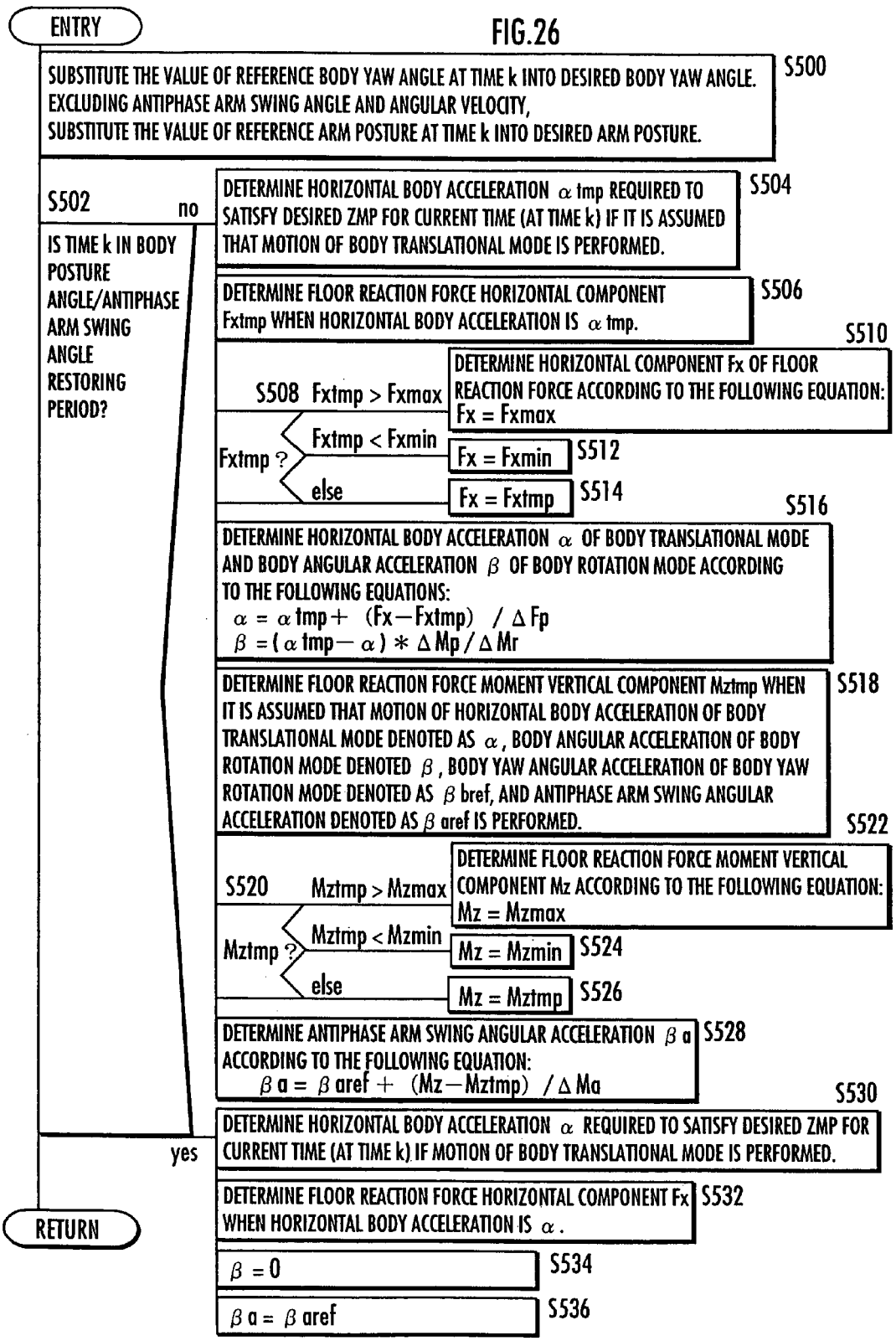
FIG. 26 is a flowchart showing subroutine processing of S412 in FIG. 25.

First, in S400 of FIG. 25, based on a normal gait parameter (the floor reaction force vertical component trajectory parameter), a value (current time value) of the desired floor reaction force vertical component shown in FIG. 19 at time k is determined. Further, in S402, a value (current time value) of the desired ZMP trajectory shown in FIG. 22 at time k is determined on the basis of a normal gait parameter (the ZMP trajectory parameter).

Then, the processing proceeds to S404 and determines the values (current time values) of desired positions/postures of both feet (desired foot positions/postures of both supporting leg and free leg), the reference body posture, and the reference arm posture at time k on the basis of the normal gait parameters (the foot trajectory parameter, the reference body posture trajectory parameter, and the arm posture trajectory parameter). To be more specific about the reference arm posture, the values (current time values) of the total center-of-gravity position of both arms 5, 5 (the relative position with respect to the body 3), the lateral interval between right and left hands (the distal ends of both arms 5, 5), and the antiphase arm swing angle are determined.

The current time value (the value at time k) of the desired foot position/posture is determined in the same manner as in the case where the foot position/posture at the start time Ts was determined in S200 of FIG. 23.

Then, the processing proceeds to S406 and calculates a value (current time value) of the total center-of-gravity vertical position/velocity at time k that satisfies the desired floor reaction force vertical component (balances the sum of the inertial force in the vertical direction and gravity of the robot 1 with the desired floor reaction force vertical component). To be more specific, the total center-of-gravity vertical position/velocity is calculated on the basis of, for example, the above Equation 01 and Equation 04 related to the dynamic model shown in FIG. 12. In other words, Equation 01 and Equation 04 provide a relational expression (a dynamic equation related to the vertical direction of the total center of gravity of the robot 1) indicating that the result obtained by multiplying the sum of the total center-of-gravity vertical acceleration and the gravity acceleration by a motion of the robot 1 by the total mass of the robot 1 is equal to a floor reaction force vertical component. Thus, the total center-of-gravity vertical acceleration is determined from the relational expression and the desired floor reaction force vertical component.

The relational expression itself generally holds without depending on a model of the robot 1. The total center-of-gravity vertical velocity is calculated by integrating the determined total center-of-gravity vertical acceleration, and further, the total center-of-gravity vertical velocity is integrated to calculate the total center-of-gravity vertical position. More generally, these calculations are carried out using the dynamic relational expressions represented by the following Equation 15 and Equation 16 (discretized equations of Newton's dynamic equations).

$$\text{Total center-of-gravity vertical velocity at time } k = \quad \text{Equation 15}$$
$$\text{Total center-of-gravity}$$
$$\text{vertical velocity at time}(k - \Delta k) +$$
$$((\text{Floor reaction force vertical componet}/\text{Total mass}$$
$$\text{of the robot}) + \text{acceleration of gravity}) *$$
$$\Delta k(\text{where the acceleration of gravity}$$
$$\text{takes a negative value})$$

$$\text{Total center-of-gravity vertical position at time } k = \quad \text{Equation 16}$$
$$\text{Total center-of-gravity vertical position at time}(k - \Delta k) +$$
$$\text{Total center-of-gravity vertical velocity at time } k * \Delta k$$

Subsequently, the processing proceeds to S408 and calculates the vertical body position that satisfies the total center-of-gravity vertical position. To be more specific, the vertical body position is calculated using, for example, Equation 04 related to the model in FIG. 12. Specifically, the vertical positions of the supporting leg mass point 2m and the free leg mass point 2m of the model in FIG. 12 are determined from the current time values of the desired foot positions/postures of the supporting leg and the free leg. Then, these determined vertical positions of the supporting leg mass point 2m and the free leg mass point 2m and the current time value of the total center-of-gravity vertical position determined in S407 are applied to Equation 04 so as to determine the vertical position of the body mass point 3m. Furthermore, the vertical body position is determined from the determined vertical position of the body mass point 3m and the current value of the desired body posture angle (the reference body posture angle set in S404 or the last time (time k−Δk) desired body posture angle determined in S414 to be discussed hereinafter).

The sequence then proceeds to S410 wherein the values (current time values), at time k, of the floor reaction force horizontal component permissible range [Fxmin, Fxmax] shown in FIG. 20 are determined on the basis of the gait parameter (the parameter defining the floor reaction force horizontal component permissible range) determined in S108 of FIG. 15 described above.

Subsequently, the processing proceeds to S411 wherein the value (current time value), at time k, of the floor reaction force moment vertical component permissible range [Mzmin, Mzmax] shown in FIG. 21 is determined on the basis of the gait parameter (the parameter defining the floor reaction force moment vertical component permissible range) determined in S109 of FIG. 15 described above.

Then, the processing proceeds to S412 wherein the current time values of the desired horizontal body acceleration and the desired body posture acceleration are determined such that the dynamic balance condition related to the desired ZMP (the condition in that the horizontal component of a moment generated about the desired ZMP by a resultant force of an inertial force and the gravity of the robot 1 is zero) is satisfied. The horizontal body acceleration and the body posture angular acceleration (more specifically, the body inclination angular acceleration) are determined such that the floor reaction force horizontal component Fx does not exceed [Fxmin, Fxmax]. Further, the current time value of the desired antiphase arm swing angular acceleration is determined such that the floor reaction force moment vertical component Mz does not exceed [Mzmin, Mzmax].

In the body posture angle, the yaw angle is determined so as to agree with the yaw angle of the reference body posture angle. Regarding the desired arm posture, components other than the antiphase arm swing angle are determined to agree with the reference arm posture. At this time, the desired body inclination angle and the desired antiphase arm swing angle are determined to follow the reference body inclination angle and the reference antiphase arm swing angle, respectively, as much as possible, while satisfying the aforesaid condition. This will be explained in detail below.

At this point, the instantaneous values (current time values) of the foot position/posture and the vertical body position have been determined as described above. Regarding the arm posture, the components other than the antiphase arm swing angle have been determined to agree with those of the reference arm posture. Therefore, once the remaining horizontal body position, body posture angle and antiphase arm swing angle are determined, the desired motion of the robot 1 will be uniquely determined. Hence, all floor reaction forces will be also uniquely determined. In the present embodiment, the desired floor reaction force vertical component and the desired ZMP of a normal gait are defined by the floor reaction force vertical component trajectory parameters and the desired ZMP trajectory parameters, respectively, determined in S022 of FIG. 13 described above.

When generating a gait, if the body inclination mode is primarily used to satisfy a desired ZMP (to set the horizontal component of a floor reaction force moment about a desired ZMP to zero) without using the aforesaid body translational mode much, then the body posture angle may become excessively large. To prevent this, therefore, the body translational mode should be used as much as possible. However, the body translational mode involves floor reaction force horizontal component changes, so that slippage may occur if the body translational mode is intensely effected when the floor reaction force horizontal component permissible range is narrow. In this case, depending upon the body inclination mode is an inevitable choice. Especially during a period in which the floor reaction force horizontal component permissible range is zero, as in the aforesaid running gait, it is impossible to generate a gait that produces a floor reaction force horizontal component. Hence, depending upon the body inclination mode is an inevitable choice.

Meanwhile, an antiphase arm swing motion allows only the floor reaction force moment vertical component to be changed without changing any of the horizontal component of a floor reaction force moment about a desired ZMP and the floor reaction force horizontal component, so that it can be used to prevent the floor reaction force moment vertical component from exceeding the aforesaid floor reaction force moment vertical component permissible range. Considering the above, in the present embodiment, the horizontal body acceleration, the body posture angular acceleration, and the antiphase arm swing acceleration are determined according to the flowchart shown in FIG. 26. For the convenience of understanding, regarding the determination of the horizontal body acceleration and the body posture angular acceleration (the angular acceleration of an inclination angle of the body 3), a case where the horizontal body acceleration and the body posture angular acceleration in the X direction (longitudinal direction) are determined on a sagittal plane will be taken as an example. Actually, however, the horizontal body acceleration and the body posture angular acceleration in the Y direction (lateral direction) are also determined in the same manner as that for the X direction.

First, in S500, the value of the reference body yaw angle at time k is substituted into the desired body yaw angle. Further, the value of a reference arm posture at time k is substituted into the desired arm posture, excluding the antiphase arm swing angle and the angular velocity component of an arm posture.

Then, in S502, it is determined whether the current time (the value of a timer for generating a normal gait) k is in the period of restoring a body posture angle and an antiphase arm swing angle (the period of restoring a body posture angle and an antiphase arm swing angle being the period from time Tm to time Ts2 and the period from time Tm2 to Te in the case of a normal gait). The processing proceeds to S504 if the determination result of S502 is NO, or to S530 if the determination result is YES.

In S504, a horizontal body acceleration αtmp is determined, which is required to satisfy the current (time k) desired ZMP if the robot 1 is made to perform a motion of the body translational mode from a last time instantaneous gait state (the gait state at time k−1) of the robot 1, with the angular acceleration of the body inclination mode being set to zero. The αtmp is determined using, for example, the above Equation 03y related to the dynamic model of FIG. 12 described above. To be more specific, for example, time series values of desired foot positions/postures determined up to the current time k are used to determine the vertical accelerations of the supporting leg mass point 2m and the free leg mass point 2m at the current time k, and a desired foot position/posture at the current time k (current time) is used to determine the vertical positions of the supporting leg mass point 2m and the free leg mass point 2m. Furthermore, the floor reaction force vertical position at the current time k (current time) is used to determine the vertical position of the body mass point 3m, and the vertical acceleration of the body mass point 3m at the current time k is determined by using time series values of the desired vertical body positions determined up to the current time k. Then, these determined values are substituted into the above Equation 03y, and an equation obtained by setting My and d2θby/dt2 of the Equation 03y to zero is solved on d2Xb/dt2 so as to determine the body mass point horizontal acceleration as the horizontal body acceleration αtmp. A more precise dynamic model may be used to exploratorily determine the horizontal body acceleration αtmp that sets the horizontal component of the floor reaction force moment about the desired ZMP to zero. Further, in the present embodiment, the reference body posture related to the inclination angle of the body 3 is the vertical posture and the body posture angular acceleration (the angular acceleration of the inclination angle of the body 3) in the reference body posture is zero, so that the angular acceleration in the body inclination mode was set to zero to determine the horizontal body acceleration αtmp. If, however, the reference body posture trajectory parameters are set so that the inclination angle of the reference body posture changes and if the reference body posture angular acceleration (the reference angular acceleration of the inclination angle of the body 3) at the current time k determined thereby is not zero, then the angular acceleration in the body inclination mode may be set to the value of the reference body posture angular acceleration, which is not zero, to determine the horizontal body acceleration αtmp by using a dynamic model (for example, d2θby/dt2 of Equation 03y may be set to a reference body posture angular acceleration that is not zero to determine the horizontal body acceleration αtmp in the same manner as described above).

Next, the processing proceeds to S506 wherein a floor reaction force horizontal component Fxtmp at time k when the horizontal body acceleration is αtmp is determined using a dynamic model. In the present embodiment, Fxtmp is determined using Equation 02x of the dynamic model. In other words, Fxtmp is determined according to the following Equation 17, where d2Xsup/dt2 and d2Xswg/dt2 denote the supporting leg foot mass point horizontal acceleration and the free leg foot mass point horizontal acceleration at time k.

$$Fxtmp = mb*\alpha tmp + msup*d2Xsup/dt2 + mswg*d2Xswg/dt2 \qquad \text{Equation 17}$$

Figure 27:
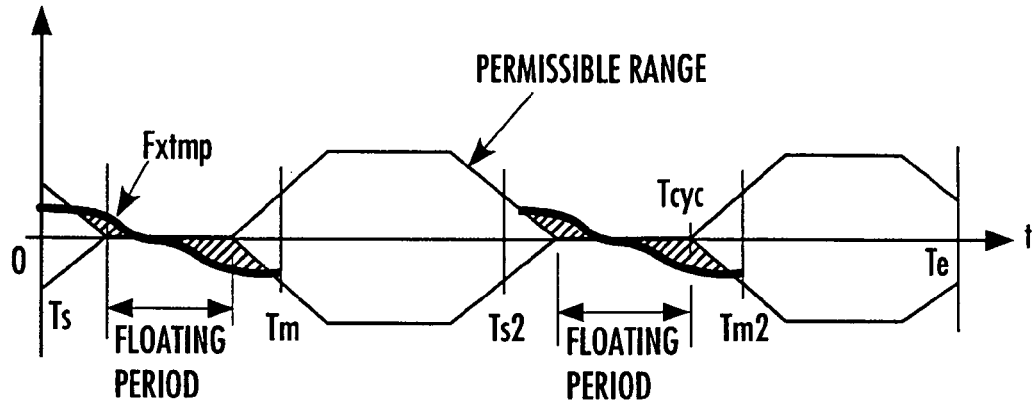
FIG. 27 is a graph showing an example of a floor reaction force horizontal component in which a permissible range is not considered.

An example of Fxtmp determined as described above is shown in FIG. 27. In FIG. 27, a portion wherein Fxtmp exceeds the floor reaction force horizontal component permissible range [Fxmin, Fxmax] is hatched.

Subsequently, the processing proceeds to S508 wherein a horizontal body acceleration α in the body translational mode and a floor reaction force horizontal component Fx generated thereby, and a body angular acceleration β in the body inclination mode are determined as shown below (S508 to S516).

Specifically,

If Fxtmp>Fxmax, then the processing proceeds to S510 wherein Fx is determined according to the following equation.

$$Fx = Fxmax \qquad \text{Equation 18}$$

If Fxtmp<Fxmin, then the processing proceeds to S512 wherein Fx is determined according to the following equation.

$$Fx = Fxmin \qquad \text{Equation 19}$$

In other cases, that is, if Fxtmp lies within the floor reaction force horizontal component permissible range [Fxmin, Fxmax], then the processing proceeds to S514 wherein Fx is determined according to the following equation.

$$Fx = Fxtmp \qquad \text{Equation 20}$$

In any case, the processing proceeds to S516 wherein the horizontal body acceleration α and the body posture angular acceleration (body inclination angular acceleration) β are determined according to the following equations.

$$\alpha = \alpha tmp + (Fx - Fxtmp)/\Delta Fp \qquad \text{Equation 21}$$

$$\beta = (\alpha tmp - \alpha)*\Delta Mp/\Delta Mr \qquad \text{Equation 22}$$

where ΔFp, ΔMp, and ΔMr are determined according to the above Equations 06, 07, and Equation 09, respectively.

Supplementally, if higher accuracy of the dynamic calculation is required, then, after determining the body angular acceleration β as described above, the horizontal body acceleration α in the body translational mode should be analytically or exploratorily determined by using a more precise dynamic model so that a motion obtained by combining the body translational mode and the body inclination mode of the above determined body angular acceleration β satisfies the desired ZMP. As an exploratory determining method, a method in which a pseudo-Jacobian (sensitivity matrix) is determined and then a next candidate is determined by the pseudo-Newton method or the like, or the simplex method or the like may be used.

Further, in order to strictly prevent the floor reaction force horizontal component Fx from exceeding the floor reaction force horizontal component permissible range [Fxmin, Fxmax], a set of the horizontal body acceleration α and the body angular acceleration β may be exploratorily searched for such that Fx=Fxmax and the horizontal component of the floor reaction force moment about the desired ZMP is zero in S510 and also Fx=Fxmin and the horizontal component of the floor reaction force moment about the desired ZMP is zero in S512.

Figure 28:
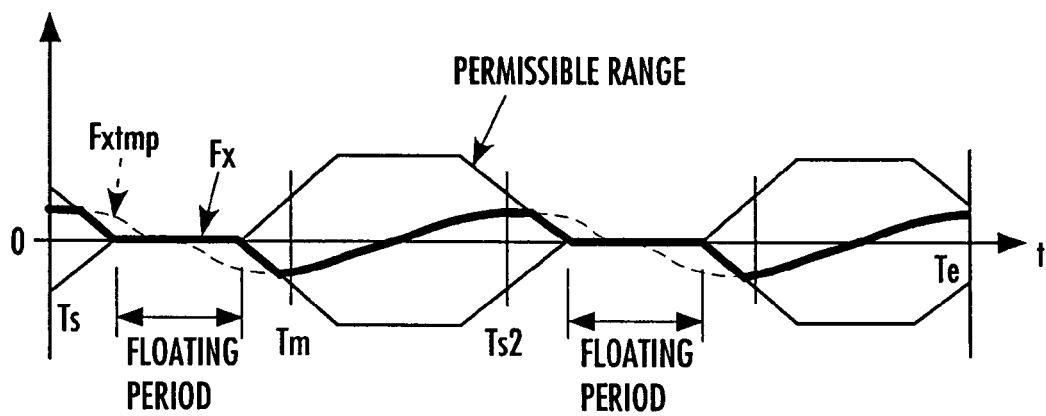
FIG. 28 is a graph showing an example of the floor reaction force horizontal component in which a permissible range is considered.

FIG. 28 shows Fx determined as described above. Fx has been limited (saturated) so that a value of Fxtmp does not exceed the floor reaction force horizontal component permissible range [Fxmin, Fxmax]. More specifically, Fxtmp is directly used as Fx if Fxtmp based on the horizontal body acceleration αtmp by the body translational mode alone lies within the permissible range [Fxmin, Fxmax]. If Fxtmp based on the horizontal body acceleration αtmp by the body translational mode alone exceeds an upper limit of the permissible range [Fxmin, Fxmax] or reduces below a lower limit thereof, then Fx is forcibly limited to Fxmax and Fxmin, respectively. Especially in a floating period of a running gait, Fxmax=Fxmin=0 applies all the times, so that Fx=0.

Figure 29:
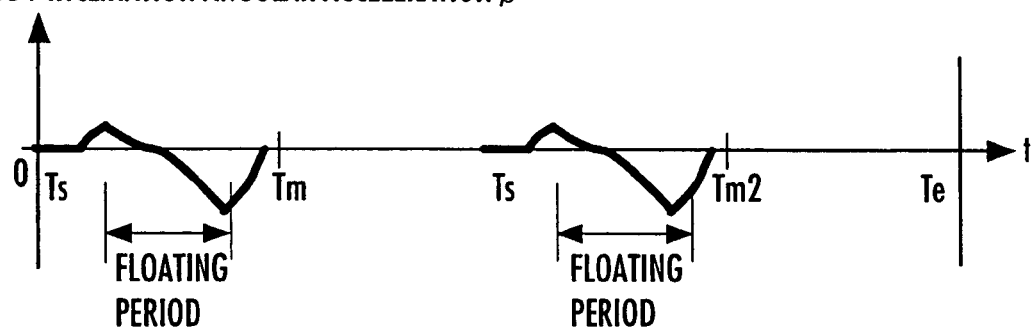
FIG. 29 is a graph showing an example of a body inclination angular acceleration.

FIG. 29 shows the body posture angular acceleration β determined as described above. Thus, an insufficient portion of the floor reaction force moment caused by limiting the acceleration in the body translational mode so as to prevent Fx generated by the body translational mode from exceeding the permissible range [Fxmin, Fxmax] (more specifically, the moment obtained by subtracting a moment component produced by a limited body horizontal motion and the motions of both legs 2, 2 from an inertial force moment required for reducing the horizontal component of a floor reaction force moment about the desired ZMP to zero) has been compensated for by the body inclination mode. During a floating period of a running gait, the horizontal body acceleration α by the body translational mode is always limited to zero, so that the insufficient portion of the floor reaction force moment is compensated for only by the body posture angular acceleration β by the body inclination mode.

Subsequently, the processing proceeds to S518 to determine a floor reaction force moment vertical component Mztmp when a motion in which, for example, a horizontal body acceleration in the body translational mode is α, a body angular acceleration (body inclination angular acceleration) in the body inclination mode is β, a body acceleration in the body yaw rotation mode (body yaw angular acceleration) is a reference yaw angular acceleration d2θbzref/dt2, and an antiphase arm swing angular acceleration βa is a reference antiphase arm swing angular acceleration d2θazref/dt2, is performed. Hereinafter, d2θbzref/dt2 will be βbref, and d2θazref/dt2 will be βaref.

To be more specific, Mz obtained by substituting Equation 1001 through Equation 1004 into Equation 03z is Mztmp.

$$d2Xb/dt2 = \alpha x \qquad \text{Equation 1001}$$

$$d2Yb/dt2 = \alpha y \qquad \text{Equation 1002}$$

$$d2\theta bz/dt2 = \beta bref \qquad \text{Equation 1003}$$

$$d2\theta az/dt2 = \beta aref \qquad \text{Equation 1004}$$

where αx denotes an X component of the horizontal body acceleration α, and αy denotes a Y component of the horizontal body acceleration α. Furthermore, a horizontal body position at time k−1 is substituted into Xb and Yb, and a value of time k is substituted into Xzmp, Yzmp, Xsup, d2Ysup/dt2, Xswg, and d2Yswg/dt2.

Figure 32:
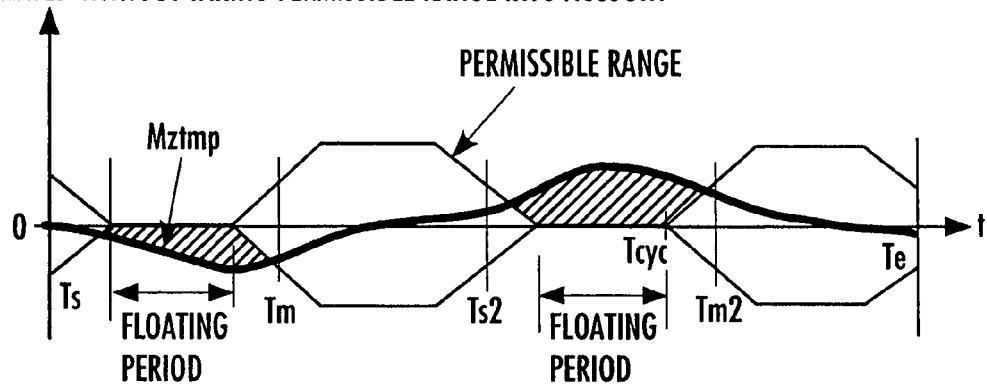
FIG. 32 is a graph showing an example of a floor reaction force moment vertical component in which a permissible range is not considered.

FIG. 32 shows an example Mztmp determined as described above. In FIG. 32, the portion of Mztmp that exceeds the floor reaction force moment vertical component permissible range [Mzmin, Mzmax] is shown by hatching.

Next, the processing proceeds to S520 wherein an antiphase arm swing angular acceleration βa is determined as shown below (S520~S528).

Specifically,

If Mztmp>Mzmax, then the processing proceeds to S522 wherein Mz is determined according to the following equation.

$$Mz = Mzmax \quad \text{Equation 1018}$$

If Mztmp<Mzmin, then the processing proceeds to S524 wherein Mz is determined according to the following equation.

$$Mz = Mzmin \quad \text{Equation 1019}$$

In other cases, that is, if Mztmp lies within the floor reaction force horizontal component permissible range [Mzmin, Mzmax], then the processing proceeds to S526 wherein Mz is determined according to the following equation.

$$Mz = Mztmp \quad \text{Equation 1020}$$

In any case, the processing proceeds to S528 wherein the antiphase arm swing angular acceleration βa is determined according to the following equation.

$$\beta a = \beta aref + (Mztmp - Mz)/\Delta Maz \quad \text{Equation 1021}$$

where ΔMaz is determined according to Equation 09a.

The following will explain the processing from S518 to S528.

Mz determined as described above denotes a floor reaction force moment vertical component from a motion of the entire robot, including an antiphase arm swing.

Figure 33:
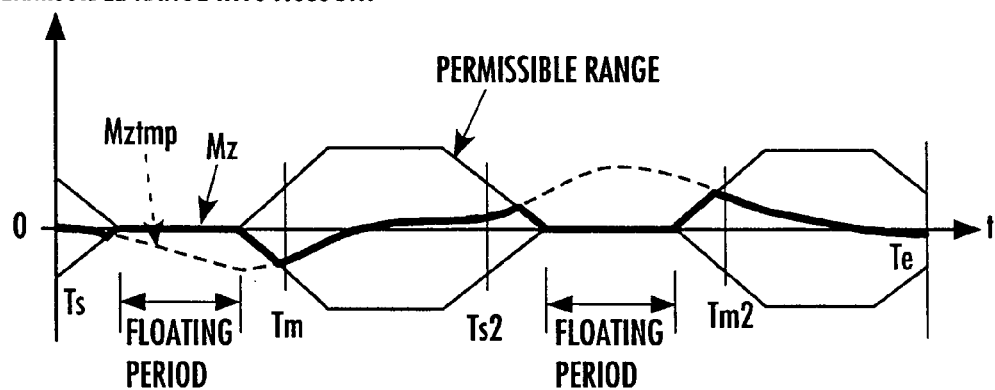
FIG. 33 is a graph showing an example of a floor reaction force moment vertical component in which the permissible range is considered.

In the above processing, the antiphase arm swing angular acceleration βa has been determined such that the Mz does not exceed the floor reaction force moment vertical component permissible range [Mzmin, Mzmax]. To be more specific, Mz has been determined to be limited (saturated) so that a value of Mztmp does not exceed the floor reaction force horizontal component permissible range [Mzmin, Mzmax], as shown in FIG. 33. More detailedly, Mztmp is directly used as Mz if Mztmp lies within the permissible range [Mzmin, Mzmax]. If Mztmp exceeds an upper limit of the permissible range [Mzmin, Mzmax] or reduces below a lower limit thereof, then Mz is forcibly limited to Mzmax and Mzmin, respectively. Especially in a floating period of a running gait, Mzmax=Mzmin=0 applies all the times, so that Mz=0.

Figure 34:
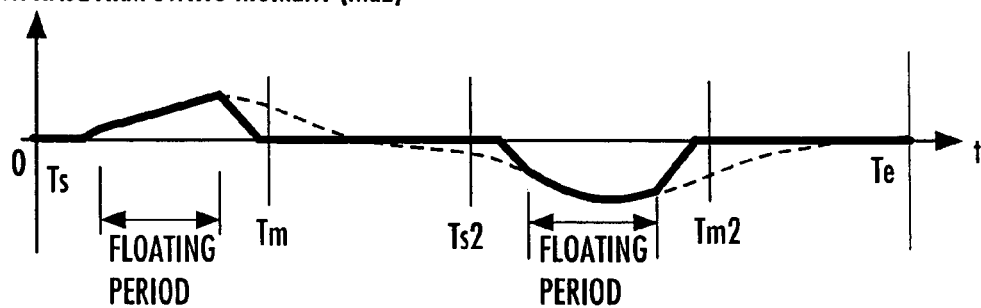
FIG. 34 is a graph showing an example of an antiphase arm swing moment.

A moment vertical component Maz to be generated by an antiphase arm swing in order to prevent Mz from exceeding the floor reaction force moment vertical component permissible range [Mzmin, Mzmax] is obtained by (Mz−Mztmp). Maz(=Mz−Mztmp) is shown in FIG. 34.

Figure 35:
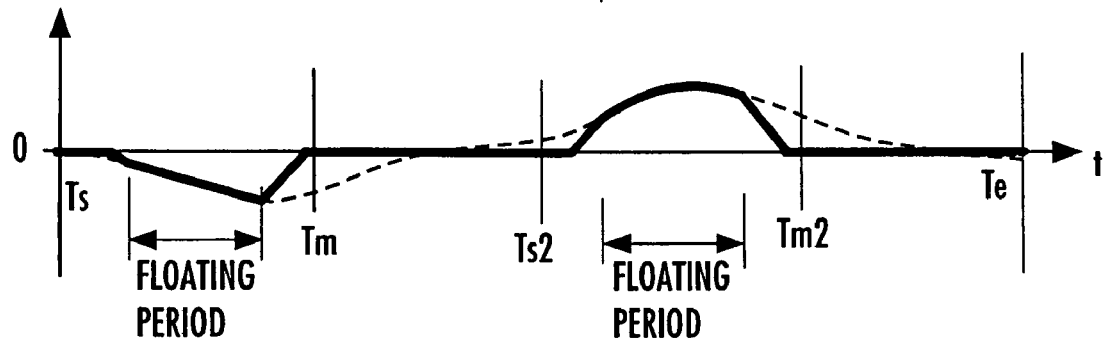
FIG. 35 is a graph showing an antiphase arm swing angular acceleration corresponding to the antiphase arm swing moment shown in FIG. 34.

The antiphase arm swing angular acceleration βa can be obtained by adding the result obtained by dividing Maz by an equivalent inertial moment ΔMaz of an antiphase arm swing to a reference antiphase arm swing angular acceleration βaref (a value obtained by subjecting a reference antiphase arm swing angle to second order differentiation). Specifically, βa is determined according to the above Equation 1021. The antiphase arm swing angular acceleration βa is shown in FIG. 35.

As described above, in the processing from S504 to S528, the antiphase arm swing angular acceleration βa is determined such that the floor reaction force moment vertical component Mz generated by a motion of the entire robot, including an antiphase arm swing, does not exceed the permissible range [Mzmin, Mzmax] (such that the floor reaction force moment vertical component Mztmp offsets (cancels) the portion of the floor reaction force moment vertical component Mztmp that exceeds the permissible range, the floor reaction force moment vertical component Mztmp being generated when an antiphase arm swing angular acceleration is set to agree with the reference antiphase arm swing angular acceleration βaref).

Supplementally, to strictly prevent the floor reaction force moment vertical component Mz from exceeding the floor reaction force moment vertical component permissible range [Mzmin, Mzmax], the antiphase arm swing angular acceleration βa should be analytically or exploratorily determined by using a more precise dynamic model in place of the processing from S504 to S528. As an exploratory determining method, a method in which a pseudo-Jacobian (sensitivity matrix) is determined and then a next candidate is determined by the pseudo-Newton method or the like, or the simplex method or the like may be used.

The above processing is performed if time k is not found during the period of restoring a body posture angle and an antiphase arm swing angle.

If a determination result of S502 is YES, then the following processing will be carried out. First, the processing proceeds to S530 to determine the horizontal body acceleration α required to satisfy the desired ZMP of current time (time k) when the robot 1 is made to perform a motion of the body translational mode, with the angular acceleration in the body inclination mode being set to zero, from the last time instantaneous gait state (the gait state at time k−1) of the robot 1, and this is determined as a final horizontal body acceleration.

Next, the processing proceeds to S532 wherein the floor reaction force horizontal component Fx in the aforesaid case is determined.

Next, the processing proceeds to S534 wherein the body posture angular acceleration (the body inclination angular acceleration) β is determined to be zero. The body yaw angular acceleration is determined to be the reference body yaw angular acceleration βbref (the value obtained by subjecting the reference body yaw angle to second order differentiation).

Lastly, the processing proceeds to S536 wherein the reference antiphase arm swing angular acceleration βaref (the value obtained by subjecting the reference antiphase arm swing angle to second-order differentiation) is substituted into the antiphase arm swing angular acceleration βa.

The above is the processing carried out if the determination result of S502 is YES. More specifically, in this case, the body posture angular acceleration (the body inclination angular acceleration and the body yaw angular acceleration) is set to agree with the reference body posture angular acceleration, and the antiphase arm swing angular acceleration is set to agree with a reference antiphase arm swing angular acceleration. It is expected that this setting will not cause a floor reaction force generated by a motion to exceed the floor reaction force horizontal component permissible range and the floor reaction force moment vertical component permissible range; therefore, determining as described above will present no problem.

After the processing of S528 or S536, the processing proceeds to S414 of FIG. 25 wherein the horizontal body acceleration determined in S412 is sequentially integrated (cumulative addition from time Ts to current time k) so as to determine a horizontal body velocity, and further, the horizontal body velocity is sequentially integrated (cumulative addition from time Ts to current time k) so as to determine a horizontal body position (current time value). Further, the body posture angular acceleration determined in S412 is sequentially integrated (cumulative addition from time Ts to the current time k) so as to determine a body posture angular velocity, and further, the body posture angular velocity is sequentially integrated (cumulative addition from time Ts to the current time k) so as to determine a body posture angle (current time value).

The processing then proceeds to S416 wherein the antiphase arm swing acceleration βa determined in S412 is sequentially integrated (cumulative addition from time Ts to the current time k) so as to determine an antiphase arm swing velocity, and further, the determined antiphase arm swing velocity is sequentially integrated (cumulative addition from time Ts to the current time k) so as to determine an antiphase arm swing angle θaz (current time value).

After the normal gait instantaneous value determining subroutine of S306 in FIG. 24 is carried out, the processing proceeds to S308 wherein the value of time k for generating a gait is incremented by a gait generation interval Δk. Then, the processing returns to S304 to repeat the processing of S306 and S308 as long as the condition shown in S304 is satisfied. When the condition shown in S304 is no longer satisfied, that is, when the generation of provisional gaits up to the end (time Te=Ts+Tcyc) is completed, the processing proceeds to S310.

For a normal gait, an initial body posture angle and its angular velocity must be determined such that motional states of the robot 1 are not discontinuous at boundaries when the normal gait is repeated.

Hence, in S310, a pattern of a ZMP-converted value (hereinafter referred to as the body posture restoring moment ZMP-converted value and abbreviated to ZMPrec) of a floor reaction force moment for generating a body posture angular acceleration for setting a body posture angular velocity back to an initial value (the value at time Ts) by time Te is set.

This will be explained in detail below.

The following will discuss the procedure for setting a body posture angular velocity back to an initial value (the value at time Ts) by generating a body posture angular acceleration by using the body inclination mode during the body posture angle and antiphase arm swing angle restoring period (the period from time Tm to time Ts2 and from time Tm2 to Te). A body posture angular acceleration pattern for this purpose is denoted by β(k). In periods other than the above-mentioned period, β(k)=0 will apply.

In the body inclination mode, generating the body posture angular acceleration β(k) will generate a floor reaction force moment β(k)*ΔMr. As a result, if the floor reaction force vertical component at that instant is denoted by Fz(k), then ZMP(k) calculated from a motion (rather than a desired ZMP) will be shifted by ΔZMP determined according to the following equation.

$$\Delta ZMP(k) = -\beta(k)*\Delta Mr/Fz(k) \qquad \text{Equation 23}$$

Therefore, if the pattern of ΔMr and the pattern of Fz(k) have been determined (known), then the body posture angular velocity can be set back to the initial value (the value at time Ts), that is, the body posture angular velocity in an initial (time Ts) state of the reference body posture trajectory by appropriately setting a pattern of ΔZMP(k) to generate a body posture angular acceleration pattern that satisfies Equation 23.

The aforesaid body posture restoring moment ZMP-converted value (ZMPrec) means ΔZMP(k) that has been appropriately set as described above. Strictly speaking, ΔMr varies when setting the body posture restoring moment ZMP-converted value by using the above Equation 23, but it may be approximately set at a constant value. This is because the normal gait is merely generated for temporary use and not used to make an actual robot follow the gait, so that the dynamic accuracy of a normal gait does not have to be very high.

Figure 30:
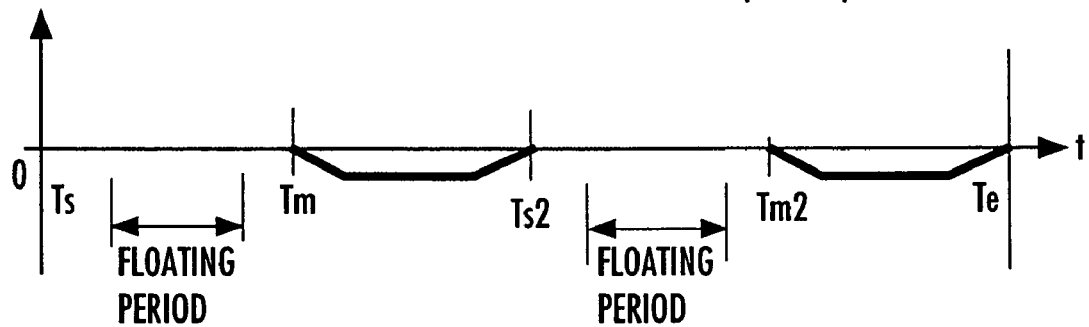
FIG. 30 is a graph showing an example of a body inclination restoring moment ZMP-converted value for restoring a body inclination angle of the robot.

FIG. 30 illustrates an example of ZMPrec. In FIG. 30, as a pattern of ZMPrec, trapezoidal patterns are formed for the period from time Tm to time Ts2 and for the period from time Tm2 to time Te. The times of break points of the trapezoidal portions are set to agree with the times of break points of a desired ZMP pattern in the period between time Tm and time Ts2 and the period from Tm2 to Te (refer to FIG. 22). This is because correction of the desired ZMP pattern of a current time gait will be easier, as it will be discussed hereinafter.

Substituting ZMPrec(k) into ΔZMP(k) of Equation 23 provides the following equation.

$$\beta(k) = -ZMPrec(k)*Fz(k)/\Delta Mr \qquad \text{Equation 24}$$

Figure 31:
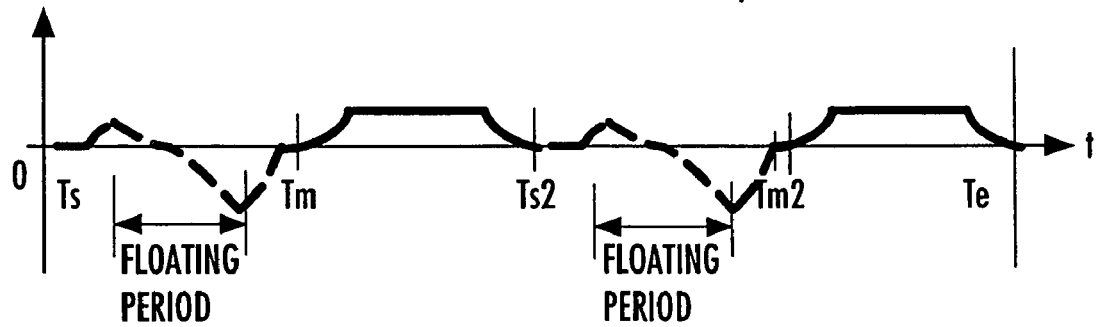
FIG. 31 is a graph showing an example of a body inclination angular acceleration in which the body inclination restoring moment ZMP-converted value is reflected.

Therefore, β(k) determined in this Equation 24 will be as indicated by the solid lines in FIG. 31. The dashed lines in FIG. 31 indicate the body posture angular acceleration during the period from time Ts to time Tm and the period from time Tm2 to Te (indicated by the solid lines in FIG. 29). (Hereinafter, (k) may be omitted if a value is obviously the value at time k.)

The initial (time Ts) body posture angle is set to agree with the initial (time Ts) reference body posture angle.

Further, the initial body posture angular velocity is determined to satisfy Equations 37a and 37b.

Terminal body posture angle −  
 Initial body posture angle =  
  Second-order integration of a body posture  
   angular acceleration that has been  
  determined to satisfy a floor reaction force  
   horizontal component permissible range +  
  Second-order integration of a body posture angular  
   acceleration generated by ZMPrec + Initial body  
    posture angular velocity * Cycle of normal gait  
   Equation 37a Terminal body posture angular velocity −  
 Initial body posture angular velocity =  
  First-order integration of a body posture  
   angular accleration that has been  
  determined to satisfy a floor reaction force  
   horizontal component permissible range +  
  First-order integration of a body posture  
   angular acceleration generated by ZMPrec  
   Equation 37b The integration period of the first term of the right side of each of Equations 37a and 37b is the period combining the period from time Ts to Tm and the period from Ts2 to Tm2, while the integration period of the second term of the right side is the period combining the period from time Tm to Ts2 and the period from Tm2 to Te.

To explain more specifically, in a normal gait, an initial state posture angle and an angular velocity observed from a supporting leg coordinate system of a first turning gait (a next time's gait supporting leg coordinate system) must agree with a terminal body posture angle and angular velocity, respectively, observed from a supporting leg coordinate system of the next first turning gait (the next but two time gait supporting leg coordinate system). Therefore, in the present embodiment, the initial (time Ts) body posture angle is determined to be the value of the initial (time Ts) reference body posture angle, and this value and the value obtained by subjecting this value to coordinate conversion into a value observed from the next time's gait supporting leg coordinate system by a matrix (matrix of rotational coordinate conversion) based on a total turning angle (turning angle about a vertical axis) of the robot 1 in a normal gait are substituted into the initial body posture angle and the terminal body posture angle, respectively, in the left side of Equation 37a. The body posture angular acceleration determined in S518 of FIG. 26 described above is used as the body posture angular acceleration related to the integration of the first term of the right side of Equations 37a and 37b.

Then, the initial body posture angular velocities of Equations 37a and 37b and the heights of the trapezoids of ZMPrec (the trapezoidal patterns shown in FIG. 30) related to the integration of the second terms of the right sides of Equations 37a and 37b are taken as unknown numbers (However, the times of the break points of the trapezoidal patterns of ZMPrec are determined beforehand. Further, a trapezoidal height acyc1 of ZMPrec of a first turning gait and a trapezoidal height acyc2 of ZMPrec of a second turning gait are set to have the same value.) An initial body posture angular velocity determined by solving the simultaneous equation of Equations 37a and 37b including the unknown numbers is decided as a new initial body posture angular velocity. In this case, the terminal body posture angular velocity in Equation 37b is obtained by coordinate-converting the initial body posture angular velocity, which is an unknown number, into a value observed from a next time's gait supporting leg coordinate system by a matrix based on the above total turning angle of a normal gait.

Subsequently, the processing proceeds to S312 wherein an amount of influence exerted by a body inclination restoring moment ZMP-converted value (ZMPrec) pattern on a horizontal body position and velocity is determined on the basis thereof, and the determined amount is added to the terminal horizontal body position and velocity.

This processing will be explained. The details thereof have been explained in PCT/JP02/13592 by the present applicant, so that only a brief explanation will be given here.

During the period from time Ts to Tm and the period from time Ts2 to Te, if the body posture angular acceleration β is changed to generate the body inclination restoring moment ZMP-converted value (ZMPrec) pattern, as described above, then the body posture angular acceleration β is determined according to the following equation.

$$\beta = -ZMPrec*Fz/\Delta Mr \quad \text{Equation 1025}$$

The horizontal body acceleration that satisfies the desired ZMP when no body inclination restoring moment is generated is αtmp as determined in S532. When the body posture angular acceleration α is changed as described above, the horizontal body acceleration β required to satisfy the desired ZMP is determined-according to the following equation.

$$\alpha = \alpha tmp - (\Delta Mr/\Delta Mp)*\beta \quad \text{Equation 1026}$$

From Equations 1025 and 1026, $$\alpha = \alpha tmp + ZMPrec*Fz/\Delta Mp \quad \text{Equation 1027}$$

In other words, the acceleration is increased by an equivalent to the second term of the right side of Equation 1027 by the body inclination restoring moment ZMP-converted value (ZMPrec).

Using the linearity of the equations, the terminal horizontal body velocity obtained when the body posture angular acceleration β is changed to generate the body inclination restoring moment ZMP-converted value (ZMPrec) pattern as described above will be determined by adding the first-order integration of ($ZMPrec*Fz/\Delta Mp$) from time Ts to Te to the terminal horizontal body velocity obtained when the body inclination restoring moment ZMP-converted value (ZMPrec) pattern is not generated, i.e., the terminal value of the horizontal body velocity determined in S414. Further, the terminal horizontal body position obtained when the body posture angular acceleration β is changed to generate the body inclination restoring moment ZMP-converted value (ZMPrec) pattern as described above will be determined by adding the second-order integration of ($ZMPrec*Fz/\Delta Mp$) from time Ts to Te to the terminal horizontal body position obtained when the body inclination restoring moment ZMP-converted value (ZMPrec) pattern is not generated, i.e., the terminal value of the horizontal body position determined in S414.

After completing the processing of S312, the processing proceeds to S314 wherein an antiphase arm swing restoring angular acceleration (βarec) pattern is determined such that the antiphase arm swing angular velocities at a start and an end agree.

Figure 36:
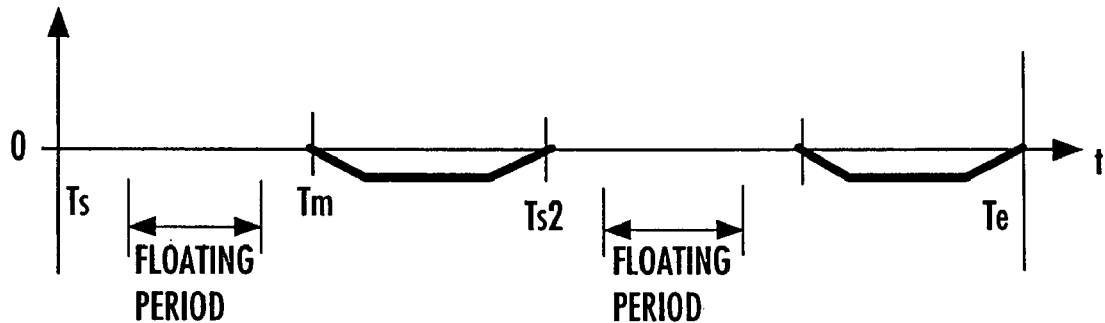
FIG. 36 is a graph showing an example of an antiphase arm swing restoring angular acceleration for restoring an antiphase arm swing angle.
Figure 37:
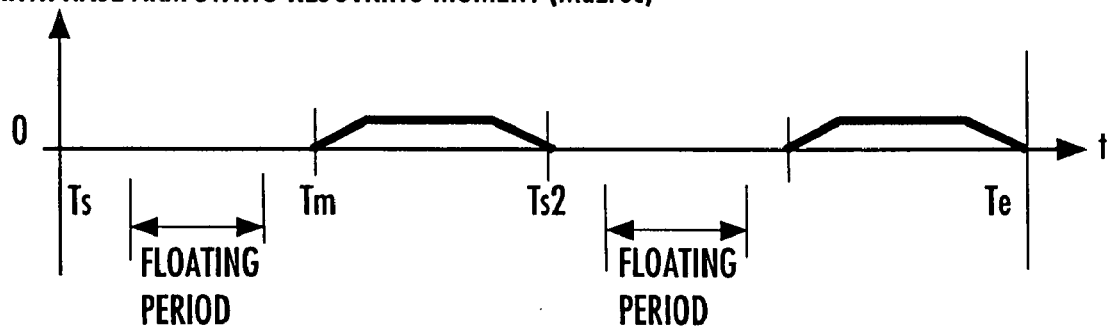
FIG. 37 is a graph showing an antiphase arm swing restoring moment corresponding to an antiphase arm swing restoring angular acceleration shown in FIG. 36.

To be more specific, the antiphase arm swing restoring angular acceleration patterns are set to be trapezoidal, as shown in FIG. 36, and a trapezoidal height azcyc2 in the period from time Tm to Ts2 and a trapezoidal height azcyc1 in the period from time Tm2 to Te are set to be the same. The trapezoidal heights azcyc1 and azcyc2 are determined such that the sum of the integrated value of βarec from time Ts to Te and the integrated value of the above determined antiphase arm swing acceleration βa for preventing the floor reaction force moment vertical component Mz from exceeding a permissible range becomes zero. The trapezoidal heights in the two periods do not have to be the same.

Figure 38:
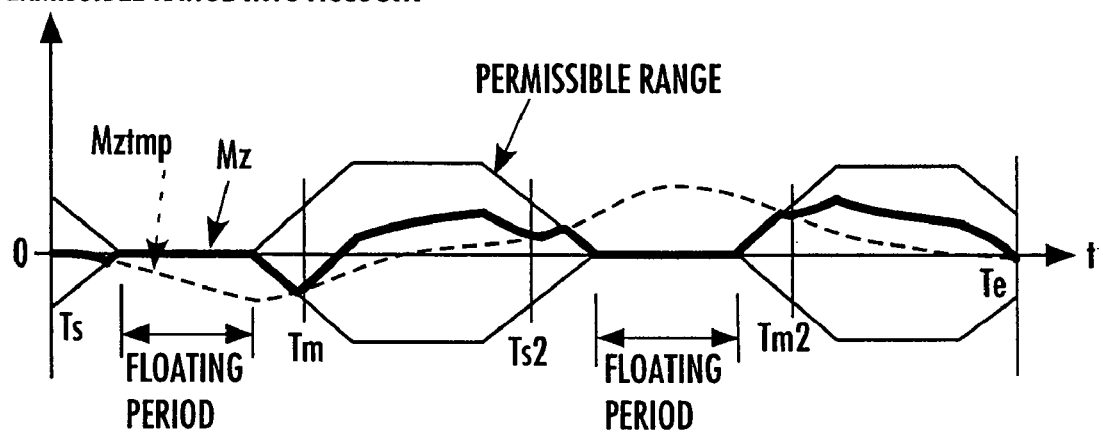
FIG. 38 is a graph showing a floor reaction force moment vertical component formed by combining the floor reaction force moment vertical component shown in FIG. 33 and the antiphase arm swing restoring moment shown in FIG. 37.
Figure 39:
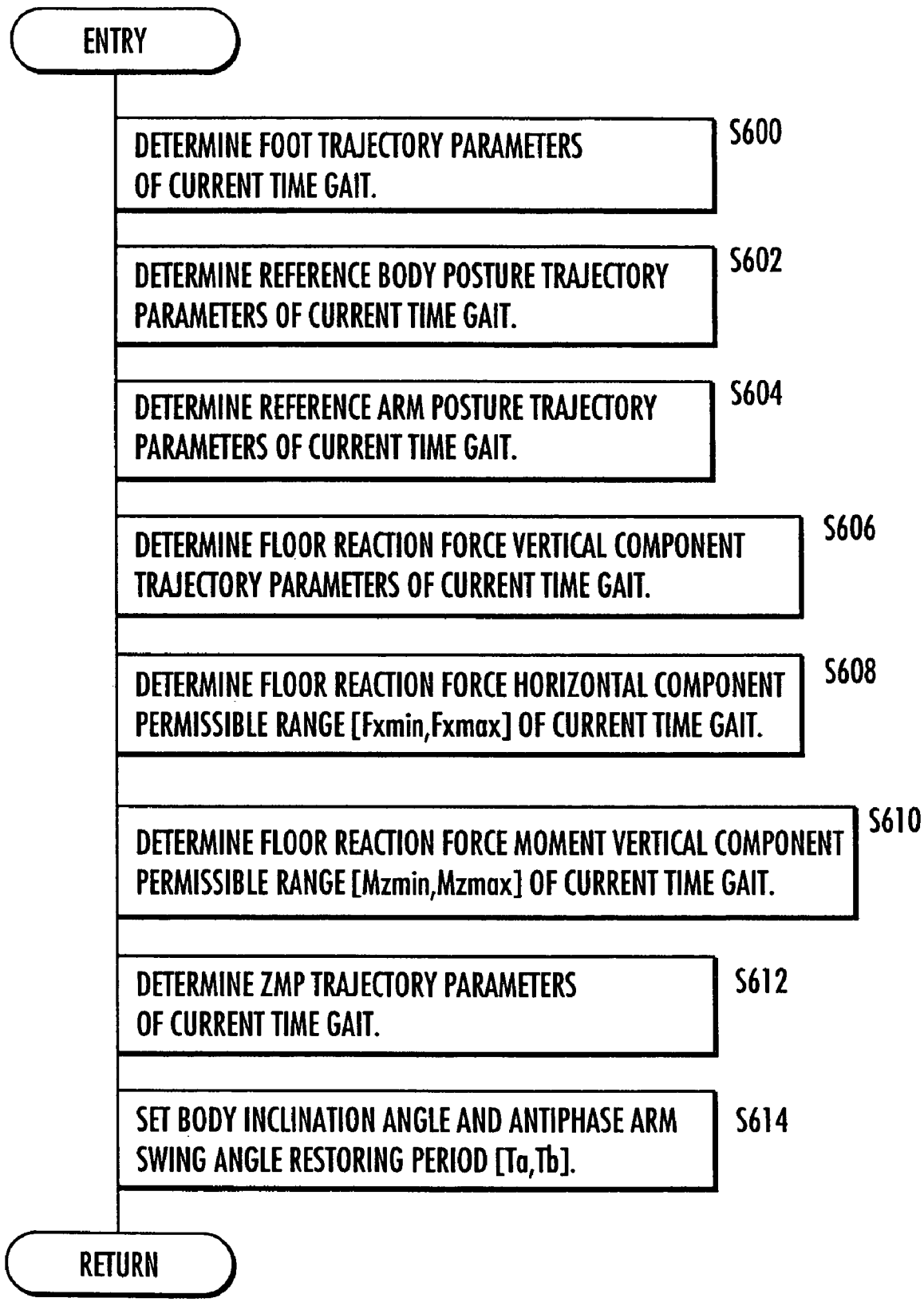
FIG. 39 is a flowchart showing subroutine processing of S026 in FIG. 13.
Figure 40:
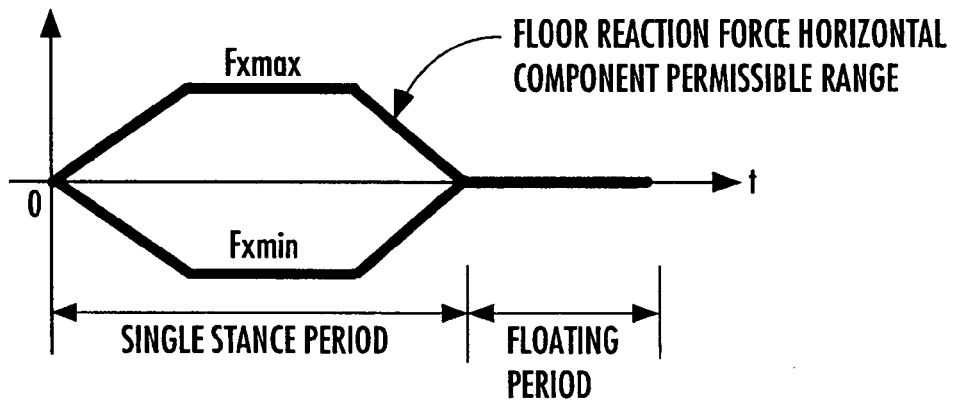
FIG. 40 is a graph showing a setting example of a floor reaction force horizontal component permissible range of a current time gait.
Figure 41:
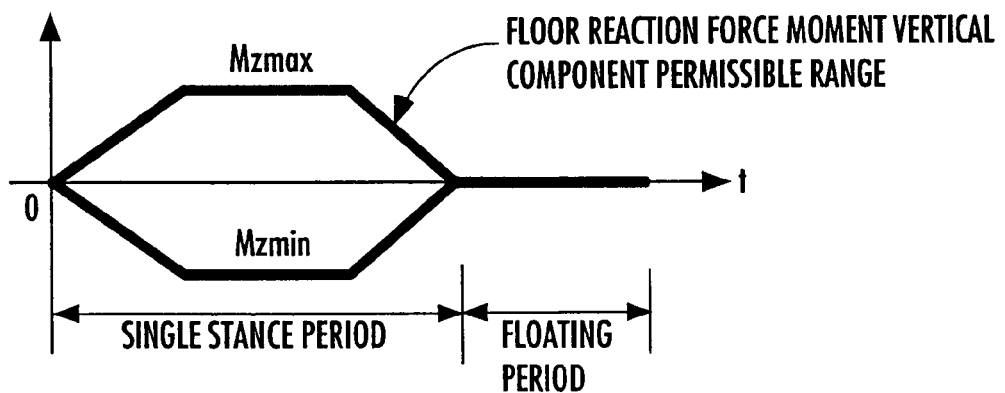
FIG. 41 is a graph showing a setting example of a floor reaction force moment vertical component permissible range of the current time gait.

Supplementally, a floor reaction force moment vertical component (Mazrec) generated by the antiphase arm swing restoring angular acceleration pattern determined as described above is as shown in FIG. 37. Accordingly, as shown in FIG. 38, the floor reaction force moment vertical component Mz generated by a motion of the robot, including an antiphase arm swing, will be eventually the sum of Mztmp of FIG. 32, Maz of FIG. 34, and Mazrec of FIG. 37, i.e., the sum of Mz of FIG. 33 and Mazrec of FIG. 37. In the period from time Tm to Ts2 and the period from time Tm2 to Te, trapezoidal restoring moments are added. These periods are set so as to provide a sufficiently wide permissible range; therefore, the floor reaction force moment vertical components generated by motions of the robot, including antiphase arm swings, will not exceed the permissible range.

The processing then proceeds to S316 wherein an initial (time Ts) antiphase arm swing angle and angular velocity of a normal gait are determined.

To be more specific, the initial antiphase arm swing angular velocity is determined according to the following equation.

$$\begin{aligned}\text{Initial antiphase arm swing angular velocity} =\\ \text{Reference initial antiphase}\\ \text{arm swing angular velocity} -\\ (\text{Antiphase arm swing angle when } \beta arec \text{ is } 0 +\\ \text{Second order integration}\\ \text{of } \beta arec \text{ pattern})/Tcyc\end{aligned} \quad \text{Equation 1030}$$

where in the above equation, the antiphase arm swing angle when βarec is zero is the antiphase arm swing angle (the antiphase arm swing angle at time Te) determined in S416. The second order integration of βarec refers to a second order integrated value of the antiphase arm swing restoring angular acceleration from time Ts to Te set as shown in FIG. 36. The reference initial antiphase arm swing angular velocity refers to the value of the aforesaid reference antiphase arm swing angular velocity (the first order differential value of the reference antiphase arm swing angle θaref) at time Ts.

The initial antiphase arm swing angle is set to agree with the reference initial antiphase arm swing angle. Alternatively, based on a finally determined antiphase arm swing angular acceleration (that is, the above determined sum of antiphase arm swing acceleration βa and the restoring angular acceleration βarec for preventing the floor reaction force moment vertical component Mz from exceeding a permissible range) and the above determined initial antiphase arm swing angular velocity, the average value of the difference between an arm swing angle calculated when an initial antiphase arm swing angle is set to agree with a reference initial antiphase arm swing angle and a reference antiphase arm swing angle, or an average value of the maximum value and the minimum value of the difference may be determined, and then the value obtained by subtracting a half of the determined average value from the reference initial antiphase arm swing angle may be determined as the final initial antiphase arm swing angle. This arrangement makes it possible to prevent the absolute value of the difference between a calculated arm swing angle and the reference antiphase arm swing angle from becoming excessively large.

One of the reasons that times Ts, Tm, Ts2, and Tm2 have been set as described above is to prevent the floor reaction force horizontal component Fx from exceeding the permissible range [Fxmin, Fxmax] even if the body posture angular acceleration β is generated to set the body posture angular velocity back to the initial angular velocity of a reference body posture trajectory during the period from time Tm to Ts2 and the period from time Tm2 to Te. In other words, the floor reaction force horizontal component permissible range is sufficiently wide in the period from time Tm to Ts2 and the period from time Tm2 to Te, so that the floor reaction force horizontal component Fx does not exceed the permissible range even if the body posture angular acceleration β is generated to restore the body posture angular velocity, while satisfying the desired ZMP.

Another reason that the times Ts, Tm, Ts2, and Tm2 have been set as described above is to prevent the floor reaction force moment vertical component Mz from exceeding the permissible range [Mzmin, Mzmax] even if the antiphase arm swing angular acceleration βa is generated to set the antiphase arm swing angular velocity back to the initial angular velocity of a reference antiphase arm swing angle trajectory during the period from time Tm to Ts2 and the period from time Tm2 to Te. In other words, the floor reaction force moment vertical component permissible range is sufficiently wide in the period from time Tm to Ts2 and the period from time Tm2 to Te, so that the floor reaction force moment vertical component Mz does not exceed the permissible range even if the antiphase arm swing angular acceleration βa is generated to restore the antiphase arm swing angular velocity.

After the processing of S316 of FIG. 24 is completed as described above, the processing proceeds to S210 of FIG. 23 wherein the terminal horizontal body position and velocity of a generated gait (provisional normal gait) are converted into values observed from a supporting leg coordinate system (the coordinate system of X''', Y''', and Z''' shown in FIG. 17) associated with the supporting leg of that particular instant, and the values are defined as (Xe, Vxe) (Xe: Terminal body horizontal position; and Vxe: Terminal horizontal body velocity).

Subsequently, the processing proceeds to S212 wherein the difference between the initial horizontal body position/velocity (Xs, Vxs) and the terminal horizontal position/velocity (Xe, Vxe) is calculated, as illustrated. This difference (Xs−Xe, Vxs−Vxe) is referred to as a horizontal body position/velocity boundary condition error (errx, errvx). In a normal gait, the boundary condition must be satisfied, so that (Xs, Vxs) and (Xe, Vxe) must agree. Hence, the horizontal body position/velocity boundary condition error (errx, errvx) must be zero or substantially zero. In the present embodiment, (Xs, Vxs) that sets the horizontal body position/velocity boundary condition error (errx, errvx) to substantially zero is exploratorily determined.

Subsequently, the processing proceeds to S214 wherein it is determined whether the calculated horizontal body position/velocity boundary condition error (errx, errvx) falls within the permissible range appropriately set beforehand. Instead of setting the permissible range of a horizontal body position/velocity boundary condition error as described above, it may be determined whether the difference between an initial divergent component $(Xs+Vxs/\omega 0)$ and a terminal divergent component $(Xe+Vxe/\omega 0)$ and the difference between an initial convergent component $(Xs-Vxs/\omega 0')$ and a terminal convergent component $(Xe-Vxe/\omega 0')$ respectively fall within certain permissible ranges. As previously mentioned, $\omega 0$ and $\omega 0'$ denote certain predetermined values.

If the determination result of S214 is NO, then the processing proceeds to S216. In this S216, a plurality of (two in the present embodiment) initial value candidates (Xs+ΔXs, Vxs) and (Xs, Vxs+ΔVxs) is determined in the vicinity of (Xs, Vxs). Here, ΔXs and ΔVxs mean predetermined minute variation amounts associated with Xs and Vxs, respectively. Then, taking each of these initial value candidates as an initial state of the horizontal body position/velocity, a normal gait is generated using gait parameters by the same processing as that of the above S208. Further, the terminal body position/velocity of the generated normal gait are converted to obtain values (Xe+ΔXe1, Vxe+ΔVxe1) and (Xe+ΔXe2, Vxe+ΔVxe2) observed from a supporting leg coordinate system (the coordinate system of X''', Y''', and Z''' shown in FIG. 17) associated with the supporting leg at that particular instant. Here, (Xe+ΔXe1, Vxe+ΔVxe1) means the terminal body position/velocity that corresponds to (Xs+ΔXs, Vxs), and (Xe+ΔXe2, Vxe+ΔVxe2) corresponds to the terminal body position/velocity that corresponds to (Xs, Vxs+ΔVxs). In the processing for generating a normal gait (provisional gait) in this case, the initial state (the state at time Ts) of a variable other than the horizontal body position/velocity may be set to the same value as that in a case where, for example, the initial value candidate of the horizontal body position/velocity is set to (Xs, Vxs). In S216, the same processing as that of the above S210 is carried out to determine the difference between each initial value candidate and the terminal body position/velocity corresponding thereto, i.e., the horizontal body position/velocity boundary condition error corresponding to each initial value candidate (Xs+ΔXs, Vxs), (Xs, Vxs+ΔVxs).

Next, the processing proceeds to S218 wherein, based on the horizontal body position/velocity boundary condition error corresponding to each of (Xs, Vxs) and the initial value candidates in the vicinity thereof (Xs+ΔXs, Vxs), (Xs, Vxs+ΔVxs), an initial value candidate following (Xs, Vxs) is determined by a searching method (a method in which a pseudo-Jacobian (sensitivity matrix) is determined and then a next candidate is determined by the steepest descent method or the like, or the simplex method or the like). More specifically, a sensitivity matrix indicating a changing degree of a horizontal body position/velocity boundary condition error observed when a horizontal body position and a horizontal body velocity are respectively changed minutely from the initial value candidate (Xs, Vxs) on the basis of the horizontal body position/velocity boundary condition errors associated with each of (Xs, Vxs) and the initial value candidates in the vicinity thereof (Xs+ΔXs, Vxs), (Xs, Vxs+ΔVxs) is determined, and then, based on the determined sensitivity matrix, an initial value candidate (Xs, Vxs) that will further reduces the horizontal body position/velocity boundary condition error is newly determined. After the new initial value candidate (Xs, Vxs) of the horizontal body position/velocity is determined as described above, the processing returns to S206.

The aforesaid processing (the processing from S206 to S218) is repeated as long as the determination result of S214 is NO. In this case, in S300 (refer to FIG. 24) of the processing for generating a normal gait corresponding to a new initial value candidate (Xs, Vxs) of the horizontal body position/velocity (S208), the initial value of the body posture angular velocity is set to the value determined in S310 (refer to FIG. 24) in the processing of S208 that corresponds to the last time initial value candidate (Xs, Vxs) of the horizontal body position/velocity rather than being set to the initial value of the reference body posture angular velocity. And if the determination result of S214 is YES, then the processing leaves the repetition loop (S204) and proceeds to S220. The provisional normal gait generated immediately before leaving the repetition loop of S204 will be obtained as the normal gait that satisfies the boundary condition.

In S220, an initial horizontal body position/velocity (X0, V0) at an original initial time 0 (the end time of the current time gait), an initial vertical body position/velocity (Z0, Vz0) at the initial time 0, and initial body posture angle and angular velocity at the initial time 0 are determined.

Specifically, (X0, V0) and (Z0, Vz0) are determined to be the values obtained by converting the horizontal body position/velocity and the vertical body position/velocity, which are determined at the time of instant when a second turning gait is switched to a first turning gait, i.e., at time k=Tcyc (time Te−Ts), into the values observed from the supporting leg coordinate system (the X''', Y''', and Z''' coordinate system of FIG. 17) associated with the supporting leg of the first step starting from time Tcyc (i.e., a second 1st turning gait) in a case where a gait is generated to satisfy a gait condition on the basis of a body inclination restoring moment ZMP-converted value pattern and the initial body posture angle and angular velocity of a normal gait at time Ts that have been determined in S310 and the horizontal body position/velocity (Xs, Vxs) at time Ts after leaving the loop of S204. Similarly, the initial state posture angle and angular velocity are determined to be the values obtained by converting the body posture angle and angular acceleration determined when time k=Tcyc (time Te−Ts) into values observed from the supporting leg coordinate system (the X''', Y''', and Z''' coordinate system of FIG. 17) associated with the supporting leg of one step starting from time Tcyc (i.e., a second first turning gait).

Subsequently, the processing proceeds to S222 wherein a normal gait initial divergent component q[0] is determined according to the following equation.

$$q[0]=X0+V0/\omega 0 \qquad \text{Equation 40}$$

where ω0 takes a certain predetermined value, as explained above in relation to the divergence.

Subsequently, the processing proceeds to S224 wherein the normal gait initial divergent component q[0] is converted into a value observed from a current time's gait supporting leg coordinate system, and this is determined as q''[0]. Further, the initial vertical body position/velocity (Z0, Vz0) is converted into a value observed from the current time's gait supporting leg coordinate system, and this is determined as (Z0'', Vz0'').

Supplementally, (Z0'', Vz0'') agrees with the terminal vertical body position/velocity of a second turning gait observed from the supporting leg coordinate system of the second turning gait (the X'', Y'', and Z'' coordinate system of FIG. 17). In addition, q''[0] also agrees with the terminal divergent component of the second turning gait observed from the supporting leg coordinate system of the second turning gait (the X'', Y'', and Z'' coordinate system of FIG. 17). Alternatively, therefore, (Z0'', Vz0'') and q''[0] may be calculated by utilizing these properties.

The processing further proceeds to S226 wherein initial antiphase arm swing angle and angular velocity (θaz0, ωaz0) at the original initial time 0 (the end time of the current time gait) are determined, and further, (θaz0'', ωaz0''), which is the value observed from the current time's gait supporting leg coordinate system, is determined. To be more specific, (θaz0, ωaz0) is determined to be the value obtained by converting the antiphase arm swing angle and angular velocity, which are determined at the time of instant when a second turning gait is switched to a first turning gait, i.e., at time k=Tcyc (time Te−Ts), in a case where a gait is generated in such a manner to satisfy a gait condition on the basis of an antiphase arm swing restoring angular acceleration pattern, and initial (time Ts) antiphase arm swing angle and angular velocity of a normal gait that have been determined in S314 and S316 (more specifically, in a case where an antiphase arm swing angle trajectory is determined such that a floor reaction force moment vertical component does not exceed a permissible range in a period other than the body posture angle and antiphase arm swing angle restoring period, and the antiphase arm swing angle trajectory is determined such that the sum of the reference antiphase arm swing angular acceleration βaref and the antiphase arm swing restoring angular acceleration βarec is generated in the body posture angle and antiphase arm swing angle restoring period), into a value observed from the supporting leg coordinate system (the X''', Y''', and Z''' coordinate system of FIG. 17) associated with the supporting leg of one step starting from time Tcyc (i.e., a second 1st turning gait).

Thus, the processing of S024 of FIG. 13, that is, the subroutine processing for determining an initial state of a normal gait, is finished.

Subsequently, the processing proceeds to S026 of FIG. 13 wherein the gait parameters of the current time gait are determined (some are provisionally determined). To be more specific, in S026, the following processing is carried out according to the flowchart shown in FIG. 39.

First, in S600, the foot trajectory parameters of the current time gait are set such that the foot position/posture trajectory of the current time gait continues to the foot position/posture trajectory of a normal gait.

Specifically, the initial free leg foot position/posture of the current time gait (the initial value of the free leg foot position/posture of the current time gait) is set to current free leg position/posture observed from the current time's gait supporting leg coordinate system (the terminal free leg position/posture of the last time gait). The initial supporting leg foot position/posture of the current time gait (the initial value of the current time gait supporting leg foot position/posture) are set to current supporting leg foot position/posture observed from the current time's gait supporting leg coordinate system (the terminal supporting leg foot position/posture of the last time's gait). The terminal free leg foot position/posture of the current time gait is determined on the basis of a next time's gait supporting leg coordinate system observed from the current time's gait supporting leg coordinate system (a required value of the free leg landing position/posture of the first step related to the current time gait). More specifically, the terminal free leg foot position/posture of the current time gait are determined such that a representative point of a free leg foot 22 agrees with the origin of the next time's gait supporting leg coordinate system observed from the current time's gait supporting leg coordinate system when the free leg foot 22 is turned, from the terminal free leg foot position/posture of the current time gait, until substantially the entire surface of the sole of the foot 22 comes in contact with the ground without slippage, while maintaining the free leg foot 22 in contact with a floor.

At the end of the current time gait, the supporting leg foot 22 is off the floor and floating. To determine the trajectory after the supporting leg foot 22 leaves the floor, an expected supporting leg foot landing position/posture is set. The expected supporting leg foot landing position/posture is set on the basis of the next but one time's gait supporting leg coordinate system observed from the current time's gait supporting leg coordinate system (a required value of the free leg foot position/posture of the second step related to the current time gait). To be more specific, the expected supporting leg foot landing position/posture are determined such that a representative point of the foot 22 obtained when the foot 22 is turned from that position/posture without slippage until substantially entire surface of the sole of the foot 22 is brought into contact with the floor while holding the foot 22 in contact with the floor agrees with the origin of the next but one time's gait supporting leg coordinate system observed from the current time's gait supporting leg coordinate system.

The terminal supporting leg foot position/posture of the current time gait is determined by generating a foot position/posture trajectory from a current supporting leg position/posture (the initial supporting leg foot position/posture of the current time gait) to the expected foot landing position/posture corresponding to the next time's gait supporting leg coordinate system (the required value of the free leg foot landing position/posture of the second step in the aforesaid required parameter) by using the finite-duration setting filter until the end of the current time gait.

Subsequently, the processing proceeds to S602 wherein the reference body posture trajectory parameter of the current time gait is determined in the same manner as that for the first turning gait and the second turning gait of a normal gait. The aforesaid parameter, however, is set such that the reference body posture trajectory of the current time gait continuously connects to the reference body posture trajectory of the above normal gait (such that the reference body posture angle and the angular velocity at the end of the current time gait agree with the reference body posture angle and the angular velocity, respectively, at the start of a normal gait). In the present embodiment, the reference body posture related to an inclination angle refers to a steady vertical posture in both a current time gait and a normal gait.

Next, the processing proceeds to S604 wherein the reference arm posture trajectory parameters of the current time gait are determined in the same manner as that for the first turning gait and the second turning gait of the normal gait. The above parameters, however, are set such that the initial reference arm posture of the current time gait and the changing rate thereof agree with the current instantaneous values of a reference arm posture and the changing rate thereof, and the arm posture trajectory of the current time gait continuously connects with the arm posture trajectory of the normal gait. For the arm posture trajectory parameters determined here, the parameters related to, for example, a total center-of-gravity position of both arms 5, 5 (a relative position with respect to the body 3), a lateral interval between right and left hands (the distal ends of both arms 5, 5), and an antiphase arm swing angle are determined, as in the case where the normal gait parameters are determined (S104 in FIG. 15). In the present embodiment, the total center-of-gravity positions of both arms 5, 5 are set so as to be maintained constant with respect to the body 3.

The processing then proceeds to S606 wherein the floor reaction force vertical component trajectory parameters of the current time gait are determined such that the floor reaction force vertical component trajectory defined by the parameters will be a substantially continuous (values not jumping in steps) trajectory as illustrated in FIG. 6 mentioned above, as in the case of the first turning gait and the second turning gait of a normal gait.

The floor reaction force vertical component trajectory parameters, however, are determined such that both the total center-of-gravity vertical position/velocity and the floor reaction force vertical component trajectory of the current time gait continuously connect with the normal gait.

Specifically, first, the value $(Z0'', Vz0'')$ obtained by converting the initial vertical body position/velocity of the normal gait that has been finally determined by the processing of S024 of FIG. 13 mentioned above (the processing for determining the initial state of the normal gait) into the value observed from a current time's gait supporting leg coordinate system, i.e., the initial total center-of-gravity vertical position/velocity of the normal gait observed from the current time's gait supporting leg coordinate system are determined using, for example, the above Equation 04 (or a kinematics model of the robot 1) on the basis of $(Z0'', Vz0'')$ or the like determined in S224 of FIG. 23. To be more specific, the initial total center-of-gravity vertical position of the normal gait observed from the current time's gait supporting leg coordinate system is determined by substituting the body mass point vertical position of the model shown in FIG. 12, which corresponds to the vertical body position $Z0''$ of the normal gait determined in S224, and the leg mass point vertical positions of a supporting leg and a free leg, which correspond to the values obtained by converting individual foot positions at the start of the normal gait into the values observed from the current time's gait supporting leg coordinate system, into Equation 04. Further, the initial total center-of-gravity vertical velocity of the normal gait observed from the current time's gait supporting leg coordinate system is determined by substituting the body mass point vertical velocity of the model shown in FIG. 12, which corresponds to the body vertical velocity $Vz0''$ of the normal gait determined in S224, and the leg mass point vertical velocities of a supporting leg and a free leg, which correspond to the values obtained by converting individual foot vertical velocities at the start of the normal gait into the values observed from the current time's gait supporting leg coordinate system, into an equation derived from differentiating both sides of Equation 04. Alternatively, the initial total center-of-gravity vertical position/velocity may be calculated by using a more precise model.

Then, the initial total center-of-gravity vertical position/velocity of the normal gait determined as described above are substituted into the terminal total center-of-gravity vertical positions/velocities of the following equations 41a and 41b, and the total center-of-gravity vertical position and velocity of the last time desired gait instantaneous value (to be more precise, the value obtained by converting the terminal state of the last time desired gait into the current time's gait supporting leg coordinate system) are substituted into the initial total center-of-gravity vertical positions and velocities of Equations 41a and 41b. Then, a floor reaction force vertical component pattern (to be more specific, a parameter value) of the current time gait is determined such that the relationship between Equations 41a and 41b is satisfied. The integrated values in Equations 41a and 41b are to be the integrated values in the period from the start to the end of the current time gait.

Terminal total center-of-gravity vertical position −     Equation 41a
   Initial total center-of-gravity vertical position =
   Second-order integration of (Floor reaction force
      vertical component/Total mass of the robot) +
   Second-order integration of acceleration of gravity +
      Initial total center-of-gravity vertical
                     velocity * Duration of one step Terminal total center-of-gravity vertical velocity −     Equation 41b
   Initial total center-of-gravity vertical velocity =
   First-order integration of (Floor reaction force
      vertical component/Total mass of the robot) +
      First-order integration of gravity acceleration where the gravity acceleration takes a negative value.

To be more specific, first, at least two parameters out of the floor reaction force vertical component parameters (e.g., times of break points) that define the floor reaction force vertical component pattern as shown in FIG. 6 are taken as independent unknown variables. The values of the unknown variables are determined by solving a simultaneous equation composed of Equations 41a and 41b.

The floor reaction force vertical component parameters to be selected as the unknown variables may be, for example, the height (the peak value of the floor reaction force vertical component) and the width (duration of single stance period) of the trapezoid shown in FIG. 6. In this case, the slopes of both sides of the trapezoid shown in FIG. 6 take values determined beforehand on the basis of a current time gait cycle or the like, or the values of times of the break points of the floor reaction force vertical component pattern, excluding the time at which a single stance period is switched to a floating period, that has been determined beforehand on the basis of a current time gait cycle or the like. Supplementally, if only one unknown variable is given, then no solution generally exists that satisfies the simultaneous equation of Equations 41a and 41b.

Subsequently, the processing proceeds to S608 wherein a floor reaction force horizontal component permissible range [Fxmin, Fxmax] (to be more specific, the parameters defining the pattern of the floor reaction force horizontal component permissible range) is set in the same manner as that for the first turning gait and the second turning gait of a normal gait. For instance, the floor reaction force horizontal component permissible range is set according to the pattern shown in FIG. 40. In the present embodiment, the floor reaction force horizontal component permissible range is set according to the aforesaid Equation 12 on the basis of the floor reaction force vertical component pattern determined previously in S606.

Then, the processing proceeds to S610 wherein a floor reaction force moment vertical component permissible range [Mzmin, Mzmax] (to be more specific, the parameters defining the pattern of the floor reaction force moment vertical component permissible range) is set in the same manner as that for the first turning gait and the second turning gait of a normal gait. For instance, the floor reaction force moment vertical component permissible range is set according to the pattern shown in FIG. 41. In the present embodiment, the floor reaction force moment vertical component permissible range is set according to the aforesaid Equation 1012 on the basis of the floor reaction force vertical component pattern determined previously in S606.

Subsequently, the processing proceeds to S612 wherein the ZMP trajectory of the current time gait (specifically, the parameters defining the ZMP trajectory, such as times and positions of break points of the trajectory) is set, as shown in FIG. 7, such that it exhibits a high stability margin and no sudden changes, as in the first turning gait and the second turning gait of a normal gait. The parameters are set such that the ZMP trajectory of the current time gait continuously connects with the ZMP trajectory of the aforesaid normal gait. In other words, the ZMP trajectory parameters are determined so that the ZMP position at the end of the current time gait agrees with the ZMP position at the start of the normal gait. In this case, in a running gait, the times and positions of break points of the ZMP trajectory in a single stance period may be set in the same manner as that for setting the ZMP trajectory parameters of the normal gait described above. And the ZMP trajectory parameters may be set so that a desired ZMP trajectory in a floating period linearly changes in succession from the start of the floating period to the ZMP position at the start of a normal gait.

It should be noted that the ZMP trajectory parameters of the current time gait determined in S612 are merely temporary, and will be corrected, as it will be discussed hereinafter. For this reason, the ZMP trajectory of the current time gait set as described above will be hereinafter referred to as a provisional desired ZMP trajectory of a current time gait.

Lastly, the processing proceeds to S614 wherein a body posture angle and antiphase arm swing angle restoring period [Ta, Tb] is set. The body posture angle and antiphase arm swing angle restoring start time Ta corresponds to Tm in the second turning gait of a normal gait, while body posture angle and antiphase arm swing angle restoring end time Tb corresponds to Ts2 in the second turning gait of the normal gait. These times Ta and Tb are set in the same manner as that for setting Tm and Ts2.

Returning to the explanation of FIG. 13, after carrying out the processing shown in S026 (the processing for determining the gait parameters of the current time gait) as described above, the processing proceeds to S028 wherein the gait parameters (ZMP trajectory parameters) of the current time gait are corrected, and the parameter of the antiphase arm swing angle is determined. In this processing, the ZMP trajectory parameters are corrected so as to make the body position/posture trajectory continue or approximate to a normal gait, and a parameter related to the antiphase arm swing angle of the current time gait is determined to make the antiphase arm swing angle converge to the antiphase arm swing angle trajectory of the normal gait.

Figure 42:
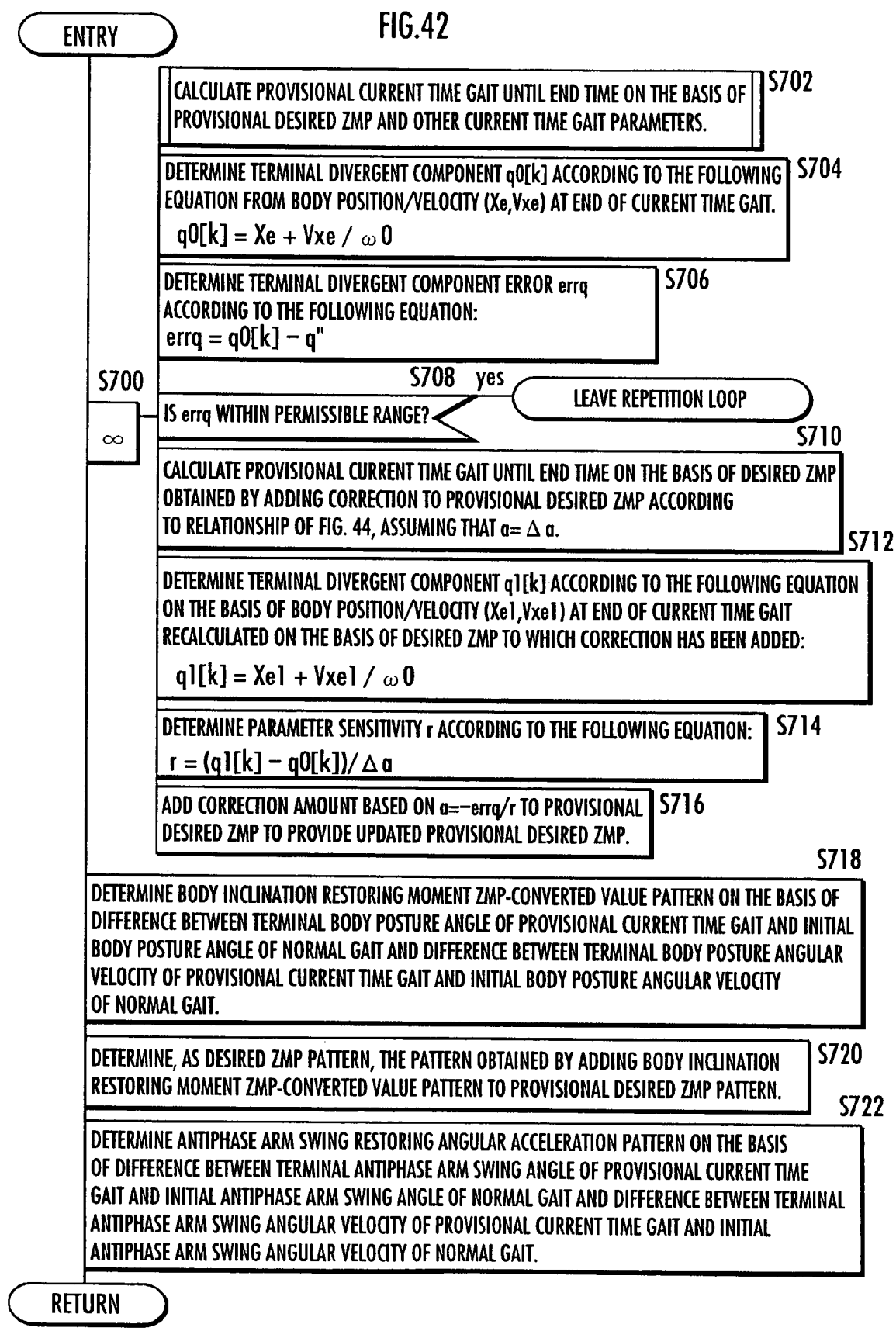
FIG. 42 is a flowchart showing subroutine processing of S028 in FIG. 13.

FIG. 42 shows the subroutine flowchart-illustrating the processing.

First, the processing proceeds to S702 via S700 and temporarily generates a provisional current time gait until the time at which the current time gait ends on the basis of a provisional desired ZMP pattern and other current time gait parameters.

Figure 43:
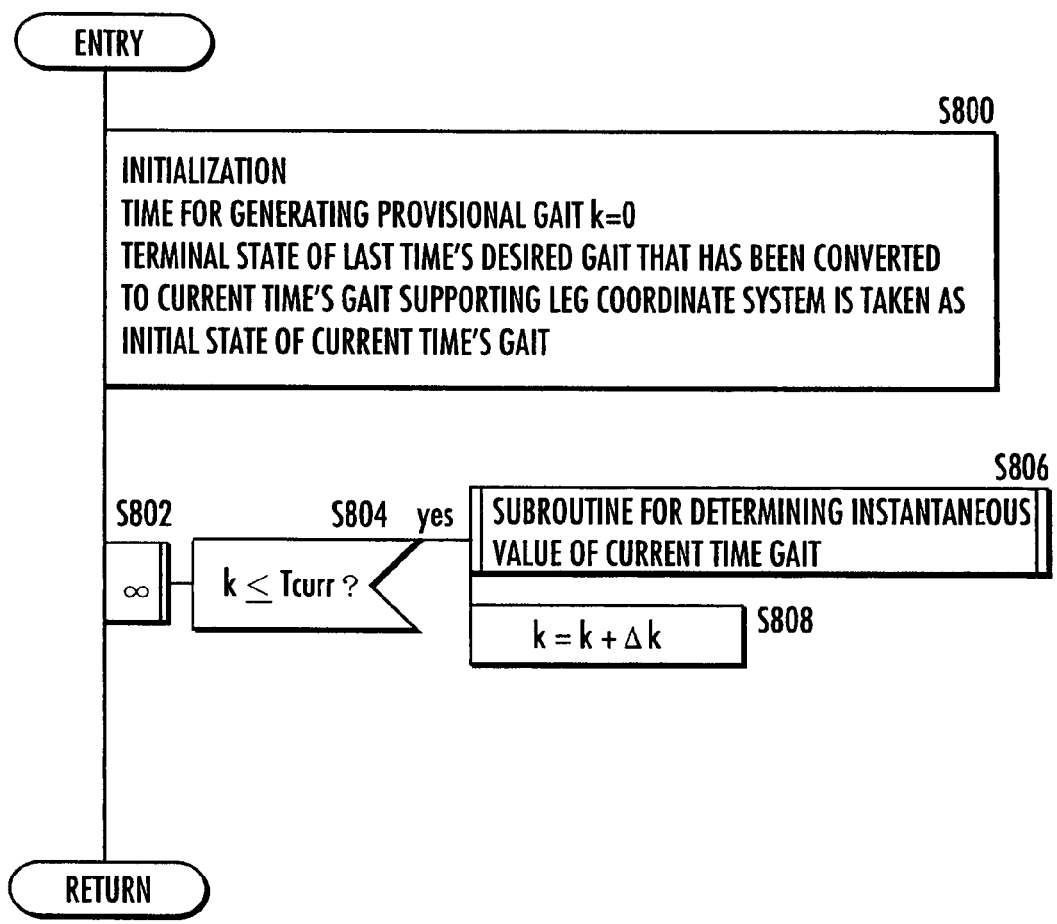
FIG. 43 is a flowchart showing subroutine processing of S702 in FIG. 42.

In S702, the following processing will be carried out according to the flowchart shown in FIG. 43.

The explanation will now be given. In S800, various elements are initialized. Specifically, zero is substituted into time k for generating a provisional gait. Furthermore, the initial state of the current time gait is obtained by converting the terminal state of the last time desired gait (to be more specific, the terminal values of the gait states, including a horizontal body position/velocity, a vertical body position/velocity, a body posture angle and its angular velocity, a desired foot position/posture, and a desired arm posture) into a current time's gait supporting leg coordinate system.

Supplementally, the desired arm posture includes desired antiphase arm swing angle and angular velocity.

Subsequently, the processing goes through S802 and proceeds to S804 wherein it is determined whether time k for generating a provisional gait is before current time gait end time Tcurr (whether k≦Tcurr). If the determination result is YES, then the processing proceeds to a current time gait instantaneous value determining subroutine of S806 to determine an instantaneous value of time k of the current time gait. In the gait instantaneous value determining subroutine of S806, a provisional gait is generated as shown in FIG. 25 in the same manner as that of S306 previously described. However, current time gait parameters are used in place of normal gait parameters, as the gait parameters.

Subsequently, the processing proceeds to S808 to increment time k for generating a provisional gait by Δk, and then returns to S804.

If the determination result of S804 is NO, then the processing of the flowchart shown in FIG. 43 is completed.

The processing discussed above generates the provisional current time gait from the start and the end thereof.

Subsequently, the processing proceeds to S704 wherein a terminal divergent component q0[k](k=Tcurr) is determined according to the equation shown in the figure (Equation 10 given above) from the horizontal body position/velocity (Xe, Vxe) at the end of the current time gait determined in S702 as described above.

The proceeding then proceeds to S706 wherein a terminal divergent component error errq, which is the difference between a current time gait terminal divergent component q0[k] and a normal gait initial divergent component q" (the one determined in S224 of FIG. 23), is determined using the equation shown. Further, the processing proceeds to S708 wherein it is determined whether the determined terminal divergent component error errq falls within a permissible range (a range in the vicinity of zero).

Figure 44:
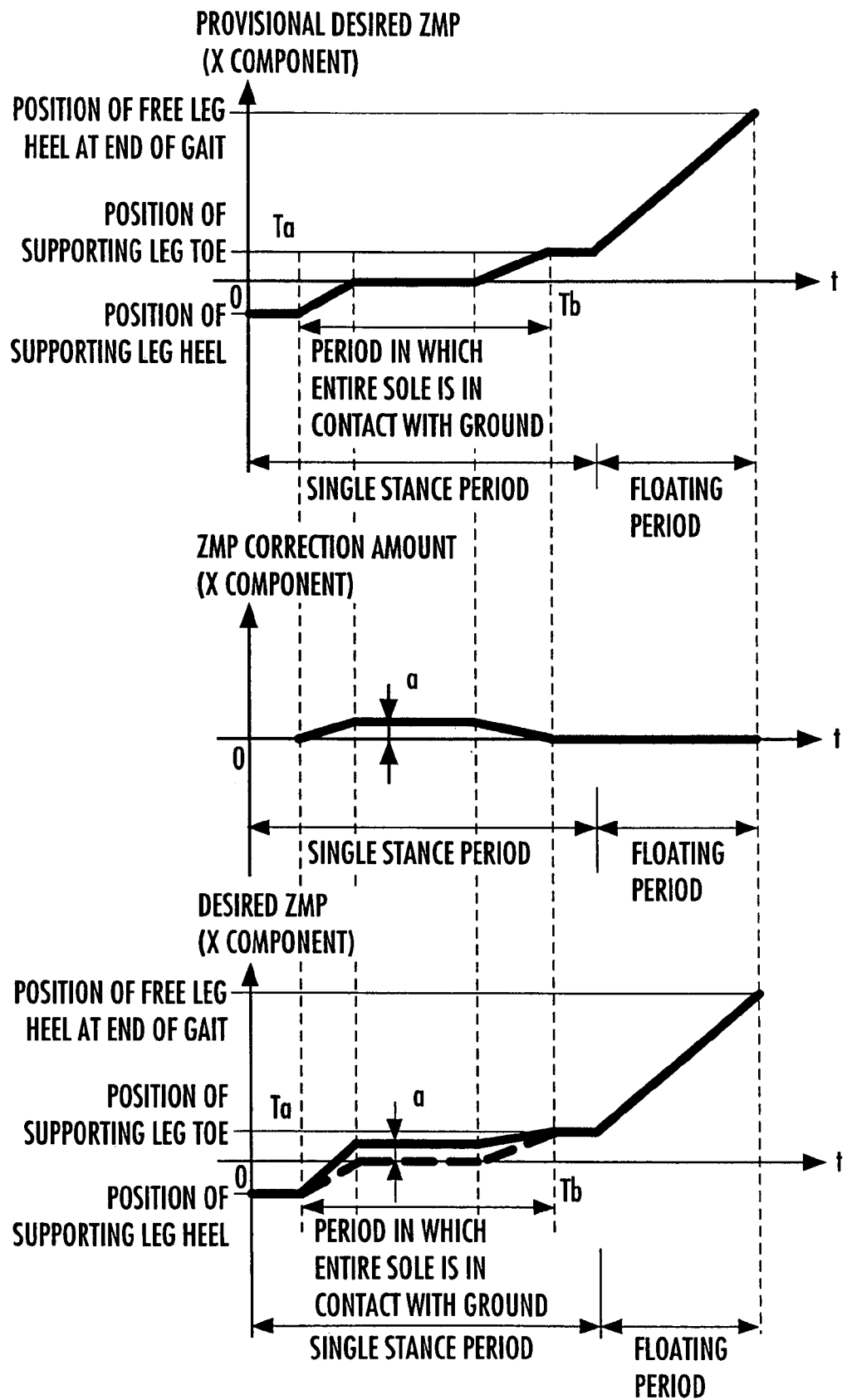
FIG. 44 is a graph showing examples of a provisional desired ZMP of the current time gait, a ZMP correction amount, and a desired ZMP after correction.

If the determination result of S708 is NO, then the processing proceeds to S710 wherein a=Δa (Δa being a predetermined extremely small amount) is set, and a provisional current time gait to the end thereof is calculated, as in the aforesaid S702, on the basis of the desired ZMP obtained by adding a trapezoidal correction to the current provisional desired ZMP pattern according to the relationship shown in FIG. 44. Here, referring to FIG. 44, "a" denotes the height of the trapezoidal pattern for correcting a provisional desired ZMP so as to make the current time gait terminal divergent component agree with the normal gait initial divergent component as much as possible (so as to approximate the horizontal body position/posture trajectory of the current time gait to the horizontal body position/posture trajectory of the normal gait). In this case, in the present embodiment, the provisional desired ZMP is corrected during the period in which substantially the entire surface of the sole of the supporting leg foot 22 comes in contact with the ground (the entire-sole-in-contact-with-the-ground period) that is, during the period in which the floor reaction force horizontal component permissible range is sufficiently wide, and the times of the break points of the above trapezoidal pattern are set to balance with the times of the break points of the provisional desired ZMP in the entire-sole-in-contact-with-the-ground period. The setting a=Δa is given in S710 to observe a change in the terminal divergent component error errq when the current provisional desired ZMP trajectory is corrected by an extremely small amount according to the aforesaid trapezoidal pattern.

After generating the provisional current time gait to the end with the provisional desired ZMP trajectory corrected using a=Δa in S710 as described above, the processing further proceeds to S712 wherein a terminal divergent component q1[k] in this provisional current time gait is determined according to the equation shown in the figure (the above Equation 10) on the basis of a horizontal body position/velocity (Xe1, Vxe1) at the end of the provisional current time gait determined in S710.

In S710, Δa has been a constant of an extremely small amount appropriately set in the present embodiment. Alternatively, however, Δa may be set such that Δa decreases as the terminal divergent component error errq is decreased by repeated calculation, which will be explained below. However, even if it is set as a constant, it is possible to maintain the terminal divergent component error errq within a permissible range by performing a few repetitive calculations.

Subsequently, the processing proceeds to S714 wherein a parameter sensitivity r (changing rate of the terminal divergent component error relative to Δa) is determined according to the equation shown in the figure. The processing further proceeds to S716 wherein the correction amount of the trapezoidal pattern having, as its height a, the value obtained by a=−errq/r, that is, the value obtained by dividing the terminal divergent component error errq determined in S706 by the parameter sensitivity r determined in S714, is added to the provisional desired ZMP pattern according to the relationship shown in FIG. 44, thereby correcting the provisional desired ZMP pattern (a new provisional desired ZMP pattern is determined).

Then, the processing returns to S702. As long as the determination result of S708 is NO, the processing from S702 to S716 described above is repeated. When the determination result of S708 changes to YES, the processing leaves the repetition loop (S700) and moves forward to S718.

In S718, the pattern of the body posture restoring moment ZMP-converted value (ZMPrec) of the current time gait is determined on the basis of mainly the difference between a terminal body posture angle of the provisional current time gait and an initial body posture angle of a normal gait, and the difference between a terminal body posture angular velocity of the provisional current time gait and an initial body posture angular velocity of a normal gait such that the body posture angle trajectory of the current time gait approximates the body posture angle trajectory of the normal gait. The ZMPrec determined here is used for correcting a provisional desired ZMP so that the agreement between the terminal divergent component of the current time gait and the initial divergent component of the normal gait (the condition in S708) may be maintained even when a body posture angular acceleration is generated to connect (bring close) the body posture angle trajectory to the normal gait in the period, wherein the floor reaction force horizontal component permissible range becomes sufficiently wide (the duration in a single stance period), by the processing for generating a current time gait instantaneous value, which will be described hereinafter.

The ZMPrec exhibits a trapezoidal pattern similar to that explained in relation to the processing for generating the normal gait. To be more precise, the ZMPrec is determined as follows. The trapezoidal pattern of the ZMPrec of the current time gait is set in the same manner as that for the trapezoidal pattern of the ZMPrec in the period of the second turning gait shown in FIG. 30, the times (break points) of apexes of the trapezoid being known (more specifically, the times of the break points of the trapezoid are matched with the break point times of the desired ZMP), and the height of the trapezoid (parameter) of the ZMPrec is determined as described below, taking the height of the trapezoid as an unknown number. In this case, the time at which the trapezoid pattern of the ZMPrec begins to rise is denoted by Ta, and the time at which the trapezoid pattern returns to zero is denoted by Tb.

It is usually impossible to continuously connect both body posture angle and body posture angular velocity to a normal gait at the end of the current time gait if there is only one unknown parameter of the body posture restoring moment ZMP-converted value pattern as described above. For this reason, in the present embodiment, an unknown parameter is determined so that the state of a gait generated gradually approximates the state of a normal gait over a plurality of steps.

Supplementally, the ZMPrec pattern in a single gait may be complicated to produce two or more unknown parameters to continuously connect both the body posture angle and the body posture angular velocity to the normal gait at the end of the current time gait. This, however, may lead to a ZMPrec pattern with excessive staggered variation.

The following will explain the principle of calculation and then the procedure of the calculation.

As previously described, the difference between the terminal body posture angle of the provisional current time gait that has been determined with the height of the trapezoid of the ZMPrec pattern being zero in S702 as discussed above and the initial body posture angle of the normal gait is determined, and the determined difference is denoted by θerr. Further, the difference between the terminal body posture angular velocity of the provisional current time gait and the initial body posture angular velocity of the normal gait is determined, and the determined difference is denoted by vθerr.

Here, it is assumed that the current time gait is generated, setting the height of the trapezoid of the ZMPrec pattern as a certain value bcurr, and then the first turning gait is generated by the same algorithm as that of the current time gait. It is assumed that the body posture restoring moment ZMP-converted value ZMPrec pattern of the first turning gait is based on the sum of the ZMPrec pattern of the first turning gait (the trapezoidal pattern shown in FIG. 30, the height of which is acyc1 as mentioned above), determined in S310 of FIG. 24 and a certain value b1.

The gait generated as described above is referred to as a ZMPrec corrected gait, and its terminal (the end of the first turning gait) body posture angle and angular velocity are denoted by θ1 and vθ1, respectively.

The terminal body posture angle and angular velocity of the first turning gait are denoted by θ1org and vθ1org, respectively, of the original normal gait determined at the point when the subroutine processing for determining the initial state of the normal gait in S024 is completed (the normal gait in a case where the initial body posture angle and angular velocity of the normal gait finally determined in S310 are taken as the initial values, and the ZMPrec pattern is the pattern determined in S310 (the trapezoidal pattern shown in FIG. 30, the height thereof being acyc1)).

Here, $\Delta\theta 1$ and $\Delta v\theta 1$ are defined as follows:

$$\Delta\theta 1 = \theta 1 - \theta 1 org \quad \text{Equation 50}$$

$$\Delta v\theta 1 = v\theta 1 - v\theta 1 org \quad \text{Equation 51}$$

$\Delta\theta 1$ and $\Delta v\theta 1$ mean the differences in body posture angle and angular velocity, respectively, between the corrected ZMPrec gait and the original normal gait at the point when these two gaits have been generated to the end of the first turning gait. If $\Delta\theta 1$ and $\Delta v\theta 1$ are zero, then the second turning gait generated according to the same algorithm as that of the current time gait, setting the height of the trapezoid of the ZMPrec pattern as acyc2, and following the corrected ZMPrec gait, will agree with the original normal gait.

Thus, the height bcurr of the trapezoid of the current time gait and the height b1 of the trapezoid of the first turning gait at which $\Delta\theta 1$ and $\Delta v\theta 1$ reach zero may be determined, and the determined bcurr may be taken as the finally determined height of the trapezoid of the current time gait.

The dynamic model related to the body posture angle of the robot 1 has the linear characteristic represented by flywheels FHx and FHy shown in FIG. 12. Hence, $\Delta\theta 1$ and $\Delta v\theta 1$ share the relationships shown below with the height bcurr of the trapezoid of the current time gait, the height b1 of the trapezoid of the first turning gait, the difference θerr between the terminal body posture angle of the provisional current time gait and the initial body posture angle of the normal gait, and the difference vθerr between the terminal body posture angular velocity of the provisional current time gait and the initial body posture angular velocity of the normal gait.

$$\Delta\theta 1 = c11*bcurr + c12*b1 + \theta err + e1*v\theta err \quad \text{Equation 52}$$

$$\Delta v\theta 1 = c21*bcurr + c22*b1 + e2*v\theta err \quad \text{Equation 53}$$

where c11, c12, c21, c22, e1, and e2 are coefficients uniquely determined primarily by a current time gait and the gait cycle of a first turning gait, and the parameters (particularly the parameters related to time) of a body posture restoring moment ZMP-converted value ZMPrec pattern.

Based on the aforementioned principle, the calculation procedure first determines the body posture angle difference θerr and the angular velocity difference Vθerr in the boundary between the provisional current time gait and the normal gait.

Then, the coefficients c11, c12, c21, c22, e1, and e2 of Equations 52 and 53 are determined primarily on the basis of the gait cycles of a current time gait and a first turning gait and the parameters (particularly the parameters related to time) of a body posture restoring moment ZMP-converted value ZMPrec pattern.

Next, the height bcurr of the trapezoid of the current time gait and the height b1 of the trapezoid of the first turning gait are determined such that the right sides of Equations 52 and 53 become zero. In other words, bcurr and b1 are determined by solving the simultaneous equation having the left sides of Equation 52 and Equation 53 set to zero.

Lastly, the height of the trapezoid of the trapezoidal pattern of the body posture restoring moment ZMP-converted value (ZMPrec) of the current time gait is set to the height bcurr of the trapezoid of the above determined current time gait.

Subsequently, the processing proceeds to S720 wherein the pattern obtained by adding the body posture restoring moment ZMP-converted value pattern determined as described above in S718 to the current provisional desired ZMP pattern (the provisional desired ZMP pattern when the processing leaves the repetition loop of S700) is determined as the desired ZMP pattern of the current time gait. This processing is the same as the processing for adding the trapezoidal pattern having the height of Δa in S710 to the provisional desired ZMP pattern.

The following will describe the reason for adding the body posture restoring moment ZMP-converted value pattern to the provisional desired ZMP pattern.

The provisional current time gait generated in the loop of S700 is generated by setting the body posture restoring moment ZMP-converted value ZMPrec to zero (by setting the height parameter of the trapezoidal pattern of ZMPrec to zero). In the provisional current time gait finally generated in the loop of S700, the body position/velocity continues to or approximates a normal gait, whereas the body posture angle deviates from the body posture angle of the normal gait and undesirably diverges in some cases.

The body posture restoring moment ZMP-converted value pattern determined in S718 is used to generate a body posture angular acceleration for approximating a deviation of a body posture angle with respect to a normal gait to zero.

If, however, a body posture angular acceleration based on the body posture restoring moment ZMP-converted value pattern determined in S718 is generated without correcting the provisional desired ZMP pattern finally obtained in the loop of S700, then the horizontal body position trajectory has to be deviated from a horizontal body position trajectory of the above provisional current time gait in order to satisfy the dynamic balance condition (the moment in which the resultant force of the gravity and the inertial force of the robot acting on the desired ZMP, excluding a vertical component, is zero). For this reason, in the present embodiment, the provisional desired ZMP pattern is corrected by ZMPrec in order to obviate the need for shifting the horizontal body position trajectory from the one finally obtained in the loop of S700.

If a body posture angular acceleration based on the body posture restoring moment ZMP-converted value pattern determined in S718 is generated in addition to the motion of the above provisional current time gait, then the ZMP (the point at which the moment of the resultant force of the gravity and the inertial force, excluding vertical component, produced by a motion reaches zero) deviates by the body posture restoring moment ZMP-converted value. Conversely, therefore, by using the pattern, which is obtained by adding the body posture restoring moment ZMP-converted value pattern to a provisional desired ZMP pattern, as a desired ZMP pattern, the same body translational motion as that of the above provisional current time gait can be obtained by generating the current time gait that satisfies the desired ZMP pattern while generating a body posture angular acceleration of the body inclination mode based on the body posture restoring moment ZMP-converted value pattern determined in S718.

The above is the reason why the pattern obtained by adding the body posture restoring moment ZMP-converted value pattern to the provisional desired ZMP pattern is used as the desired ZMP pattern.

Subsequently, the processing proceeds to S722 wherein an antiphase arm swing restoring angular acceleration pattern is determined such that the antiphase arm swing angle trajectory of a current time gait approximates to the antiphase arm swing angle trajectory of a normal gait on the basis of the difference between the terminal antiphase arm swing angle of the provisional current time gait and the initial antiphase arm swing angle of the normal gait and the difference between the terminal antiphase arm swing angular velocity of the provisional current time gait and the initial antiphase arm swing angular velocity of the normal gait. The method for determining the pattern is almost the same as the method for determining the body posture restoring moment ZMP-converted value pattern in S718, except that variable names are different as shown below:

Body posture restoring moment ZMP-converted value pattern →Antiphase arm swing restoring angular acceleration pattern Horizontal component→Moment vertical component This will be explained in detail below. The antiphase arm swing restoring angular acceleration pattern to be determined here is used in the processing for generating a current time gait instantaneous value, which will be discussed hereinafter, to make a correction so as to connect (approximate) the antiphase arm swing angle trajectory to the normal gait in the period wherein the floor reaction force moment vertical component permissible range becomes sufficiently wide (a duration in a single stance period).

The antiphase arm swing restoring angular acceleration pattern is a trapezoidal pattern similar to that explained in relation to the processing for generating a normal gait. To be more precise, the antiphase arm swing restoring angular acceleration pattern is determined as follows. The trapezoidal pattern of the antiphase arm swing restoring angular acceleration of the current time gait is set in the same manner as that for the trapezoidal pattern of the antiphase arm swing restoring angular acceleration pattern in the period of the second turning gait shown in FIG. 36, the times (break points) of apexes of the trapezoid being known (more specifically, the times of the break points of the trapezoid are matched to the break point times of the desired ZMP), and the height of the trapezoid (parameter) of the antiphase arm swing restoring angular acceleration is determined as described below, taking the height of the trapezoid as an unknown number. In this case, the time at which the trapezoid pattern of the antiphase arm swing restoring angular acceleration begins to rise is denoted by Ta, and the time of return to zero from the trapezoid pattern is denoted by Tb.

It is usually impossible to continuously connect both antiphase arm swing angle and antiphase arm swing angular velocity to a normal gait at the end of the current time gait if there is only one unknown parameter of the antiphase arm swing restoring angular acceleration pattern. For this reason, in the present embodiment, an unknown parameter is determined so that the state of a gait generated gradually approximates the state of a normal gait over a plurality of steps.

Supplementally, the antiphase arm swing restoring angular acceleration pattern in a single gait may be complicated to produce two or more unknown parameters so as to continuously connect both the antiphase arm swing angle and antiphase arm swing angular velocity to the normal gait at the end of the current time gait. This, however, may lead to an antiphase arm swing restoring angular acceleration pattern with excessive staggered variation.

As previously described, the difference between the terminal antiphase arm swing angle of the provisional current time gait that has been determined with the height of the trapezoid of the antiphase arm swing restoring angular acceleration pattern set to zero in S702, as discussed above, and the initial antiphase arm swing angle of the normal gait is determined, and the determined difference is defined as θazerr. Further, the difference between the terminal antiphase arm swing angular velocity of the provisional current time gait and the initial antiphase arm swing angular velocity of the normal gait is determined, and the determined difference is denoted by vθzerr.

Here, it is assumed that the current time gait is generated, setting the height of the trapezoid of the antiphase arm swing restoring angular acceleration pattern to a certain value bzcurr, and then the first turning gait is generated by the same algorithm as that of the current time gait. It is assumed that the antiphase arm swing restoring angular acceleration pattern of the first turning gait is based on the sum of the antiphase arm swing restoring angular acceleration pattern (the trapezoidal pattern shown in FIG. 36, the height of which is azcyc1 as mentioned above), determined in S314 of FIG. 24 and a certain value bz1.

The gait generated as described above is referred to as an antiphase arm swing restoring angular acceleration corrected gait, and its end (the end of the first turning gait) antiphase arm swing angle and angular velocity are denoted by θz1 and vθz1, respectively.

The terminal antiphase arm swing angle and angular velocity of the first turning gait are denoted by θz1org and vθz1org, respectively, of the original normal gait determined at the point when the subroutine processing for determining the initial state of the normal gait in S024 is completed (the normal gait in a case where the antiphase arm swing angle and angular velocity at the start of the normal gait finally determined in S314 are taken as the initial values, and the antiphase arm swing restoring angular acceleration pattern is the pattern determined in S314 (the trapezoidal pattern shown in FIG. 36, the height thereof being azcyc1)).

Here, Δθz1 and Δvθz1 are defined as follows:

$$\Delta\theta z1 = \theta z1 - \theta z1org \quad \text{Equation 1050}$$

$$\Delta v\theta z1 = v\theta z1 - v\theta z1org \quad \text{Equation 1051}$$

Δθz1 and Δvθz1 mean the differences in antiphase arm swing angle and angular velocity, respectively, between the corrected antiphase arm swing restoring angular acceleration gait and the original normal gait at the point when these two gaits have been generated to the end of the first turning gait. If Δθz1 and Δvθz1 are zero, then the second turning gait generated according to the same algorithm as that of the current time gait, setting the height of the trapezoid of the antiphase arm swing restoring angular acceleration pattern as azcyc2, and following the corrected antiphase arm swing restoring angular acceleration gait, will agree with the original normal gait.

Thus, the height bzcurr of the trapezoid of the current time gait and the height bz1 of the trapezoid of the first turning gait at which Δθz1 and Δvθz1 reach zero may be determined, and the determined bzcurr may be taken as the finally determined height of the trapezoid of the current time gait.

The dynamic model related to the antiphase arm swing angle of the robot 1 has the linear characteristic represented by a flywheel FHaz shown in FIG. 12. Hence, Δθz1 and Δvθz1 share the relationships shown below with the height bzcurr of the trapezoid of the current time gait, the height bz1 of the trapezoid of the first turning gait, the difference θzerr between the terminal antiphase arm swing angle of the provisional current time gait and the initial antiphase arm swing angle of the normal gait, and the difference vθzerr between the terminal antiphase arm swing angular velocity of the provisional current time gait and the initial antiphase arm swing angular velocity of the normal gait.

$$\Delta\theta z1 = cz11*bzcurr + cz12*bz1 + \theta zerr + ez1*v\theta zerr \quad \text{Equation 1052}$$

$$\Delta v\theta z1 = cz21*bzcurr + cz22*bz1 + ez2*v\theta zerr \quad \text{Equation 1053}$$

where $cz11, cz12, cz21, cz22, ez1$, and $ez2$ are coefficients uniquely determined primarily by a current time gait, the gait cycle of a first turning gait, and the parameters (particularly the parameters related to time) of an antiphase arm swing restoring angular acceleration pattern.

Based on the aforementioned principle, the calculation procedure first determines the antiphase arm swing angle difference θzerr and the angular velocity difference Vθzerr in the boundary between the provisional current time gait and the normal gait.

Then, the coefficients $cz11, cz12, cz21, cz22, ez1$, and $ez2$ of Equations 1052 and 1053 are determined primarily on the basis of the gait cycles of a current time gait and a first turning gait and the parameters (particularly the parameters related to time) of an antiphase arm swing restoring angular acceleration pattern.

Next, the height bzcurr of the trapezoid of the current time gait and the height bz1 of the trapezoid of the first turning gait are determined such that the right sides of Equations 1052 and 1053 become zero. In other words, bzcurr and bz1 are determined by solving the simultaneous equation having the left sides of Equation 1052 and Equation 1053 set to zero.

Lastly, the height of the trapezoid of the trapezoidal pattern of the antiphase arm swing restoring angular acceleration of the current time gait is set to the height bzcurr of the trapezoid of the above determined current time gait.

Returning to FIG. 13, after the current time gait parameters are corrected in S028 described above or if the determination result in S016 is NO, then the processing proceeds to S030 to determine a current time gait instantaneous value.

Figure 45:
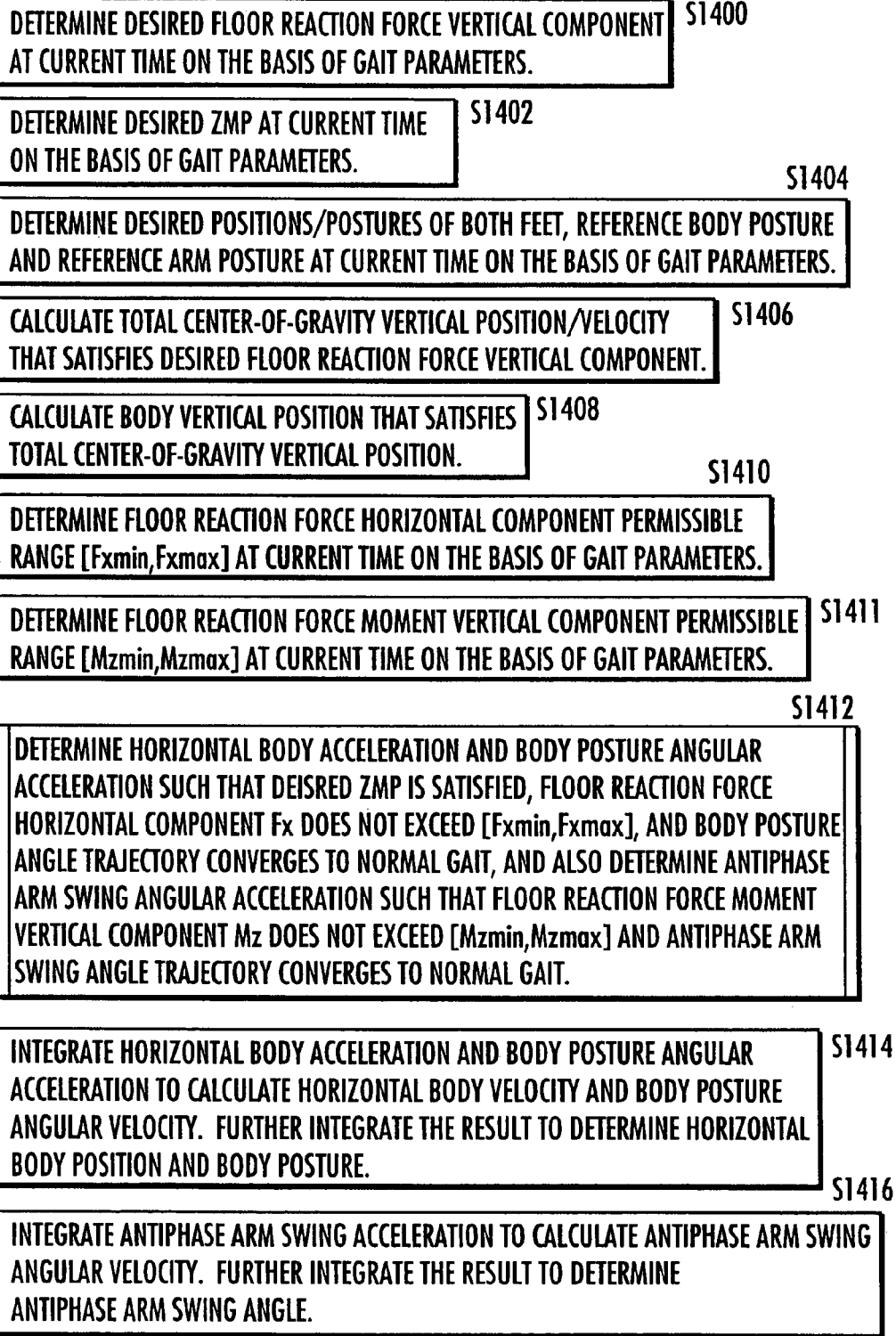
FIG. 45 is a flowchart showing subroutine processing of S030 in FIG. 13.

In S030, the subroutine processing shown in FIG. 45 is carried out.

Figure 46:
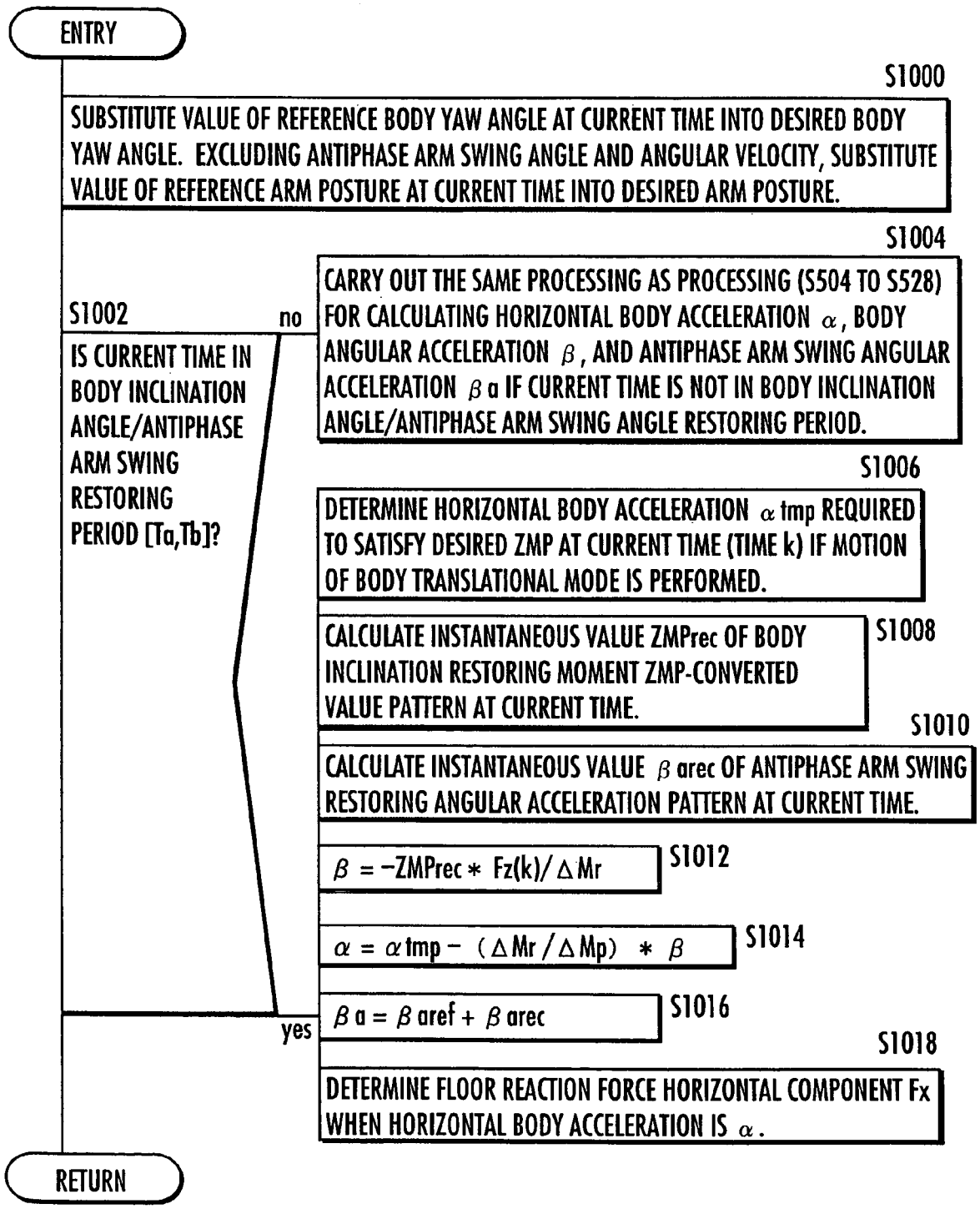
FIG. 46 is a flowchart showing subroutine processing of S1412 in FIG. 45.

The same processing as that from S400 to S411 of FIG. 25 is carried out from S1400 to S1411 of FIG. 45, and then the processing from S1000 to S1018 of FIG. 46, which is a subroutine of S1412, is carried out.

To be specific, first, in S1000, the value of the reference body yaw angle at the current time is substituted into the desired body yaw angle. Further, the value of a reference arm posture at the current time is substituted into the desired arm posture, excluding the arm posture antiphase arm swing angle and the angular velocity.

Then, the processing proceeds to S1002 wherein it is determined whether the current time is in the period of restoring a body posture angle and an antiphase arm swing angle (the period from time Ta to time Tb). The processing proceeds to S1004 if the determination result of S1002 is NO, or to S1006 if the determination result is YES.

In S1004, the same processing as that for calculating the horizontal body acceleration α, the body angular acceleration β, and the antiphase arm swing angular acceleration Ha (from S504 to S528 of FIG. 26) in a period other than the body inclination angle/antiphase arm swing angle restoring period is carried out.

In the case where the processing proceeds to S1006, the horizontal body acceleration αtmp, which is required to satisfy the current time (time k) desired ZMP if a motion of the body translational mode is to be performed, is determined in S1006.

Then, the processing proceeds to S1008 wherein the instantaneous value ZMPrec of a body inclination restoring moment ZMP-converted value pattern at the current time is calculated on the basis of the parameters related to the body inclination restoring moment ZMP-converted value pattern determined in S718.

The processing then proceeds to S1010 wherein an instantaneous value βarec of the antiphase arm swing restoring angular acceleration pattern at the current time is calculated on the basis of the parameters related to the antiphase arm swing restoring angular acceleration pattern determined in S722.

Subsequently, the processing proceeds to S1012 wherein the body angular acceleration (body inclination angular acceleration) β of the body inclination mode is determined according to the equation shown in the figure.

Subsequently, the processing proceeds to S1014 wherein the horizontal body acceleration α is determined according to the equation shown in the figure.

Subsequently, the processing proceeds to S1016 wherein the sum of the instantaneous value βarec of an antiphase arm swing restoring angular acceleration pattern calculated in S1010 and a reference antiphase arm swing angular acceleration βaref (a value obtained by subjecting a reference antiphase arm swing angle to second-order differentiation) is substituted into a desired antiphase arm swing angular acceleration βa.

Subsequently, the processing proceeds to S1018 wherein a floor reaction force horizontal component Fx when the horizontal body acceleration is α is determined.

Subsequently, the processing proceeds to S1414 wherein the horizontal body acceleration and the body posture angular acceleration are integrated to calculate a horizontal body velocity and a body posture angular velocity (body inclination angular velocity). The calculated result is further integrated to determine a horizontal body position and a body posture (the body inclination angle). A body yaw angle in the body posture is determined by a reference body yaw angle in the present embodiment.

Subsequently, the processing proceeds to S1416 wherein the antiphase arm swing acceleration is integrated to calculate an antiphase arm swing angular velocity. The calculation result is further integrated to determine an antiphase arm swing angle.

Thus, the processing of S030 of FIG. 13 is completed.

Subsequently, the processing proceeds to S032 wherein time t for generating a gait is incremented by Δt, and returns to S014 to continue to generate gaits as described above.

The above is the processing for generating desired gaits in the gait generating device 100.

The operation of the device according to the present embodiment will be further explained with reference to FIG. 4. In the gait generating device 100, a desired gait is generated as described above. In the generated desired gait, a desired body position/posture (trajectory) and a desired arm posture (trajectory) are sent out to a robot geometric model (an inverse kinematics calculator) 102.

A desired foot position/posture (trajectory), a desired ZMP trajectory (desired total floor reaction force central point trajectory), and a desired total floor reaction force (trajectory) (a desired floor reaction force horizontal component and a desired floor reaction force vertical component) are sent to a composite-compliance operation determiner 104 and also to a desired floor reaction force distributor 106. In the desired floor reaction force distributor 106, the floor reaction force is distributed to the feet 22R and 22L, and a desired floor reaction force central point of each foot and a desired floor reaction force of each foot are determined. The determined desired floor reaction force central point of each foot and the desired floor reaction force of each foot are sent to the composite-compliance operation determiner 104.

A corrected desired foot position/posture (trajectory) with deformation compensation is sent from the composite-compliance operation determiner 104 to the robot geometric model 102. Upon receipt of the desired body position/posture (trajectory) and the corrected desired foot position/posture (trajectory) with deformation compensation, the robot geometric model 102 calculates joint displacement commands (values) of twelve joints (10R(L), etc.) of the legs 2, 2 that satisfy them and sends the calculated commands to a displacement controller 108. The displacement controller 108 performs follow-up control on the displacements of the twelve joints of the robot 1, using the joint displacement commands (values) calculated by the robot geometric model 102 as desired values. In addition, the robot geometric model 102 calculates arm joint displacement commands (values) that satisfy the desired arm postures and sends the calculated commands (values) to the displacement controller 108. The displacement controller 108 performs follow-up control on the displacements of the twelve joints of the arms of the robot 1, using the joint displacement commands (values) calculated by the robot geometric model 102 as desired values.

A floor reaction force generated in the robot 1 (more specifically, an actual floor reaction force of each foot) is detected by a six-axis force sensor 50. The detected value is sent to the composite-compliance operation determiner 104.

In the actual body posture angular error (the difference between the desired body posture and an actual body posture (the actual posture of the body 3)) occurring in the robot 1, posture inclination angle errors θerrx and θerry (specifically, the error of the inclination angle of an actual body posture relative to the vertical direction with respect to the inclination angle of a desired body posture relative to the vertical direction, a posture inclination angle error in the roll direction (about the X-axis) being θerrx, and a posture inclination angle error in the pitch direction (about the Y-axis) being θerry) is detected via a posture sensor 54, and the detected value is sent to a posture inclination stabilization control calculator 112. The posture inclination stabilization control calculator 112 calculates the horizontal component of a compensating total floor reaction force moment about a desired total floor reaction force central point (desired ZMP) for restoring the actual body inclination angle of the robot 1 to the desired body posture angle, and sends it to the composite-compliance operation determiner 104.

More specifically, in the present embodiment, a compensating total floor reaction force moment horizontal component Mdmdxy is determined according to the following equation by using, for example, PD control law:

$$\begin{aligned}\text{Compensation total floor reaction}\\ \text{force moment horizontal component } Mdmdxy =\\ K\theta b * \text{Body posture inclination angle error} +\\ K\omega b * \text{Body posture inclination angular velocity error}\end{aligned} \quad \text{d25}$$

where Kθb and Kωb are predetermined gains. The body posture inclination angular velocity error is a temporal differential value of the body posture inclination angle error, and means an error of an actual body posture inclination angular velocity with respect to a desired body posture inclination angular velocity. The body posture inclination angle error is, more specifically, a vector composed of a posture inclination angle error of the body 3 of the robot 1 in the roll direction (about the X-axis) and a posture inclination angle error thereof in the pitch direction (about the Y-axis).

Furthermore, a yaw angle error θerrz in the above actual body posture angle error occurring in the robot 1 (more specifically, the posture angle error in the yaw direction (about the Z-axis) in the actual body posture angle error is θerrz) is detected through the intermediary of the posture sensor 54, and the detected value is sent to a yaw stabilization control calculator 113. The yaw stabilization control calculator 113 calculates the vertical component of the compensating total floor reaction force moment about a desired total floor reaction force central point (desired ZMP) for converging an actual body yaw angle and/or an angular velocity of the robot 1 to a desired body yaw angle and/or an angular velocity, and sends it to the composite-compliance operation determiner 104. The composite-compliance operation determiner 104 corrects the desired floor reaction force on the basis of the input value. Specifically, the desired floor reaction force is corrected such that the compensating total floor reaction force moment acts about the desired total floor reaction force central point (desired ZMP).

More specifically, in the present embodiment, a compensating total floor reaction force moment vertical component Mdmdz is determined according to the following equation by using, for example, the PD control law:

$$\text{Compensation total floor reaction force moment vertical component } Mdmdz = K\theta bz * \text{Body } yaw \text{ angle error} + K\omega bz * \text{Body } yaw \text{ angular velocity error} \quad \text{d26}$$

where $K\theta bz$ and $K\omega bz$ are predetermined gains. The body yaw angular velocity error is a temporal differential value of the body yaw angle error, and means an error of an actual body yaw angular velocity relative to a desired body yaw angular velocity.

The composite-compliance operation determiner 104 corrects the desired floor reaction force on the basis of the input value. Specifically, the desired floor reaction force moment horizontal component is corrected such that the compensating total floor reaction force moment horizontal component acts about the desired total floor reaction force central point (desired ZMP). In addition, the desired floor reaction force moment vertical component is corrected by additionally adding the compensating total floor reaction force moment vertical component to the desired floor reaction force vertical component about the desired total floor reaction force central point (desired ZMP) that dynamically balances with the desired gait.

The composite-compliance operation determiner 104 determines the aforesaid corrected desired foot position/posture (trajectory) with deformation compensation such that the state of the actual robot 1 and the floor reaction force calculated from sensor detection values or the like agree with the corrected desired floor reaction force. It is actually impossible, however, to make every state agree with a desired state, so that a trade-off relationship is established therebetween to make them compromisingly agree with each other as much as possible. More specifically, control errors with respect to desired values are weighted, and control is carried out to minimize the weighting average of control errors (or squares of control errors). With this arrangement, the control is conducted such that actual foot position/posture and a total floor reaction force almost follow desired foot position/posture and a desired total floor reaction force.

The main point of the present invention is the generation of gaits of the robot 1 by the gait generating device 100, and the construction and operation of the composite-compliance operation determiner 104 or the like described above are disclosed in detail primarily in Japanese Unexamined Patent Application Publication No. 11-300661 previously applied by the present applicant; therefore, no more explanation will be given.

In S028, as previously discussed, the current time gait parameters are corrected such that a terminal divergent component of the current time gait agrees with q'', which is a value obtained by observing an initial divergent component q [0] of a normal turning gait from the current time's gait supporting leg coordinate system.

Actually, the divergent component is an indicator for assessing whether the horizontal body position of a generated gait converges to a normal turning gait when the gait is generated on the basis of current time gait parameters by using a dynamic model and the gait is repeatedly generated in succession on the basis of normal turning gait parameters. Basically, the divergent component must be defined so that a terminal divergent component of the current time gait agrees with q'', which is a value obtained by observing a normal turning initial divergent component q [0] from the current time's gait supporting leg coordinate system, at convergence.

The divergent component defined by Equation 10 is actually a divergent component that approximately satisfies the aforesaid properties.

Hence, in the present embodiment, it may be said that the current time gait parameters have been corrected so that the horizontal body position of a generated gait converges (approximates) to the horizontal body position of a normal turning gait when the gait is generated on the basis of current time gait parameters by using a dynamic model and the gait is repeatedly generated in succession on the basis of normal turning gait parameters. Technically, however, only the first turning gait immediately following the current time gait must be the gait that has been corrected on the basis of the trapezoidal heights b1 and bz1 of the first turning gait determined as described above. In other words, if the gait that combines the current time gait and the first turning gait is regarded as the current time gait, then, in the present embodiment, it may be said that the current time gait parameters have been corrected so that the body posture angle of a generated gait converges (approximates) to the body posture angle of a normal gait composed of a second turning gait and the first turning gait when the gait is repeatedly generated, as described above.

This is the same as that disclosed in PCT publication of unexamined application WO/02/40224.

Figure 47:
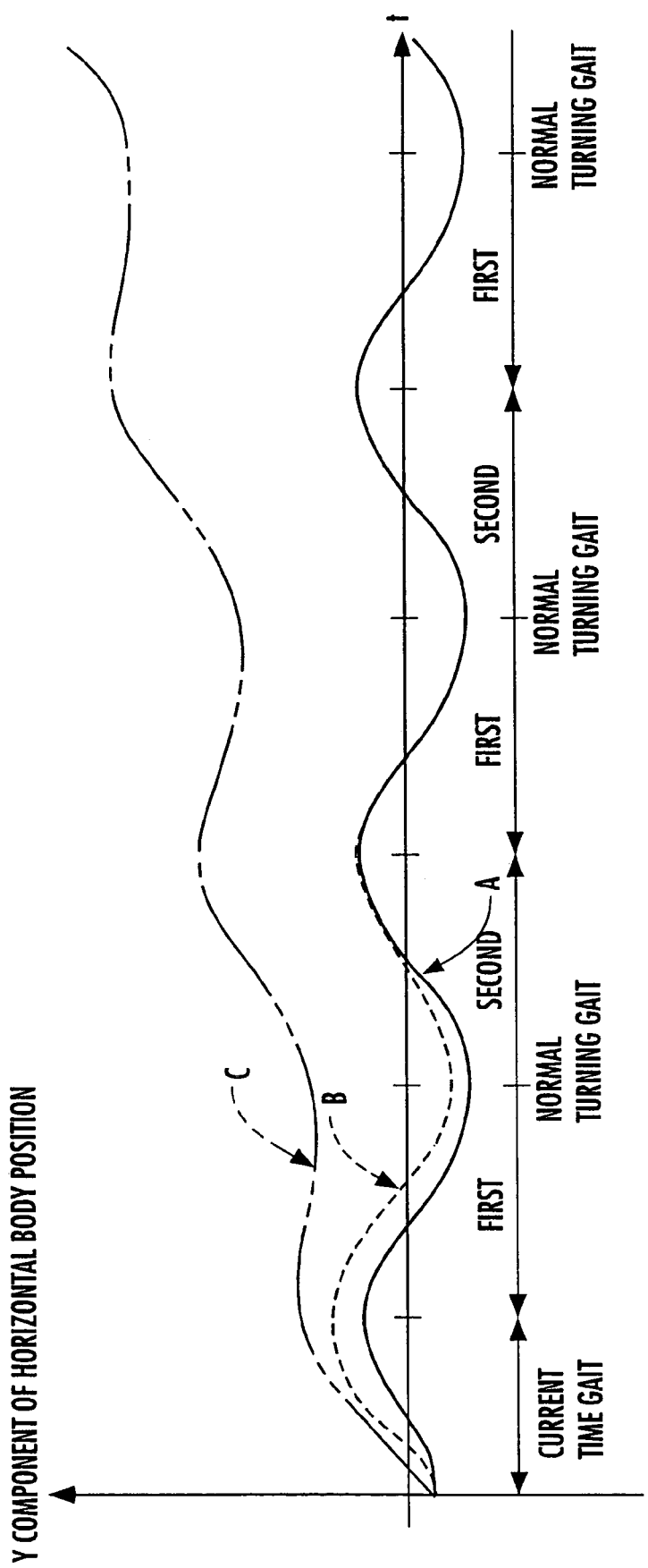
FIG. 47 is a graph showing a relationship between normal gaits and desired gaits relative to body position trajectories.

Especially in the present embodiment, the desired ZMP pattern of the gait parameters of the current time gait has been corrected so as to satisfy the condition (the current time gait approximating the normal gait). This will be explained with reference to FIG. 47. The trajectory indicated by reference mark B in the figure shows the horizontal body position trajectory generated so that divergent components agree at a gait boundary, as described above.

The trajectory indicated by reference mark A in the figure shows the horizontal body position trajectory obtained when a current time gait is generated so that horizontal body positions/velocities at boundaries of normal turning gaits agree, and then a normal gait is repeatedly generated.

As shown in the figure, the trajectory indicated by reference mark B generally deviates from the trajectory indicated by reference mark A at the boundary of the current time gait and a first normal turning gait. Thereafter, however, the trajectory indicated by reference mark B gradually converges to (approximates) the trajectory indicated by reference mark A and substantially agrees with the trajectory indicated by reference mark A in the next normal turning gait period. Thus, the gait generating technique for making only the divergent components agree at a gait boundary also permits the prevention of gait divergence, as the gait generating technique for making both position and velocity agree at a gait boundary. The example indicated by reference mark C in the figure shows an example wherein a trajectory has been generated without considering them. In such a case, the generated trajectory diverges as time elapses. It is of course possible to complicate a desired ZMP pattern and a plurality of parameters is adjusted to make both position and velocity agree; this, however, may cause a desired ZMP pattern to stagger. Incidentally, if both position and velocity are made to agree, then divergent components also agree, so that the method for making both position and velocity agree may be said to be a special example of the method for making divergent components agree.

Furthermore, in the present embodiment, it may be said that the current time gait parameters have been corrected so that the body posture angle of a generated gait converges (approximates) to or agrees with the body posture angle of a normal turning gait when the gait is generated on the basis of current time gait parameters by using a dynamic model and the gait is repeatedly generated in succession on the basis of normal turning gait parameters. Technically, however, only the first turning gait immediately following the current time gait must be a gait that has been corrected by the trapezoidal heights b1 and bz1 of the first turning gait determined as described above.

A few modifications of the present embodiment will be explained below.

In the present embodiment, for easier understanding, it has been arranged so that the floor reaction force horizontal component permissible range can be independently set for the longitudinal direction (X-axis direction) component and the lateral direction (Y-axis direction) component. More slippage-resistant gaits are generated by representing it by a relational expression of the longitudinal direction and the lateral direction.

For instance, a so-called friction circle shown by the following equation may be used as a permissible range.

$$(X \text{ component of floor reaction force horizontal component}) * (X \text{ component of floor reaction force horizontal component}) + (Y \text{ component of floor reaction force horizontal component}) * (Y \text{ component of floor reaction force horizontal component}) \leq (ka * \mu * Fz) * (ka * \mu * Fz) \quad \text{Equation 59}$$

where Fz denotes a desired floor reaction force vertical component, $\mu$ denotes a frictional coefficient, and ka denotes a positive constant of 1 or less.

However, if the floor reaction force horizontal component permissible range is represented by the relational expression of the longitudinal direction and the lateral direction, as described above, then it is necessary to simultaneously or alternately determine a motion on a sagittal plane and a motion on a lateral plane so as to simultaneously or alternately satisfy the permissible range.

A permissible range composed of a combination of a floor reaction force horizontal component and a floor reaction force moment vertical component may be set instead of setting the floor reaction force horizontal component permissible range and the floor reaction force moment vertical component permissible range separately, as described above. As the floor reaction force horizontal component increases, the friction limit of a floor reaction force moment vertical component diminishes. Further, as the floor reaction force moment vertical component increases, the friction limit of the floor reaction force horizontal component diminishes. Taking this into account, therefore, setting a permissible range composed of the combination of a floor reaction force horizontal component and a floor reaction force moment vertical component makes it possible to set a permissible range that is closer to an actual friction limit characteristic. Specifically, a permissible range may be set for a weighted average of an absolute value of a floor reaction force horizontal component and an absolute value of a floor reaction force moment vertical component.

The sum of the total center-of-gravity vertical acceleration and a gravitational acceleration of the robot is proportional to a floor reaction force vertical component; therefore, a parameter that defines a total center-of-gravity vertical acceleration trajectory of the robot may be explicitly set, as a gait parameter, in place of a floor reaction force vertical component trajectory. This is essentially the same. Alternatively, a parameter defining the vertical acceleration trajectory of a part that shows a behavior close to a total center-of-gravity trajectory of the robot may be explicitly set. For instance, if the mass of legs is sufficiently smaller than the mass of the body, then the body vertical acceleration trajectory and the total center-of-gravity vertical acceleration trajectory of the robot will be substantially the same or have a proportional relationship; therefore, the body vertical acceleration trajectory may be used in place of the floor reaction force vertical component trajectory. Similarly, a floor reaction force horizontal component and a total center-of-gravity horizontal acceleration of the robot have a proportional relationship, so that the total center-of-gravity horizontal acceleration of the robot and the permissible range thereof may be used in place of a floor reaction force horizontal component and a permissible range thereof in the present embodiment. Furthermore, a parameter related to the horizontal acceleration trajectory of a part that shows a behavior close to a total center-of-gravity horizontal trajectory of the robot may be explicitly set. For instance, if the mass of legs is sufficiently smaller than the mass of the body, then the body horizontal acceleration trajectory and the total center-of-gravity horizontal acceleration trajectory of the robot will be substantially the same or have a proportional relationship; therefore, the body horizontal acceleration and the permissible range thereof may be used in place of the floor reaction force horizontal component and the permissible range thereof.

Moreover, the floor reaction force moment vertical component about a desired ZMP and the angular momentum changing rate vertical component of the entire robot about the desired ZMP have a proportional relationship; therefore, the angular momentum changing rate vertical component of the entire robot and the permissible range thereof may be used in place of the floor reaction force moment vertical component and the permissible range thereof in the present embodiment.

In the present embodiment, two motion modes, namely, the body inclination mode and the body translational mode, have been used to obtain proper values for the floor reaction force horizontal component and the floor reaction force moment horizontal component about a desire ZMP; however, motion modes other than these may be used.

Figure 48:
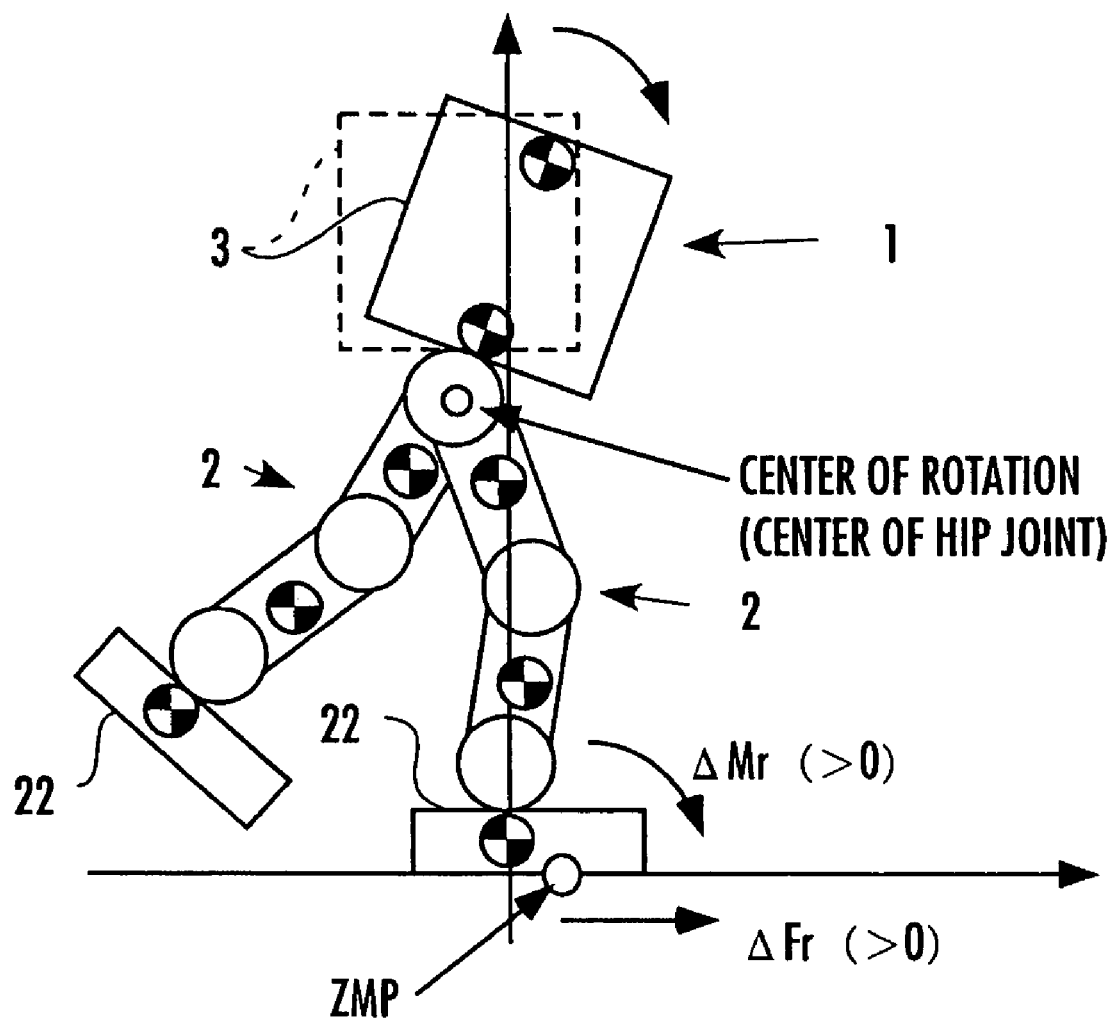
FIG. 48 is a diagram showing another example of a body inclination mode (body inclination about waist)

For example, as shown in FIG. 48, when the body posture is turned with the hip joints being as the turning center, the angular momentum about the total center of gravity changes and the total center of gravity also changes accordingly. Overlapping (combining) this motion and the above-mentioned body translational mode at a predetermined ratio produces almost the same motion as that of the body inclination mode, and the floor reaction force horizontal component is no longer produced. Hence, if this is regarded again as the body inclination mode, then a similar gait can be generated according to the algorithm of the present embodiment.

Thus, it is not required that one of the motion modes is a motion mode that does not produce a floor reaction force horizontal component. This is because any floor reaction force horizontal component and a floor reaction force moment about a desired ZMP can be generated as in the aforesaid example by any combination of modes as long as two motion modes having different generation ratios of a floor reaction force horizontal component and a floor reaction force moment about a desired ZMP are used.

A motion mode other than the motion mode that changes a body posture may be used. It is preferable, however, to select a motion mode that allows a largest possible floor reaction force horizontal component or a largest possible floor reaction force moment about a desired ZMP to be generated in response to a minimized displacement.

For example, a motion mode for swinging the distal positions of right and left arms in the same direction, or a motion mode for perturbating the position of a foot not in contact with the ground (existing in the air) may be selected. However, when perturbating a free leg trajectory, the amount of perturbation should be returned to virtually zero by the time immediately before landing, so that a landing position will not change. It is of course possible to combine the motion mode for swinging the distal positions of right and left arms in the same direction and an antiphase arm swing mode.

Further alternatively, three or more motion modes may be used.

At least two of selected motion modes have mutually different ratios of a floor reaction force horizontal component to a floor reaction force moment about a desired ZMP generated by the motion modes. Otherwise, there will be usually no solution of a simultaneous equation (the behavior of each motion mode cannot be uniquely determined).

In addition, it is preferred to combine, as much as possible, a motion mode that allows a sufficiently large change to take place in a floor reaction force moment about a desired ZMP while minimizing a change in a floor reaction force horizontal component, and a motion mode that allows a sufficiently large change to take place in a floor reaction force horizontal component while minimizing a change in a floor reaction force moment about a desired ZMP.

In other words, it is desirable to combine a motion mode that allows a sufficiently large change to take place in an angular momentum while minimizing a change in a total center of gravity, and a motion mode that allows a sufficiently large change to take place in a total center of gravity while minimizing a change in an angular momentum. This is because a displacement of a motion mode will be smaller.

Further, a body yaw rotation mode may be used in place of the antiphase arm swing mode to prevent a floor reaction force moment vertical component from exceeding a permissible range (to cancel a spinning force). When the body yaw rotation mode is used, it is preferred to divide the body 3 of the robot 1 into a part close to the waist (e.g., the part below a member 54 shown in FIG. 1) and the part above it (e.g., the part above the member 54 shown in FIG. 1) such that the upper part may turn in the yaw direction (e.g., about a trunk axis of the body 3) relative to the part close to the waist. This makes it possible to allow the upper part of the body 3 to rotate so as to permit adjustment of a floor reaction force moment vertical component without affecting the postures of the legs 2 and 2. As an embodiment in such a case, the rotational angle of the upper part of the body 3, and the angular velocity and the angular acceleration thereof may be determined instead of determining the antiphase arm swing angle and the angular velocity and the angular acceleration in, for instance, the aforementioned embodiment. In this case, the relative positions of the two arms 5 and 5 with respect to, for example, the upper part of the body 3 may be fixed. An antiphase arm swing operation of the two arms 5 and 5 may be of course added to the yaw rotation of the upper part of the body 3.

Alternatively, a motion mode may be used that displaces a part other than the arms and the body as long as it generates a floor reaction force moment vertical component.

For example, a mode may be used that moves the distal ends of both legs in opposite longitudinal directions in a floating period.

Alternatively, a few motion modes generating a floor reaction force moment vertical component may be used together. For example, the antiphase arm swing mode and the body yaw rotation mode may be used in combination.

The body yaw rotation mode and the antiphase arm swing mode are the modes that generate a floor reaction force moment vertical component in such a manner that a total center-of-gravity position remains unchanged (in other words, without generating a floor reaction force horizontal component). However, motions causing a total center-of-gravity position to change (in other words, motions that generate floor reaction force horizontal components) may alternatively be also used. This is because the floor reaction force horizontal component can be adjusted by combining these modes with the body translational mode.

In addition to the dynamic model used in the aforesaid embodiment (the dynamic model shown in FIG. 12), the following models may be used.

Figure 49:
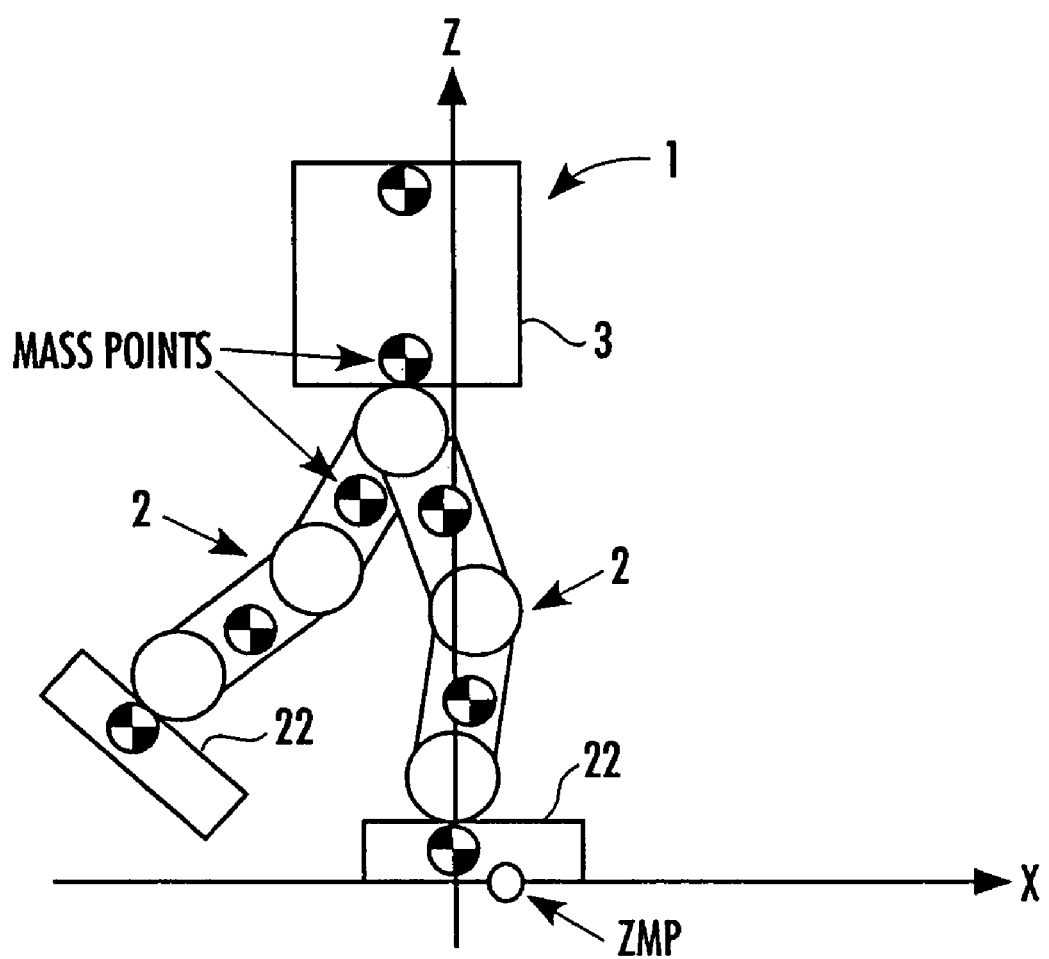
FIG. 49 is a diagram for explaining another example of a dynamic model.
Figure 50:
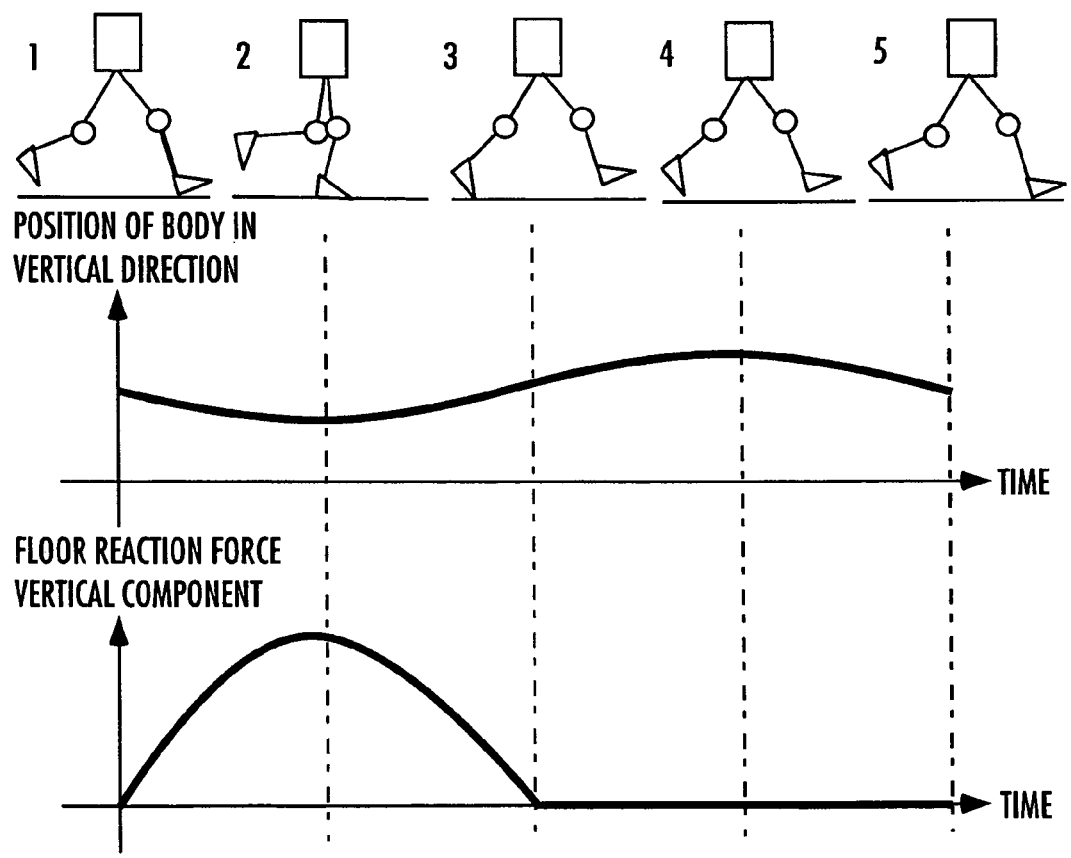
FIG. 50 is a diagram showing a relationship between the position of the body in a vertical direction and a floor reaction force vertical component in a running gait of the robot.
Figure 51:
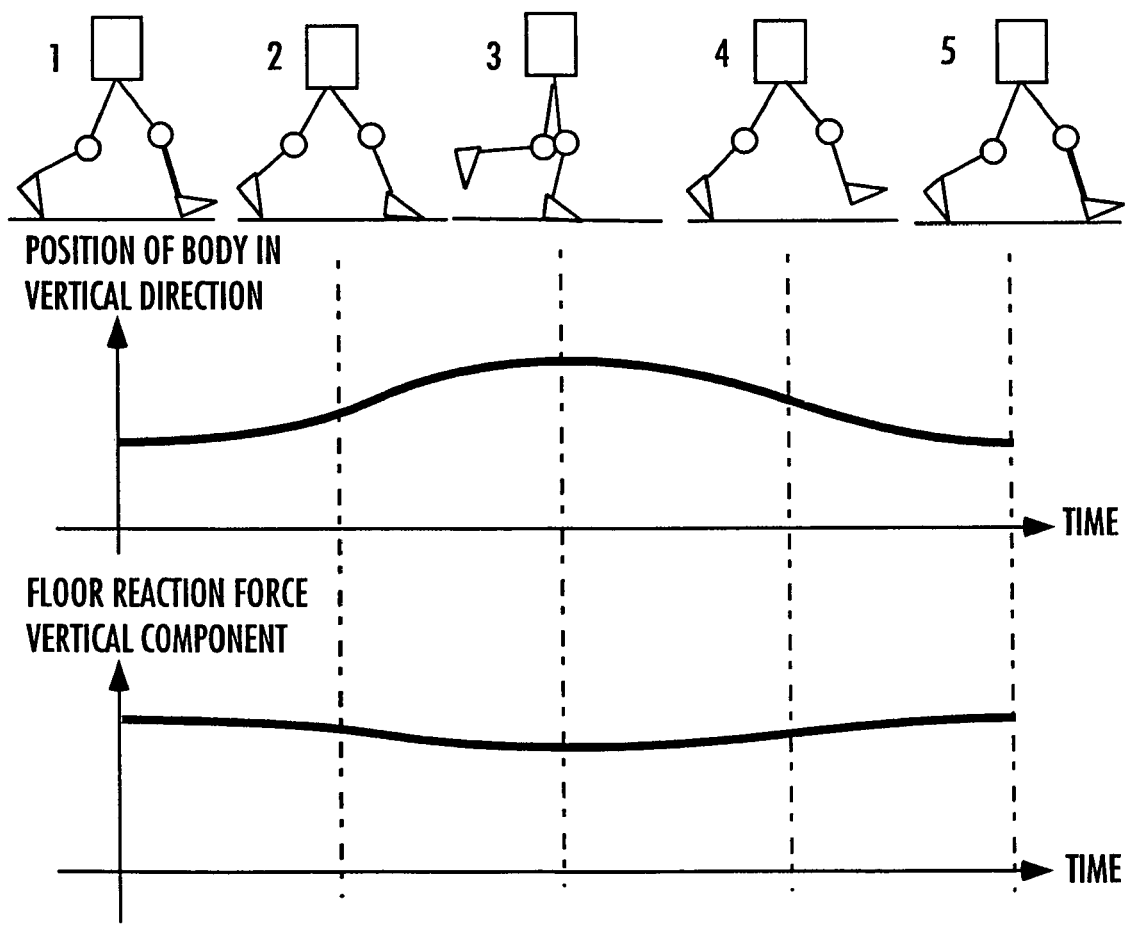
FIG. 51 is a diagram showing a relationship between the position of the body in a vertical direction and a floor reaction force vertical component in a walking gait of the robot.

1) Non-linear model having mass points set at a plurality of links, as shown in FIG. 49 (multi-mass-point model). Inertia (inertial moment) may be set at each link of the model.
2) Three-mass-point model disclosed in PCT Kokai publication WO/02/40224 by the present applicant.
3) Model that ignores the moment of an inertial force generated by the body yaw rotation mode or the antiphase arm swing mode.
4) Separate type model that separately has a partial model representing a relationship between a resultant force of gravity and an inertial force (or a floor reaction force balancing therewith) and a body translational motion, and a partial model representing a relationship between the above resultant force and a body posture rotational motion (a body inclination motion and a body yaw rotational motion). For instance, the mass points shown in FIG. 12 constitute partial models representing the relationship between the above resultant force and the body translational motion, and the flywheels shown in FIG. 12 constitute partial models representing the relationship between the above resultant force and a body posture rotational motion.

Any one of 1) through 4) shown above requires a motion mode that generates a moment vertical component of an inertial force.

The same model may be used for each processing or models may be properly used according to processing. For example, the aforementioned normal gait is generated merely to determine a terminal state of the current time gait, so that the dynamic accuracy required of the normal gait is lower than that required of the current time gait. Hence, for example, the processing for generating the current time gait may use the dynamic model shown in FIG. 12 (the model with 3 mass points+flywheels), while the processing for generating a normal gait (particularly S408 and S412 of FIG. 21) may generate a normal gait by using a dynamic model composed of a body mass point $3m$ corresponding to the body 3 and flywheels FHx, FHy, FHaz, and FHbz (the model of one mass point+flywheels, which corresponds to the model of FIG. 12 from which leg mass points $2m$ and $2m$ have been removed), ignoring the mass of each leg 2. The processing for generating the normal gait in this case may carry out the processing of S408 and S412 of FIG. 25 with the mass of the leg mass point being set to zero in the aforesaid embodiment. This makes it possible to dramatically reduce the calculation volume in the processing of generating normal gaits.

In the aforesaid embodiment, the block charts, the flowcharts, and algorithms or the like may be subject to equivalent modifications, including modified calculation processing sequences. Furthermore, a low-pass filter may be inserted, as necessary.

Although the aforesaid embodiment has been explained in conjunction with the bipedal mobile robot; however, it may be applied also to a multi-legged robot having three or more feet.

Instead of using an exploratory technique or partly using an analytical technique to determine the initial state of a normal gait (primarily an initial horizontal body position/velocity, and initial vertical body position/velocity and antiphase arm swing angle and angular velocity), as in the aforesaid embodiment, diverse normal gait parameters may be calculated using the above techniques beforehand and the relationship between the normal gait parameters and the initial states of normal gaits may be mapped or processed into an approximate expression and stored so as to determine the initial values of the normal gait on the basis of the relationship, which has been mapped or formed into approximate expressions, at the time of actual travel.

Further alternatively, a function that combines the aforesaid relationship, which has been mapped or processed into an approximate expression, and the aforesaid function f may be mapped or processed into an approximate expression and stored. More specifically, from the normal gait parameters composed of the aforesaid foot trajectory parameters, the floor reaction force vertical component trajectory parameters, etc., the functions for directly determining the divergent components of normal gaits may be mapped or processed into approximate expressions and the results may be stored. For example, a normal gait may be generated in advance for each set of a plurality of types of typical normal gait parameters, the initial state of the normal gait for each set of normal gait parameters (to be determined in S024 of FIG. 13) may be determined beforehand, and a map that shows the relationship between the normal gait parameters of each set and the normal gait initial states may be prepared in advance. Then, when generating a desired gait, the initial state of a normal gait may be determined by selecting or interpolating from among the sets of the determined normal gait parameters on the basis of the aforesaid map. This arrangement obviates the need for generating a normal gait each time a current time gait is generated, thus permitting a significant reduction in the amount of calculation for the processing of generating a desired gait.

As the method for correcting a current time gait to connect (approximate) it to a normal gait, the desired ZMP parameter of the current time gait has been corrected in the present embodiment. However, other parameters may alternatively be corrected.

For instance, the trajectory of a free leg in the air in a current time gait may be changed. If, for example, a horizontal body position is likely to shift farther to the rear than a normal gait, then a free leg is promptly moved forward after it leaves a floor so as to shift the position of the center of gravity of the free leg toward the front. This causes the horizontal body position for satisfying a desired ZMP to be unavoidably further accelerated toward the front. As a result, the horizontal body position moves further forward at the end of the current time gait, making it possible to match the normal gait.

Instead of correcting a desired ZMP parameter, the cycle of a current time gait may be corrected. For instance, if the horizontal body position is likely to shift farther to the rear than a normal gait, then the cycle of the current time gait may be extended. Extending the cycle of the current time gait will extend the time for the horizontal body position to move, permitting extra forward movement to be accomplished accordingly.

However, if a desired ZMP parameter is corrected when determining an appropriate value of the horizontal body position or the like by an exploratory technique, the horizontal body position at the end of the current time gait changes substantially proportionally to a correction amount of the desired ZMP, so that the number of explorations of the appropriate value can be reduced. In comparison to this, correcting the center-of-gravity trajectory of a free leg or the cycle of a gait requires a greater number of explorations for the appropriate value, because the horizontal body position at the end of the current time gait changes considerably nonlinearly in response to the correction.

In the present embodiment, the desired ZMP parameter of the current time gait has been corrected, as the method for correcting the current time gait to connect (approximate) it to the normal gait. This method may lead to an excessive correction amount (correction amount a shown in FIG. 34) of the desired ZMP parameter in some cases. For instance, if a request for an abrupt changeover from the gait of hopping at a spot to a high-speed travel (a request for running) is issued, then the desired ZMP parameter must be given an extremely large shift backward relative to an advancing direction in order to ensure connection (approximation) to a high-speed normal gait (normal gait for running). In this case, as discussed above, gait parameters in addition to the desired ZMP parameter are preferably corrected. In this case, however, the request for such an abrupt acceleration itself is actually unreasonable, so that a required value itself may be corrected as an alternative.

To correct the required value, for example, a normal gait satisfying the request (the required parameter) is determined, for the time being, according to the procedure shown in the present embodiment, and at the point when a current time gait parameter has been determined so that it connects to the normal gait, it is determined whether the stability margin for the desired ZMP trajectory of the current time gait has been unduly reduced. If the stability margin has reduced too much (if the desired ZMP has deviated from a so-called supporting polygon or the desired ZMP is positioned near an edge of the supporting polygon), then the request may be corrected.

Alternatively, the permissible range of acceleration/deceleration of a gait ((Next time gait initial velocity−Current time gait initial velocity)/Cycle of current time gait) is set beforehand, and at the point when a request (a required parameter related to a gait cycle) is received, the acceleration/deceleration based on the request is determined, and if the determined acceleration/deceleration exceeds the permissible range, then the request may be corrected so that it falls within the permissible range.

Supplementally, if simple dynamic models as discussed above are used, the aforesaid ΔMp, ΔFp, ΔMr, ΔFr, ΔMaz, and ΔMbz may be analytically determined by dynamic calculation; however, if a general, more complicated dynamic model is used, then they may be determined as follows. A floor reaction force in a case where the body 3 is accelerated by an extremely small amount by the body translational mode or accelerated by an extremely small amount by the body inclination mode is determined, and then the difference between this determined floor reaction force and the floor reaction force obtained in a case where the body 3 is not accelerated is determined. Then, the difference is divided by the above extremely small amount.

Alternatively, the average value of each of ΔMp, ΔFp, ΔMr, ΔFr, ΔMaz, ΔMbz, and ΔMp/ΔMr or the like in standard gaits may be determined in advance and may be used. ΔMp, ΔFp, ΔMr, ΔFr, ΔMaz, ΔMbz, and ΔMp/ΔMr vary according to a state (a posture and its changing rate), so that the accuracy slightly deteriorates, as compared with a method in which they are determined for each state at each instant; however, the amount of calculation can be significantly reduced when models that are more complicated than the aforesaid models are used.

The following method may be used as the method for determining the height bzcurr of the trapezoid of the antiphase arm swing restoring angular acceleration pattern of the current time gait.

The antiphase arm swing angle and the angular velocity at the end of the current time gait of the aforesaid gait with a corrected antiphase arm swing restoring angular acceleration (refer to the explanation of S722 of FIG. 42) are denoted by θzcurr and vθzcurr, respectively, and the differences between these and the antiphase arm swing angle and the angular velocity of a normal gait are denoted by Δθzcerr and Δvθzcerr.

A discrete type state equation may be set up, in which a gait cycle is defined as an interval, the differences θzerr and vθzerr between the terminal antiphase arm swing angle and angular velocity of a provisional current time gait and the initial antiphase arm swing angle and angular velocity of a normal gait denote a last time state, bzcurr denotes an input, and Δθzcerr and Δvθzcerr denote a current state, and then a feedback rule may be determined using a modern control theory or the like so as to converge Δθzcerr and Δvθzcerr to zero. The determined feedback rule may be used to obtain bzcurr.

Based mainly on the difference between desired antiphase arm swing angle/angular velocity and reference antiphase arm swing angle/angular velocity at each instant, the value of the antiphase arm swing restoring angular acceleration βarec at each instant may be determined by using a state feedback rule or the like so as to converge the above difference to zero rather than using a trapezoidal pattern to determine the antiphase arm swing restoring angular acceleration βarec of a current time gait and/or a normal gait.

Based on desired antiphase arm swing angle/angular velocity of a current time gait at each instant, the antiphase arm swing restoring angular acceleration βarec at each instant may be determined by using a state feedback rule or the like such that these will approximate initial antiphase arm swing angle/angular velocity of a first turning gait rather than using a trapezoidal pattern to determine the antiphase arm swing restoring angular acceleration βarec of a current time gait.

To generate a gait for traveling on a slope (when moving the robot 1 on a slant floor surface), the permissible range of the floor surface parallel component of a translational floor reaction force (a component parallel to the floor surface), that is, the permissible range of fictional force, or the permissible range of the floor surface parallel component of a total center-of-gravity acceleration (this is proportionate to a frictional force) may be set in place of a floor reaction force horizontal component permissible range or a total center-of-gravity acceleration horizontal component permissible range. A case, for example, where the permissible range of the floor surface parallel component (frictional force) of a translational floor reaction force will be explained (this explanation applies also to a case where the permissible range of a floor surface parallel component of total center-of-gravity acceleration is set). The frictional force is determined according to Equation 72 shown below if an inclination angle relative to the horizontal plane of a floor surface is defined as θf (a slope down forward in the direction in which the robot 1 advances is defined as a positive slope). Therefore, to generate a gait according to the same algorithm as that in the aforesaid embodiment, the Equation 72 may be used to convert a frictional force permissible range into a floor reaction force horizontal component permissible range thereby to set the floor reaction force horizontal component permissible range. In this case, a desired floor reaction force vertical component may be used as the floor reaction force vertical component of Equation 72.

$$\text{Frictional force} = \text{Floor reaction force horizontal component} * \cos(\theta f) - \text{Floor reaction force vertical component} * \sin(\theta f)$$

Equation 72

When generating a gait for traveling on a slope (when moving the robot 1 on an inclined floor surface), a floor reaction force moment vertical component can be converted into a moment in the direction of the normal line of a floor surface frictional force according to Equation 1072, so that the permissible range of the component in a floor surface normal line of a floor reaction force moment, i.e., the permissible range of the moment in the direction of the normal line of a floor surface frictional force, may be set in place of the permissible range of a floor reaction force moment vertical component.

$$\text{Moment in the direction of the normal line of floor surface frictional force} = \text{Vertical component of floor reaction force moment} * \cos(\theta f)$$

Equation 1072

The parameters of a current time gait may be re-determined in the middle of the generation of a current time gait, as disclosed in PCT Kokai publication WO/02/40224 by the present applicant, instead of determining them when a last time gait is completed, as in the aforesaid embodiment. This allows an immediate response to be taken if a gait request changes, although it involves an increased calculation volume.

If correction of a gait (re-determination of a current time gait parameter) is not completed within a current control cycle, then an uncorrected gait or provisionally corrected gait (a gait in the middle of exploration, i.e., a gait that does not fully satisfy an exploration completion condition (a deviation of a gait boundary condition being less than a permissible value)), is tentatively output, and a properly corrected (non-provisional) gait may be output by the next control cycle or by a plurality of control cycles later. The corrected desired ZMP trajectory and desired floor reaction force vertical component trajectory are connected, and these do not suddenly change in a short time; therefore, the desired ZMP trajectory and the desired floor reaction force vertical component trajectory of the current time gait will hardly present a problem although they will be slightly staggered.

INDUSTRIAL APPLICABILITY

As described above, the present invention is usefully applied to make it possible to generate gaits that permit spin-free, smooth travel of a legged mobile robot, such as a bipedal mobile robot, even in a circumstance in which the frictional force between the robot and a floor surface is small.

The invention claimed is:

1. A gait generating device of a legged mobile robot for generating a desired gait of a legged mobile robot that travels by moving a plurality of legs extended from its body, comprising:
    permissible range setting means for setting a permissible range of a restriction object amount, the restriction object amount being a vertical component of a floor reaction force moment to be applied to the robot or a component of the floor reaction force moment in floor surface normal line direction, or a vertical component of an angular momentum changing rate of the robot or a component of the angular momentum changing rate in floor surface normal line direction;
    provisional motion determining means for determining a provisional motion of the desired gait such that a resultant force of a gravity and an inertial force acting on the robot satisfies a predetermined dynamic balance condition on a predetermined dynamic model; and
    provisional motion correcting means for correcting the provisional motion to determine a motion of the desired gait by changing the changing rate of an angular momentum of the robot from the provisional motion while limiting the restriction object amount to the permissible range on the dynamic model if the restriction object amount defined by the provisional motion of the desired gait deviates from the permissible range;
    wherein the robot is a robot equipped with two arms extended from the right and left sides of the body, and the motion to be corrected by the provisional motion correcting means, which is the desired gait, is a motion for moving the two arms forward and backward relative to the robot in opposite directions from each other.

2. The gait generating device of a legged mobile robot according to claim 1, wherein a motion to be corrected by the provisional motion correcting means is a motion of a body of the robot or an arm extended from the body.

3. The gait generating device of a legged mobile robot according to claim 1, wherein, in the motion of the body of the robot or the motion of an arm extended from the body, the motion to be corrected by the provisional motion correcting means is a motion that changes the vertical component of the angular momentum changing rate of the robot or the component of the angular momentum changing rate in floor surface normal line direction while substantially maintaining the position of center-of-gravity of the robot at the position of center-of-gravity determined by the provisional motion.

4. The gait generating device of a legged mobile robot according to claim 1, wherein the desired gait is a gait in which a landing period during which at least one leg of the robot is landed and a floating period during which all legs are floated in the air are alternately repeated, and the permissible range is set to substantially zero at least during the floating period.

5. The gait generating device of a legged mobile robot according to claim 1, comprising:
    desired vertical component determining means for determining a desired vertical component of a translational floor reaction force of the robot or a desired vertical component of a total center-of-gravity acceleration or a desired vertical component of a body acceleration,
    wherein the permissible range setting means sets the permissible range on the basis of a desired vertical component determined by the desired vertical component determining means.

6. The gait generating device of a legged mobile robot according to claim 1, wherein the predetermined dynamic model describes at least the relationship between a motion to be corrected by the provisional motion correcting means and a floor reaction force as a relationship between a rotational motion of a flywheel, which is rotative about a vertical axis or a floor surface normal line axis, and a floor reaction force.

7. The gait generating device of a legged mobile robot according to claim 1, wherein the provisional motion correcting means determines a motion of the desired gait such that the motion of the robot to be corrected if the restriction object amount deviates from the permissible range is approximated or matched to a predetermined reference motion trajectory in a predetermined period during which the restriction object amount determined by the provisional motion lies in the permissible range.

8. The gait generating device of a legged mobile robot according to claim 1, wherein the desired gait to be generated has a current time gait generated for each predetermined period to be used for an actual motion of the robot, and a normal gait, which is a virtual cyclic gait following each current time gait and which is used for generating the current time gait, and the processing of the provisional motion determining means and the provisional motion correcting means is carried out when generating the current time gait and/or a normal gait following the current time gait.

9. The gait generating device of a legged mobile robot according to claim 8, wherein the permissible range setting means sets the permissible range of the current time gait and the permissible range of the normal gait following the current time gait on the bass of a required parameter of the current time gait.

10. The gait generating device of a legged mobile robot according to claim 9, wherein the legged mobile robot is a bipedal mobile robot having two legs, and the required parameter includes parameters that define the landing positions/postures for two steps of the distal portions of the legs of the bipedal mobile robot and parameters that define the gait cycles of a first step and a second step.

11. The gait generating device of a legged mobile robot according to claim 1, further comprising means for generating the desired gait.

* * * * *

UNITED STATES PATENT AND TRADEMARK OFFICE
CERTIFICATE OF CORRECTION

| | | |
|---|---|---|
| PATENT NO. | : 7,734,378 B2 | Page 1 of 1 |
| APPLICATION NO. | : 10/562626 | |
| DATED | : June 8, 2010 | |
| INVENTOR(S) | : Takenaka et al. | |

It is certified that error appears in the above-identified patent and that said Letters Patent is hereby corrected as shown below:

In Column 82, Line 47, in Claim 9, delete "bass" and insert -- basis --

Signed and Sealed this

Seventeenth Day of August, 2010

David J. Kappos
*Director of the United States Patent and Trademark Office*